(12) United States Patent
Itabashi et al.

(10) Patent No.: US 12,179,648 B2
(45) Date of Patent: Dec. 31, 2024

(54) PASSENGER-SEAT-CUSHION-MEMBER MANUFACTURING METHOD, PASSENGER-SEAT CUSHION MEMBER, FILLING-BODY MANUFACTURING METHOD, AND FILLING BODY

(71) Applicant: Archem Inc., Tokyo (JP)

(72) Inventors: Taichi Itabashi, Tokyo (JP); Nobuyuki Azakami, Tokyo (JP); Yukiko Yamaguchi, Tokyo (JP)

(73) Assignee: Archem Inc., Tokyo (JP)

( * ) Notice: Subject to any disclaimer, the term of this patent is extended or adjusted under 35 U.S.C. 154(b) by 217 days.

(21) Appl. No.: 17/594,309

(22) PCT Filed: Feb. 17, 2020

(86) PCT No.: PCT/JP2020/006074
§ 371 (c)(1),
(2) Date: Oct. 11, 2021

(87) PCT Pub. No.: WO2020/208939
PCT Pub. Date: Oct. 15, 2020

(65) Prior Publication Data
US 2022/0153175 A1    May 19, 2022

(30) Foreign Application Priority Data
Apr. 12, 2019   (JP) .................. 2019-076047

(51) Int. Cl.
*B60N 2/70* (2006.01)
*B29C 64/118* (2017.01)
*B29L 31/00* (2006.01)
*B33Y 10/00* (2015.01)
*B33Y 80/00* (2015.01)

(52) U.S. Cl.
CPC .......... *B60N 2/7017* (2013.01); *B29C 64/118* (2017.08); *B33Y 10/00* (2014.12); *B33Y 80/00* (2014.12); *B29L 2031/771* (2013.01)

(58) Field of Classification Search
CPC ........ B60N 2/7017; B33Y 10/00; B33Y 80/00
See application file for complete search history.

(56) References Cited

U.S. PATENT DOCUMENTS 9,604,549 B2   3/2017   Makiguchi et al.
2011/0241404 A1   10/2011   Di Giusto et al.
(Continued)

FOREIGN PATENT DOCUMENTS

CN   203472606 U   3/2014
CN   104960446 A   10/2015
(Continued)

OTHER PUBLICATIONS

Sep. 28, 2021, International Preliminary Report on Patentability issued in the International Patent Application No. PCT/JP2020/006074.
(Continued)

*Primary Examiner* — Anthony D Barfield
(74) *Attorney, Agent, or Firm* — KENJA IP LAW PC

(57) ABSTRACT

A passenger-seat-cushion-member manufacturing method including a step of shaping the porous structural body by using a 3D printer; and a step of coupling the filling body side coupling part including the shaped porous structural body to the seat body side coupling part, to fill the seat body with the filling body.

15 Claims, 27 Drawing Sheets

(56) References Cited

U.S. PATENT DOCUMENTS

| | | |
|---|---|---|
| 2018/0043805 A1 | 2/2018 | Baek et al. |
| 2018/0070736 A1 | 3/2018 | Achten et al. |
| 2018/0071979 A1 | 3/2018 | Achten et al. |
| 2020/0047649 A1 | 2/2020 | Takahashi et al. |

FOREIGN PATENT DOCUMENTS

| | | |
|---|---|---|
| CN | 107719197 A | 2/2018 |
| DE | 102017118157 A1 | 2/2018 |
| JP | H04136157 U | 12/1992 |
| JP | H09271423 A | 10/1997 |
| JP | 2004174762 A | 6/2004 |
| JP | 2005199936 A | 7/2005 |
| JP | 2009029064 A | 2/2009 |
| JP | 2009254669 A | 11/2009 |
| JP | 2016044292 A | 4/2016 |
| JP | 2016096891 A | 5/2016 |
| JP | 2018193043 A | 12/2018 |

OTHER PUBLICATIONS

May 19, 2020, International Search Report issued in the International Patent Application No. PCT/JP2020/006074.

Dec. 14, 2022, search result of the Extended European Search Report issued by the European Patent Office in the corresponding European Patent Application No. 20787858.8.

Mar. 9, 2024, search result of the Office Action issued by the China National Intellectual Property Administration in the corresponding Chinese Patent Application No. 202080027989.9.

Aug. 8, 2024, search result of the Office Action issued by the China National Intellectual Property Administration in the corresponding Chinese Patent Application No. 202080027989.9.

VIEW OF PART C IN DIRECTION OF ARROW D

FIG. 12
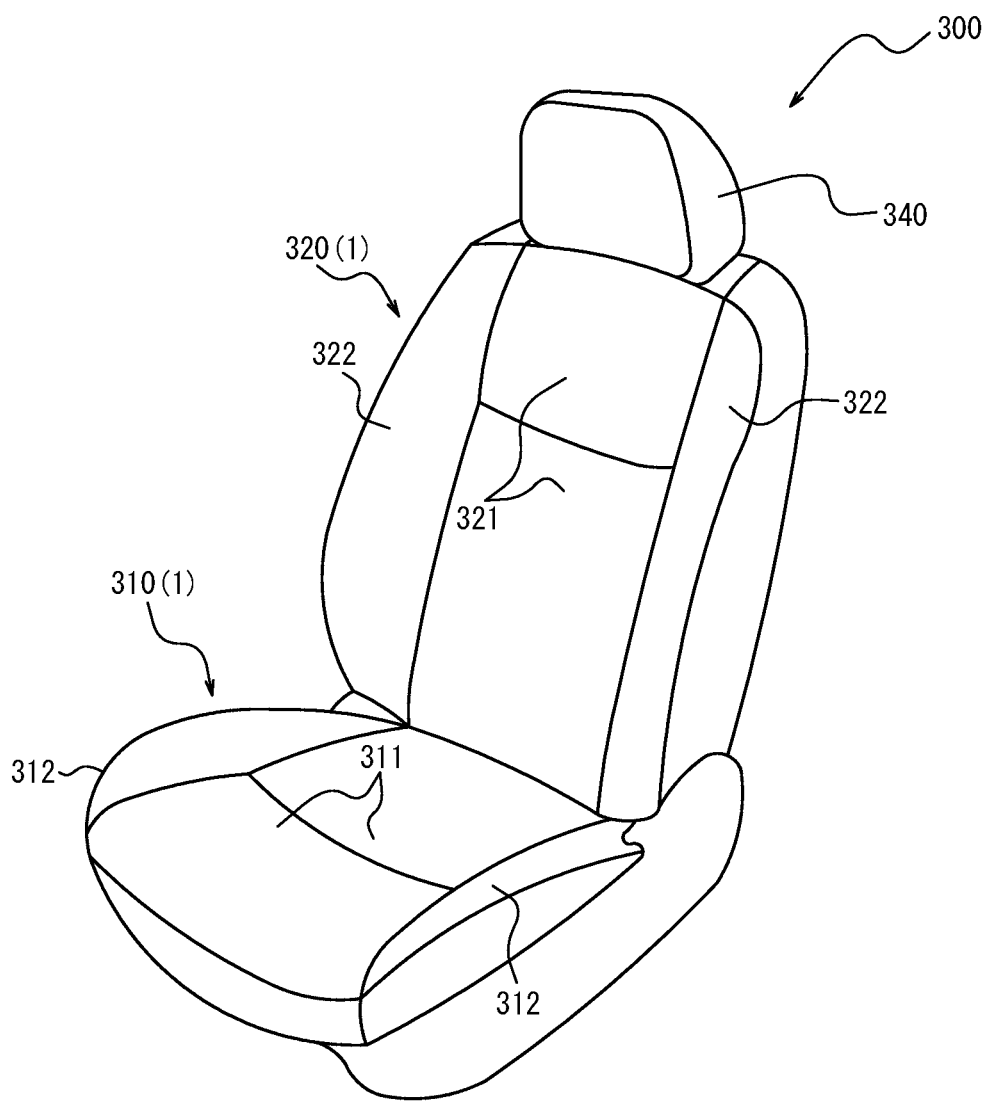
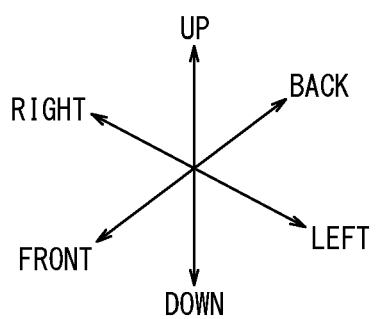

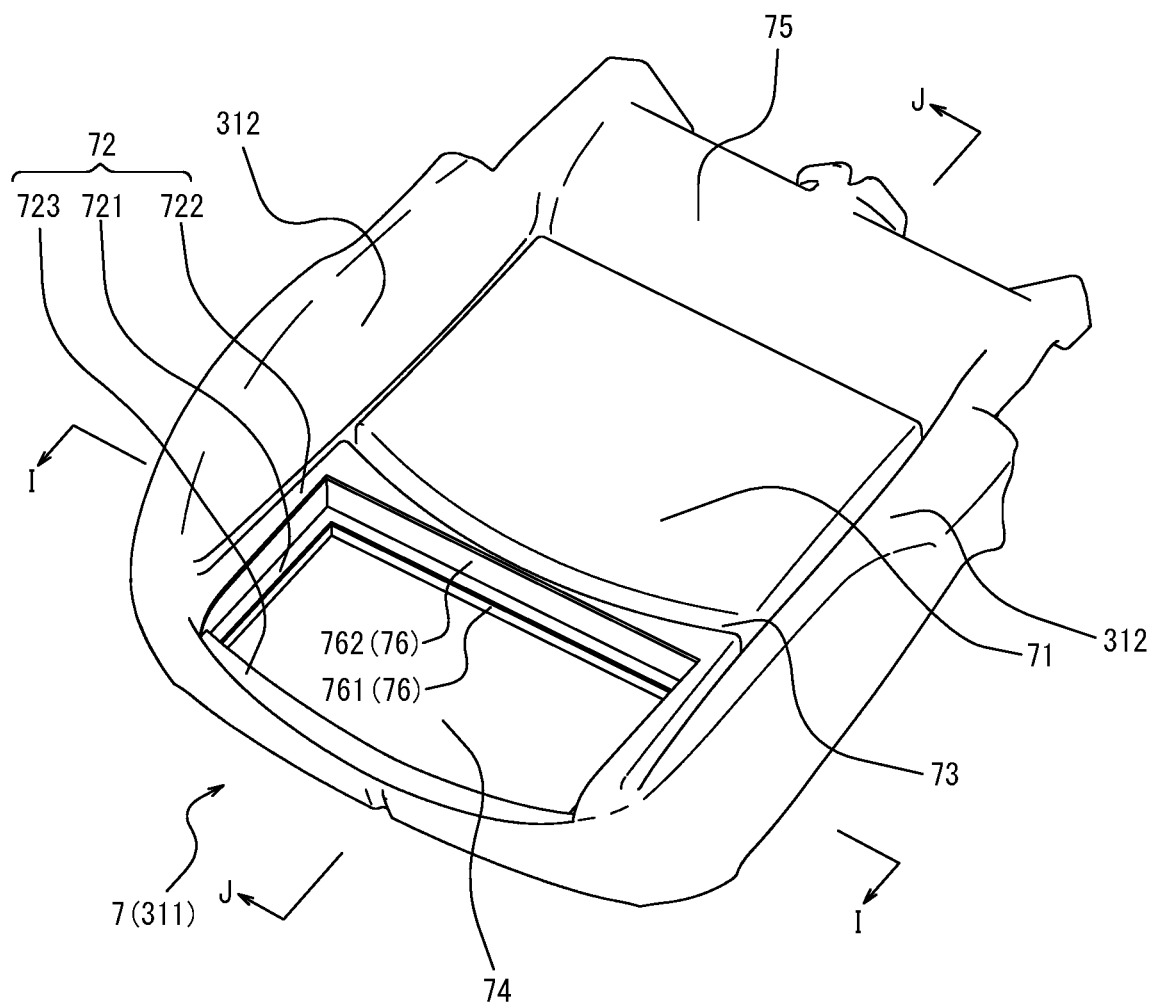
FIG. 14
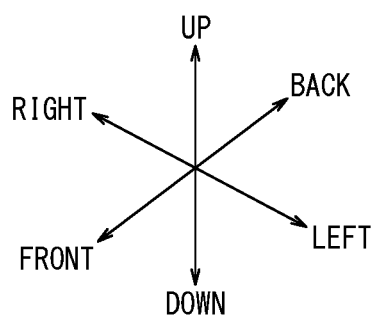

FIG. 18
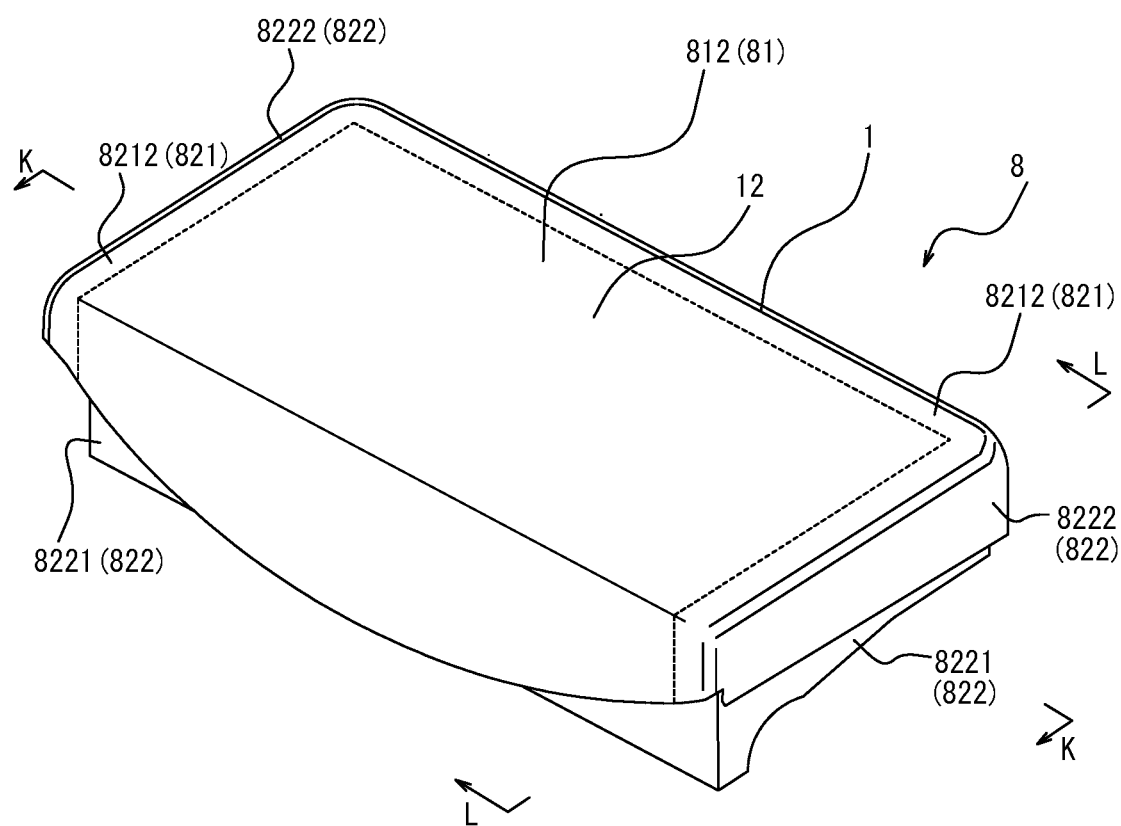
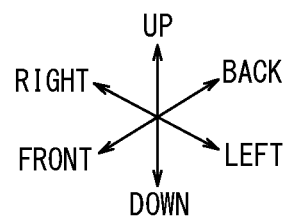

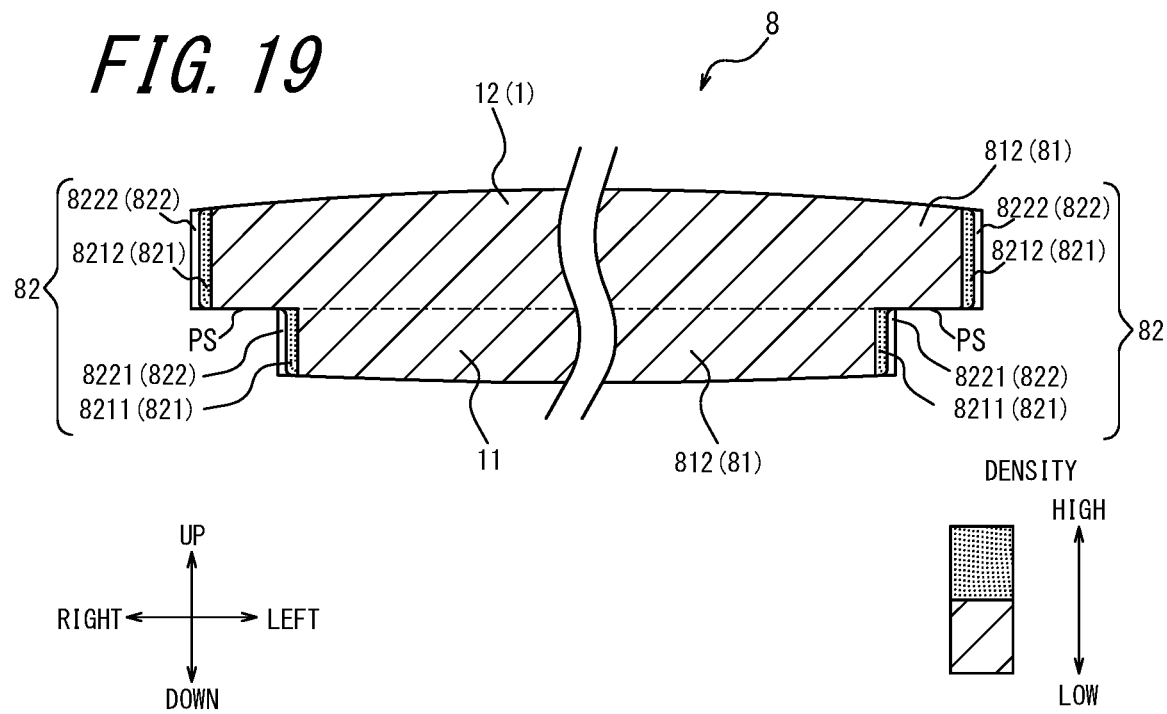
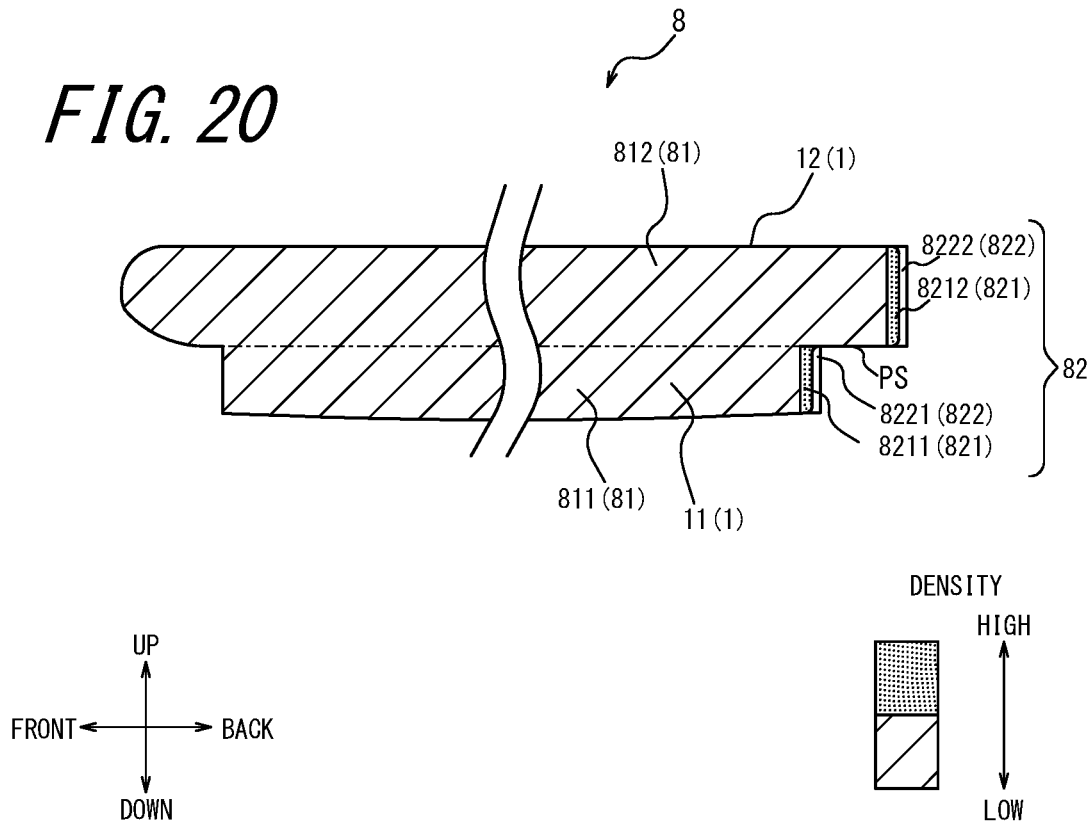

FIG. 25
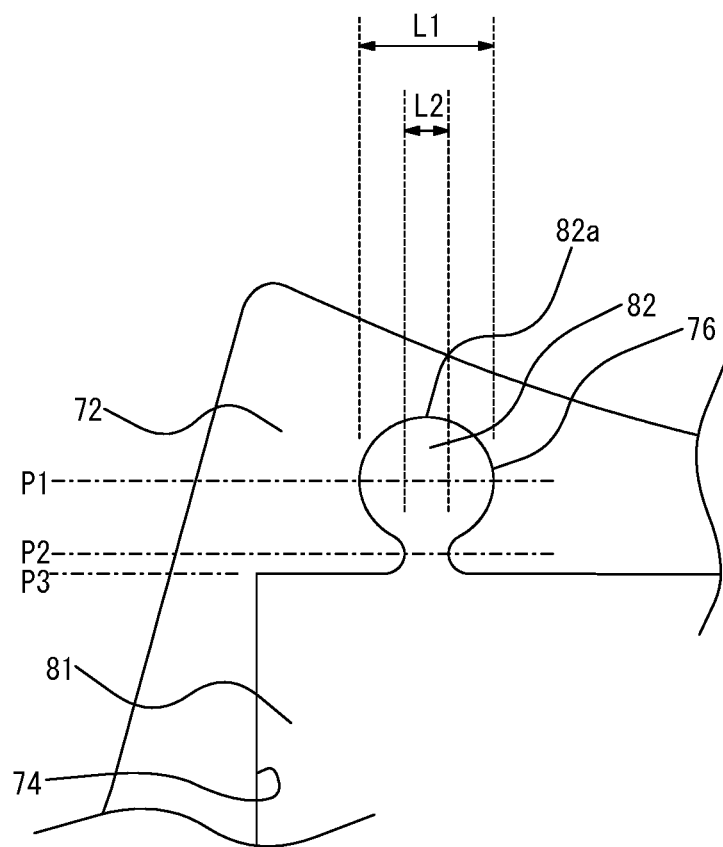
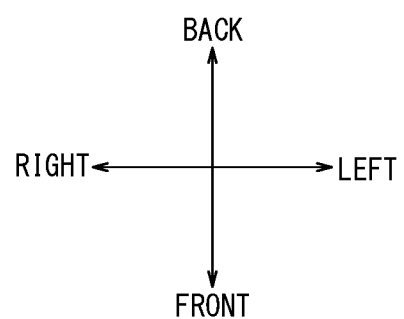

FIG. 27
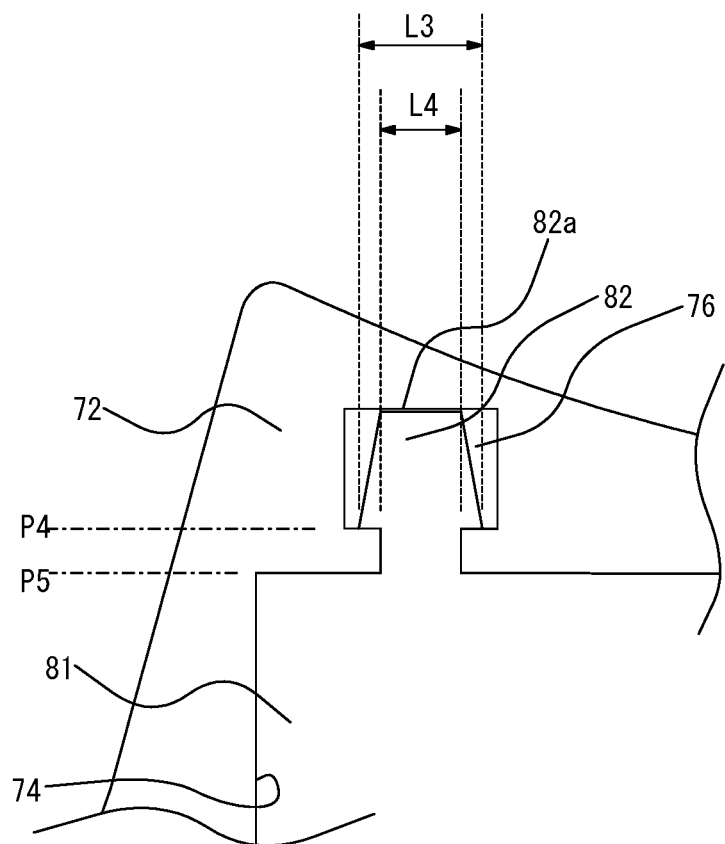
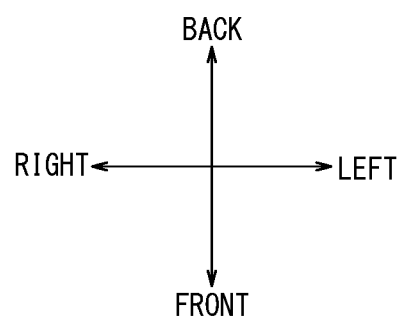

PASSENGER-SEAT-CUSHION-MEMBER MANUFACTURING METHOD, PASSENGER-SEAT CUSHION MEMBER, FILLING-BODY MANUFACTURING METHOD, AND FILLING BODY

TECHNICAL FIELD

The present disclosure relates to a passenger-seat-cushion-member manufacturing method, a passenger-seat cushion member, a filling-body manufacturing method, and a filling body.

BACKGROUND

Conventionally, a porous structural body (for example, urethane foam) having a cushioning characteristic has been manufactured through a process of foaming by chemical reaction in, for example, mold shaping (for example, PTL 1). Also, a filling body including such a porous structural body as described above may be filled in a seat body, for example, to partially adjust characteristics of a passenger-seat cushion member.

The present application is based on and claims the benefit of priority of Japanese Patent Application No. 2019-76047 filed on Apr. 12, 2019 in Japan; the entire contents of which are incorporated hereby by reference.

CITATION LIST

Patent Literature

PTL 1: Japanese Patent Laid-Open No. 2016-44292

SUMMARY

Technical Problem

However, when a porous structural body is manufactured through a process of foaming by chemical reaction as described above, the porous structural body entirely has a substantially uniform cushioning characteristic, and it is not easy to attach a filling body including the porous structural body firmly to a seat body, due to softness accompanied by the cushioning characteristic. Also, it is desirable to easily attach the filling body to the seat body.

The present disclosure is intended to provide a passenger-seat-cushion-member manufacturing method capable of obtaining a passenger-seat cushion member including a filling body that includes a porous structural body and is easily and firmly attachable to a seat body, a passenger-seat cushion member including a filling body that includes a porous structural body and is easily and firmly attachable to a seat body, a filling-body manufacturing method capable of obtaining a filling body including a porous structural body and being easily and firmly attachable to a seat body, and a filling body including a porous structural body and being easily and firmly attachable to a seat body.

Solution to Problem

A passenger-seat-cushion-member manufacturing method of the present disclosure is:
a passenger-seat-cushion-member manufacturing method of manufacturing a passenger-seat cushion member including a seat body, and a filling body that fills a hole part formed at the seat body,
the seat body including a seat body side coupling part including mechanical coupling means that couples to the filling body,
the filling body including a body part including a porous structural body made of flexible resin or rubber, and a filling body side coupling part disposed adjacent to the body part and including mechanical coupling means that couples to the seat body side coupling part, at least part of the filling body side coupling part including the porous structural body,
a density of a portion including the porous structural body in the filling body side coupling part being higher than a density of the body part, the manufacturing method including:
a step of shaping the porous structural body by using a 3D printer; and
a step of coupling the filling body side coupling part including the shaped porous structural body to the seat body side coupling part, to fill the seat body with the filling body.

A passenger-seat cushion member of the present disclosure is:
a passenger-seat cushion member including a seat body, and a filling body that fills a hole part formed at the seat body, wherein the seat body includes a seat body side coupling part including mechanical coupling means that couples to the filling body,
the filling body includes a body part including a porous structural body made of flexible resin or rubber, and a filling body side coupling part disposed adjacent to the body part and including mechanical coupling means that couples to the seat body side coupling part, at least part of the filling body side coupling part including the porous structural body,
a density of a portion including the porous structural body in the filling body side coupling part is higher than a density of the body part, the filling body side coupling part is coupled to the seat body side coupling part, and
the porous structural body is shaped by using a 3D printer.

A filling-body manufacturing method of the present disclosure is:
a method of manufacturing a filling body that fills a hole part formed at a seat body in a passenger-seat cushion member including the seat body and the filling body,
the filling body including a body part including a porous structural body made of flexible resin or rubber, and a filling body side coupling part disposed adjacent to the body part and including mechanical coupling means that couples to the seat body, at least part of the filling body side coupling part including the porous structural body,
a density of a portion including the porous structural body in the filling body side coupling part being higher than a density of the body part,
the manufacturing method including:
a step of shaping the porous structural body by using a 3D printer.

A filling body of the present disclosure is:
a filling body that fills a hole part formed at a seat body in a passenger-seat cushion member including the seat body and the filling body, wherein
the filling body includes a body part including a porous structural body made of flexible resin or rubber, and a filling body side coupling part disposed adjacent to the body part and including mechanical coupling means that couples to the seat body, at least part of the filling body side coupling part including the porous structural body,
a density of a portion including the porous structural body in the filling body side coupling part is higher than a density of the body part, and the porous structural body is shaped by using a 3D printer.

Advantageous Effect

According to the present disclosure, it is possible to provide a passenger-seat-cushion-member manufacturing method capable of obtaining a passenger-seat cushion member including a filling body that includes a porous structural body and is easily and firmly attachable to a seat body, a passenger-seat cushion member including a filling body that includes a porous structural body and is easily and firmly attachable to a seat body, a filling-body manufacturing method capable of obtaining a filling body including a porous structural body and being easily and firmly attachable to a seat body, and a filling body including a porous structural body and being easily and firmly attachable to a seat body.

BRIEF DESCRIPTION OF THE DRAWINGS

In the accompanying drawings:

FIG. 12 is a perspective view illustrating a car seat pad that is a passenger-seat cushion member according to an embodiment of the present disclosure;

FIG. 14 is a perspective view illustrating a seat body in the main pad in FIG. 13;

FIG. 18 is a perspective view illustrating a filling body in the main pad in FIG. 13;

FIG. 19 is a K-K cross-sectional view of the filling body in FIG. 18;

FIG. 20 is an L-L cross-sectional view of the filling body in FIG. 18;

FIG. 25 is an enlarged top view of part P in FIG. 24;

FIG. 27 is an enlarged top view of part Q in FIG. 26;

DETAILED DESCRIPTION

Figure 1:
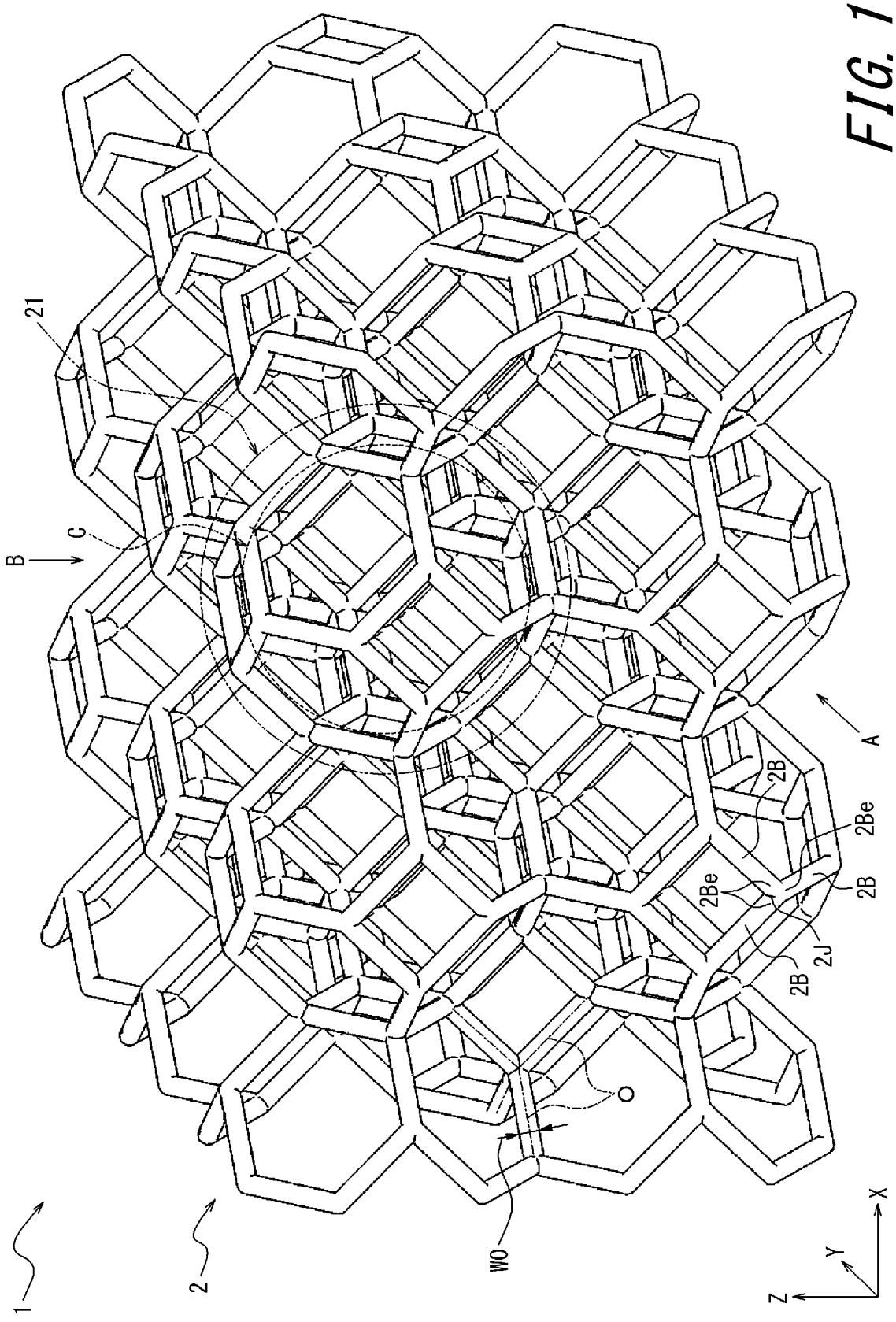
FIG. 1 is a perspective view illustrating part of an example of a porous structural body that can be included in a passenger-seat-cushion-member filling body according to an embodiment of the present disclosure.

A passenger-seat cushion member manufactured by using a passenger-seat-cushion-member manufacturing method according to the present disclosure and a passenger-seat cushion member according to the present disclosure may be included in an optional type of passenger-seat cushion member, are preferably included in, for example, a vehicle-seat cushion member, and are more preferably included in a car seat pad.

Embodiments of a passenger-seat-cushion-member manufacturing method, a passenger-seat cushion member, a filling-body manufacturing method, and a filling body according to the present disclosure will be exemplarily described below with reference to the accompanying drawings.

Any common component in the drawings will be denoted with the same reference-sign.

Also, FIGS. 1 to 11 illustrate the orientation of an XYZ orthogonal coordinate system fixed to a porous structural body to facilitate understanding of the orientation of the porous structural body.

First, the porous structural body included in the car seat pad that is the passenger-seat cushion member according to an embodiment of the present disclosure will be described with reference to FIGS. 1 to 4.

Figure 2:
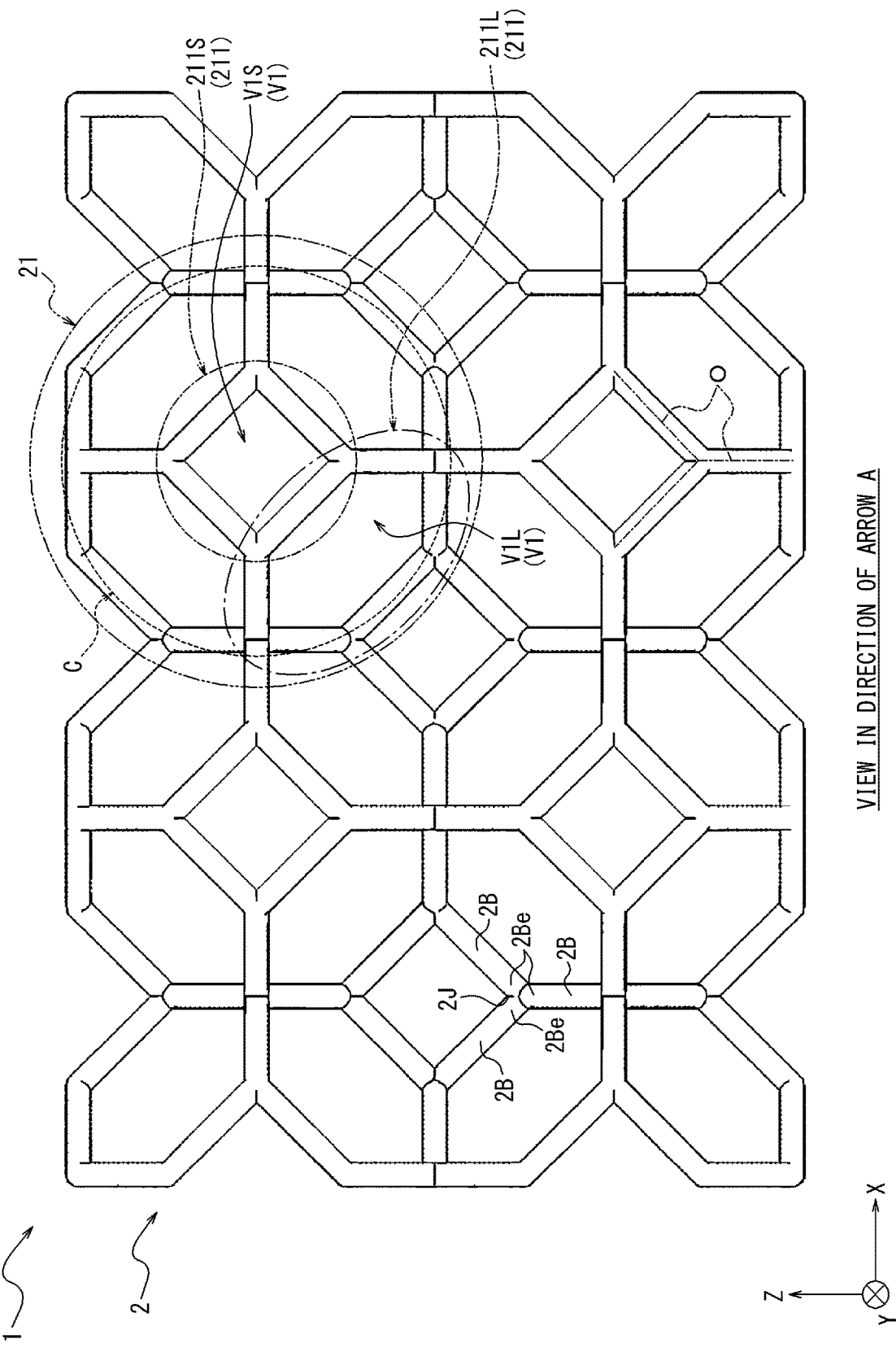
FIG. 2 is an A-arrow view illustrating the porous structural body in FIG. 1 being viewed in the direction of arrow A in FIG. 1.
Figure 3:
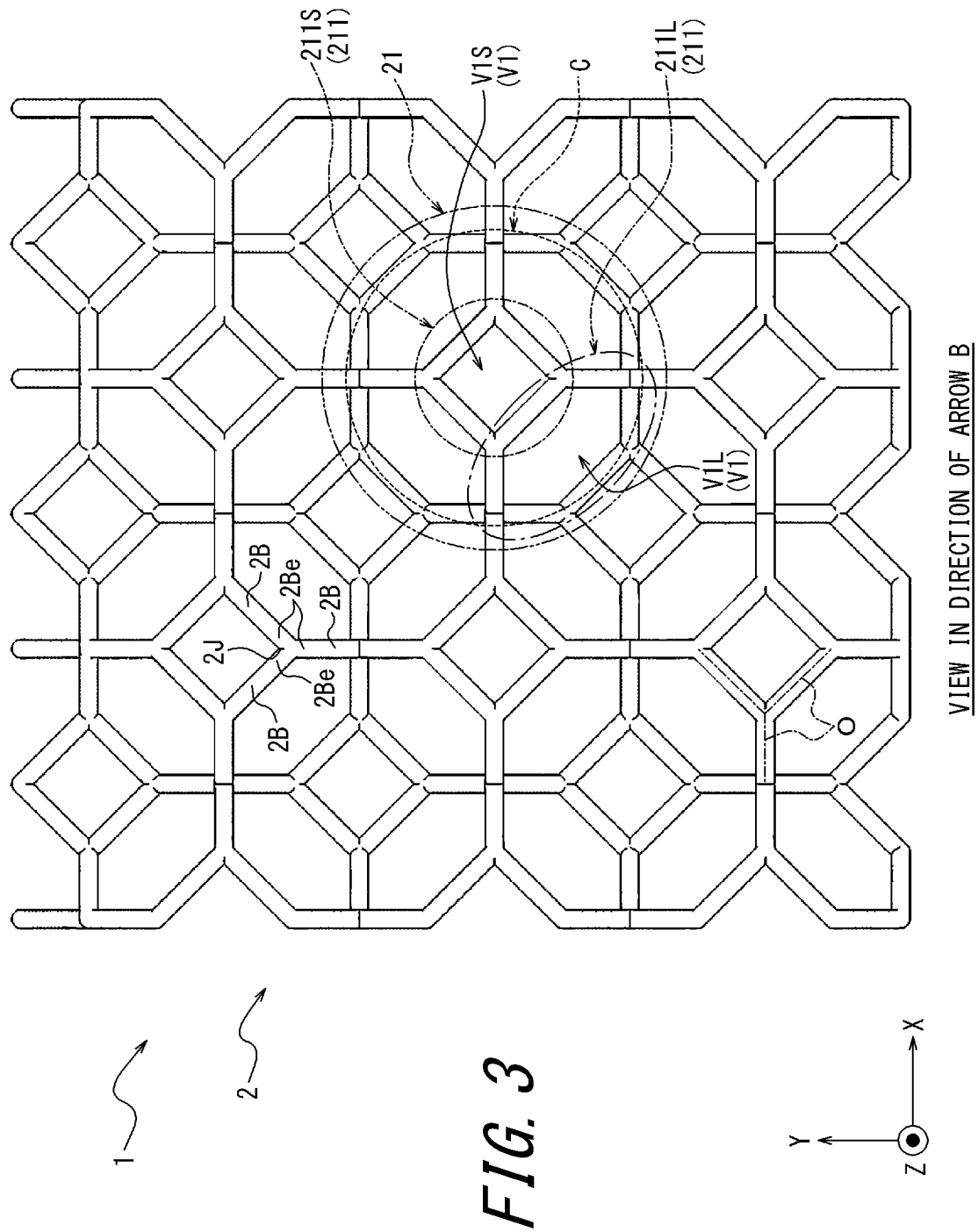
FIG. 3 is a B-arrow view illustrating the porous structural body in FIG. 1 being viewed in the direction of arrow B in FIG. 1.

In FIGS. 1 to 3, a portion having a substantially rectangular parallelepiped outer shape in a porous structural body 1 in the present embodiment is viewed at different angles, respectively. FIG. 1 is a perspective view illustrating the corresponding portion of the porous structural body 1. FIG. 2 is an A-arrow view illustrating the portion of the porous structural body 1 in FIG. 1 being viewed in the direction (Y-direction) of arrow A. FIG. 3 is a B-arrow view of the portion of the porous structural body 1 in FIG. 1 being viewed in the direction (−Z direction) of arrow B.

The porous structural body 1 is shaped by a 3D printer. The entire porous structural body 1 is integrated. Since the porous structural body 1 is manufactured by using the 3D printer, the porous structural body can be easily manufactured as compared to a case where the porous structural body undergoes a process of foaming by chemical reaction as in conventional cases, and a desired configuration can be obtained. In addition, it can be expected that manufacturing by the 3D printer can be achieved at low cost in a shorter time in the future due to upcoming progress of 3D printer technologies.

The porous structural body 1 is made of flexible resin or rubber. More specifically, the porous structural body 1 includes a skeleton part 2 as a skeleton of the porous structural body 1. The skeleton part 2 zones a large number of cell holes C. The skeleton part 2 exists in substantially the entire porous structural body 1, and is made of flexible resin or rubber. In the present example, a portion of the porous structural body 1 other than the skeleton part 2 is a void space, and in other words, the porous structural body 1 only includes the skeleton part 2.

Here, the "flexible resin" is resin that can deform when external force is applied, and is preferably, for example, elastomer resin, more preferably polyurethane, further more preferably soft polyurethane. The rubber is, for example, natural rubber or synthetic rubber. The porous structural body 1, which is made of flexible resin or rubber, can perform compressing and restoring deformation in accordance with application and cancellation of external force and can have a cushioning characteristic.

Note that, for the easiness of manufacturing by the 3D printer, the porous structural body 1 is more preferably made of flexible resin than made of rubber.

As illustrated in FIGS. 1 to 3, the skeleton part 2 of the porous structural body 1 includes a plurality of bone parts 2B and a plurality of connection parts 2J, and the entire skeleton part 2 is integrated. Each bone part 2B has a column shape in the present example, and extends straight in the present example. Each connection part 2J connects end parts 2Be in extension directions of a plurality of (for example, four) bone parts 2B extending in directions different from each other, at a place where the end parts 2Be are adjacent to each other.

FIGS. 1 to 3 illustrate a skeleton line O of the skeleton part 2 in the part of the porous structural body 1 with a dashed line. The skeleton line O of the skeleton part 2 includes a skeleton line O of each bone part 2B and a skeleton line O of each connection part 2J. The skeleton line O of the bone part 2B is a central axis of the bone part 2B. The skeleton line O of the connection part 2J is an extended line part obtained when the central axes of bone parts 2B connected with the connection part 2J smoothly extend into the connection part 2J and are coupled with each other.

The extension direction of each bone part 2B is an extension direction of the skeleton line O of the bone part 2B (a portion corresponding to the bone part 2B in the skeleton line O; this is same in the following).

The porous structural body 1, which substantially entirely includes the skeleton part 2, can perform compressing and restoring deformation in accordance with application and cancellation of external force while ensuring breathability, and thus has excellent characteristics as the passenger-seat cushion member. Moreover, the porous structural body 1 has a simple structure and thus can be easily shaped by the 3D printer.

Note that some or all bone parts 2B of the respective bone parts 2B included in the skeleton part 2 may extend in curved shapes. In this case, since some or all bone parts 2B are curved, it is possible to prevent abrupt shape change of the bone parts 2B and thus the porous structural body 1 and reduce local buckling at input of force.

In the present example, the respective bone parts 2B included in the skeleton part 2 have substantially same shape and length. However, the present disclosure is not limited to the present example, and the shapes and/or lengths of the bone parts 2B included in the skeleton part 2 may not be same, and for example, the shapes and/or lengths of some bone parts 2B may be different from those of the other bone parts 2B. In this case, different machine characteristics can be intentionally obtained by differentiating the shape and/or length of the bone part 2B at a particular portion of the skeleton part 2 from the other part.

In the present example, a width W0 (FIG. 1) and a cross-sectional area of each bone part 2B are constant over an entire length of the bone part 2B (i.e., uniform along the extension direction of the bone part 2B).

Here, the cross-sectional area of the bone part 2B is a cross-sectional area of a cross section of the bone part 2B that is perpendicular to the skeleton line O. Also, the width W0 (FIG. 1) of the bone part 2B is a maximum width in the cross section, when measured along the cross section of the bone part 2B that is perpendicular to the skeleton line O.

However, in each example described in the present specification, in some or all bone parts 2B of the respective bone parts 2B included in the skeleton part 2, the width W0 and/or the cross-sectional area of each bone part 2B may be nonuniform along the extension direction of the bone part 2B. For example, in a portion including the end part 2Be on each side of the bone part 2B in the extension direction of each of some or all bone parts 2B of the respective bone parts 2B included in the skeleton part 2, the width W0 of the bone part 2B may gradually increase or decrease as the position moves toward each end of the bone part 2B in the extension direction. Also, in the portion including the end part 2Be on each side of the bone part 2B in the extension direction of each of some or all bone parts 2B of the respective bone parts 2B included in the skeleton part 2, the cross-sectional area of the bone part 2B may gradually increase or decrease as being toward each end of the bone part 2B in the extension direction.

In each example described in the present specification, for the simple structure of the skeleton part 2 and thus for the easiness of manufacturing the porous structural body 1 by the 3D printer, the width W0 (FIG. 1) of the bone part 2B is preferably 0.05 mm or larger, more preferably 0.10 mm or larger. Shaping can be performed at resolution of the 3D printer with high performance when the width W0 is 0.05 mm or larger, and the shaping can be performed not only at the resolution of the 3D printer with the high performance but also at the resolution of a general-purpose 3D printer when the width is 0.10 mm or larger.

On the other hand, to improve accuracy of an outer edge (outer outline) shape of the skeleton part 2, reduce a gap (interval) between the cell holes C, and have excellent characteristics as the cushion member, the width W0 of the bone part 2B is preferably 2.0 mm or smaller.

Note that each bone part 2B included in the skeleton part 2 preferably satisfies the above-described configuration, but only some bone parts 2B of the respective bone parts 2B included in the skeleton part 2 may satisfy the above-described configuration, and in this case as well, the same effects can be obtained to some different extent.

In the present example, each bone part 2B included in the skeleton part 2 has a column shape, and has a circle (exact circle) cross-sectional shape.

Consequently, the skeleton part 2 has a simple structure and thus can be easily shaped by the 3D printer. Moreover, machine characteristics of typical polyurethane foam manufactured through the process of foaming by chemical reaction can be easily reproduced. Since each bone part 2B has the column shape in this manner, durability of the skeleton part 2 can be improved as compared to a case where the bone part 2B is replaced with a thin film part.

Note that a cross-sectional shape of each bone part 2B is a shape at a cross section perpendicular to the central axis (skeleton line O) of the bone part 2B.

Note that the present disclosure is not limited to the present example, and only some bone parts 2B of the respective bone parts 2B included in the skeleton part 2 may satisfy the above-described configuration, and in this case as well, the same effects can be obtained to some different extent.

For example, in each example described in the present specification, in all or some bone parts 2B of the respective bone parts 2B included in the skeleton part 2, the cross-sectional shape of each bone part 2B may be a polygon (a regular triangle, a triangle other than the regular triangle, a rectangle or the like) or may be a circle (an ellipse or the like) other than an exact circle, and in this case as well, effects same as those of the present example can be obtained. Also, the cross-sectional shapes of the bone parts 2B may be uniform along the extension direction, or nonuniform along the extension direction. Further, the respective bone parts 2B may be different from each other in cross-sectional shape.

In the present example, the skeleton part 2 includes a plurality of cell zoning parts 21 that each zone the cell hole C inside (in the number of cell holes C).

Figure 4:
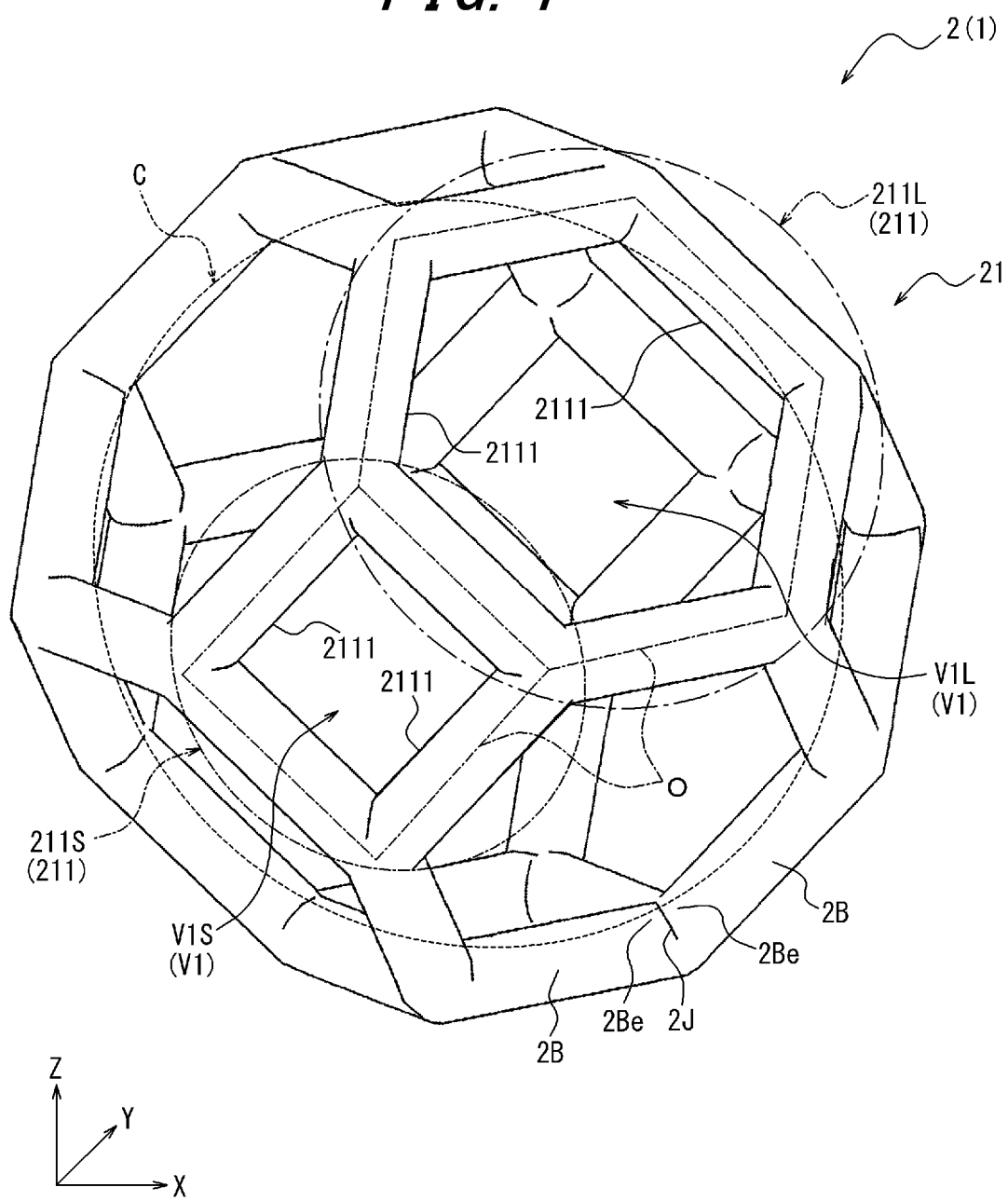
FIG. 4 is a perspective view illustrating a cell zoning part of the porous structural body in FIG. 1.

FIG. 4 illustrates one cell zoning part 21 alone. In the skeleton part 2 of the present example, a large number of cell zoning parts 21 have a structure in a row in each of X, Y and Z-directions.

As illustrated in FIGS. 1 to 3, each cell zoning part 21 includes a plurality of (in the present example, 14) annular parts 211. Each annular part 211 has an annular shape, and an annular inner periphery side edge part 2111 thereof zones a virtual surface V1 that is flat. The plurality of annular parts 211 included in the cell zoning part 21 are coupled with each other so that the virtual surfaces V1 zoned by the respective inner periphery side edge parts 2111 thereof do not intersect with each other.

Each cell hole C is zoned by the plurality of annular parts 211 included in the cell zoning part 21, and the plurality of virtual surfaces V1 zoned by the plurality of annular parts 211, respectively. Schematically, each annular part 211 is a portion that zones a side of a stereoscopic shape of the cell hole C, and each virtual surface V1 is a portion that zones a constituent face with the stereoscopic shape of the cell hole C.

Each annular part 211 includes a plurality of bone parts 2B and a plurality of connection parts 2J connecting the end parts 2Be of the plurality of bone parts 2B.

A coupling portion of each pair of annular parts 211 coupled with each other includes one bone part 2B and a pair of connection parts 2J at both sides thereof, which are shared by the pair of annular parts 211. That is, each bone part 2B and each connection part 2J are shared by the plurality of adjacent annular parts 211.

For each virtual surface V1, a surface of the virtual surface V1 (a front surface of the virtual surface V1) on one side zones part of a cell hole C, and a surface of the virtual surface V1 (a back surface of the virtual surface V1) on the other side zones part of another cell hole C. In other words, both the front and back surfaces of each virtual surface V1 zone parts of cell holes C different from each other. Further, in other words, each virtual surface V1 is shared by a pair of cell holes C adjacent to the virtual surface V1 (i.e., a pair of cell holes C sandwiching the virtual surface V1 therebetween).

Also, each annular part 211 is shared by a pair of cell zoning parts 21 adjacent to the annular part 211 (i.e., a pair of cell zoning parts 21 sandwiching the annular part 211 therebetween). In other words, each annular part 211 serves as parts of a pair of cell zoning parts 21 adjacent to each other.

In the present example, each virtual surface V1 is not covered with an after-mentioned film 3 (FIG. 5) but is opened, in other words, has an opening. Thus, the cell holes C communicate with each other through the virtual surface V1 to allow ventilation between the cell holes C. Accordingly, breathability of the skeleton part 2 can be improved, and compressing and restoring deformation of the skeleton part 2 in accordance with application and cancellation of external force can be easily performed.

As illustrated in FIG. 4, in the present example, the skeleton line O of each cell zoning part 21 has a polyhedral shape, and hence, each cell hole C has a substantially polyhedral shape. More specifically, in the example of FIGS. 1 to 3, the skeleton line O of each cell zoning part 21 has a Kelvin's tetradecahedral (truncated octahedral) shape, and hence, each cell hole C has a substantially Kelvin's tetradecahedral (truncated octahedral) shape. A Kelvin's tetradecahedron (truncated octahedron) is a polyhedron including six square constituent faces and eight regular hexagonal constituent faces. Schematically, the cell holes C included in the skeleton part 2 are regularly arrayed to spatially fill an internal space surrounded by an outer edge (outer outline) of the skeleton part 2 (i.e., so that the respective cell holes C are paved without any wasted gaps, further in other words, to reduce each gap (interval) among the cell holes C).

When the skeleton line O of each of some or all (in the present example, all) cell zoning parts 21 of the skeleton part 2 has a polyhedral shape (i.e., the shape of each of some or all (in the present example, all) cell holes C of the skeleton part 2) as in the present example, each gap (interval) among the cell holes C included in the skeleton part 2 can be further reduced, and a larger number of cell holes C can be formed inside the skeleton part 2. Also, with this configuration, behavior of the compressing and restoring deformation of the skeleton part 2 (i.e., the porous structural body 1) in accordance with the application and cancellation of external force is more favorable as a cushion member for a passenger seat, especially as a car seat pad.

The polyhedron shape of the skeleton line O of the cell zoning part 21 (i.e., the polyhedron shape of the cell hole C) is not limited to the present example and may be optional. For example, a configuration where the shape of the skeleton line O of the cell zoning part 21 (i.e., the shape of the cell hole C) is a substantially tetrahedral, substantially octahedral, or substantially dodecahedral shape is preferable to reduce each gap (interval) among the cell holes C. Alternatively, the shape of the skeleton line O of each of some or all cell zoning parts 21 of the skeleton part 2 (i.e., the shape of some or all cell holes C of the skeleton part 2) may be a stereoscopic shape (e.g., a sphere, an ellipsoid, or a cylinder) other than a substantially polyhedral shape. Also, the skeleton part 2 may include, as the cell zoning parts 21, only the cell zoning parts 21 of one kind having the skeleton line O with the same shape or may include cell zoning parts 21 of a plurality of kinds having the skeleton lines O with different shapes. Similarly, the skeleton part 2 may include, as the cell holes C, only the cell holes C of one kind having the same shape, or may include cell holes C of a plurality of kinds having different shapes. Note that when the shape of the skeleton line O of each cell zoning part 21 (i.e., the shape of each cell hole C) is substantially Kelvin's tetradecahedral (truncated octahedral) as in the present example, cushion-member characteristics equivalent to those of typical polyurethane foam manufactured through the process of foaming by chemical reaction can be most easily reproduced as compared to another shape.

As illustrated in FIGS. 1 to 4, in the present example, each of the plurality of (in the present example, 14) annular parts 211 included in the cell zoning part 21 includes one or a plurality of (in the present example, six) small annular parts 211S and one or a plurality of (in the present example, eight) large annular parts 211L. The annular inner periphery side edge part 2111 of each small annular part 211S zones a small virtual surface V1S. The annular inner periphery side edge part 2111 of each large annular part 211L zones a large virtual surface V1L having an area larger than that of the small virtual surface V1S.

As seen from FIG. 4, in the present example, the skeleton line O of each large annular part 211L has a regular hexagonal shape, and accordingly, the corresponding large virtual surface V1L also has a substantially regular hexagonal shape. Also, in the present example, the skeleton line O of each small annular part 211S has a square shape, and accordingly, the corresponding small virtual surface V1S also has a substantially square shape. Thus, in the present example, the small virtual surface V1S and the large virtual surface V1L are different from each other not only in area but also in shape.

Each large annular part 211L includes a plurality of (in the present example, six) bone parts 2B and a plurality of (in the present example, six) connection parts 2J connecting the end parts 2Be of the plurality of bone parts 2B. Each small annular part 211S includes a plurality of (in the present example, four) bone parts 2B and a plurality of (in the present example, four) connection parts 2J connecting the end parts 2Be of the plurality of bone parts 2B.

Since the plurality of annular parts 211 included in the cell zoning part 21 include the small annular part 211S and the large annular part 211L having different sizes, each gap (interval) among the cell holes C included in the skeleton part 2 can be further reduced. Moreover, when the shapes of the small annular part 211S and the large annular part 211L are different from each other as in the present example, each gap (interval) among the cell holes C included in the skeleton part 2 can be further reduced.

However, the plurality of annular parts 211 included in the cell zoning part 21 may have the same size and/or shape. When the respective annular parts 211 included in the cell zoning part 21 have the same size and shape, the same machine characteristics can be obtained in the respective X, Y and Z-directions.

When the skeleton lines O of some or all (in the present example, all) annular parts 211 of the respective annular parts 211 included in the cell zoning part 21 (i.e., some or all (in the present example, all) virtual surfaces V1 of the respective virtual surfaces V1 included in the cell zoning part 21) have a substantially polygonal shape as in the present example, the interval among the cell holes C included in the skeleton part 2 can be further reduced. Moreover, the behavior of compressing and restoring deformation of the skeleton part 2 in accordance with the application and cancellation of external force is more favorable as the cushion member for the passenger seat, especially as the car seat pad. Since the shape of each annular part 211 (i.e., the shape of each virtual surface V1) is simple, manufacturability and characteristic adjustment easiness can be improved. Note that the same effects can be obtained to some extent when at least one annular part 211 of the respective annular parts 211 included in the skeleton part 2 (i.e., at least one virtual surface V1 of the respective virtual surfaces V1 included in the skeleton part 2) satisfies the above-described configuration.

Note that the skeleton line O of at least one annular part 211 of the respective annular parts 211 included in the skeleton part 2 (i.e., at least one virtual surface V1 of the respective virtual surfaces V1 included in the skeleton part 2) may have an optional substantially polygonal shape other than a substantially regular hexagonal shape and a substantially square shape as in the present example or have a planar shape (e.g., a circle (such as an exact circle or an ellipse)) other than the substantially polygonal shape. When the shape of the skeleton line O of each annular part 211 (i.e., the shape of each virtual surface V1) is a circle (such as an exact circle, or an ellipse), the shape of each annular part 211 (i.e., the shape of the virtual surface V1) is simple. Therefore, the manufacturability and characteristic adjustment easiness can be improved, and more homogenous machine characteristics can be obtained. For example, when the shape of the skeleton line O of each annular part 211 (i.e., the shape of each virtual surface V1) is an ellipse (horizontally long ellipse) that is long in a direction substantially perpendicular to the direction of weight application, the annular part 211, that is, the skeleton part 2 (i.e., the porous structural body 1) easily deforms (softens) in response to input of force as compared to a case where the shape is an ellipse (vertically long ellipse) that is long in a direction substantially parallel to the direction of weight application.

In the present example, it is preferable that the skeleton part 2 includes at least one cell hole C having a diameter of 5 mm or larger. Accordingly, the porous structural body 1 can be easily manufactured by using the 3D printer. When the diameter of each cell hole C of the skeleton part 2 is smaller than 5 mm, the structure of the skeleton part 2 is so complicated that it is potentially difficult to generate, on a computer, three-dimensional shape data (such as CAD data) representing the three-dimensional shape of the porous structural body 1 or 3D shaping data generated based on the three-dimensional shape data.

Note that since a conventional porous structural body included in the passenger-seat cushion member is manufactured through the process of foaming by chemical reaction, it has not been possible to form the cell hole C having the diameter of 5 mm or larger.

In addition, since the skeleton part 2 includes the cell hole C having the diameter of 5 mm or larger, the breathability and deformation easiness of the skeleton part 2 can be easily improved.

For this reason, each of the diameters of all the cell holes C included in the skeleton part 2 is preferably 5 mm or larger.

As the diameter of each cell hole C increases, the porous structural body 1 (i.e., the passenger-seat cushion member) can be more easily manufactured by using the 3D printer and the breathability and deformation easiness can be more easily improved. For this reason, the diameter of at least one cell hole C (preferably, all the cell holes) in the skeleton part 2 is preferably 8 mm or larger, more preferably 10 mm or larger.

On the other hand, when each cell hole C in the skeleton part 2 is too large, it is difficult to cleanly (smoothly) form the outer edge (outer outline) shape of the skeleton part 2 (i.e., the porous structural body 1), which potentially leads to decreased shaping accuracy and degraded appearance of the passenger-seat cushion member. In addition, passenger-seat-cushion-member characteristics are potentially not sufficiently favorable. Thus, to improve the appearance and passenger-seat-cushion-member characteristics, the diameter of each cell hole C in the skeleton part 2 is preferably 30 mm or smaller, more preferably 25 mm or smaller, further more preferably 20 mm or smaller.

Note that the diameter of the cell hole C is the diameter of a circumscribed sphere of the cell hole C when the cell hole C has a shape different from a strictly spherical shape as in the present example.

When each cell hole C in the skeleton part 2 is too small, the structure of the skeleton part 2 becomes too complicated. As a result, it is potentially difficult to generate, on the computer, the three-dimensional shape data (such as the CAD data) representing the three-dimensional shape of the porous structural body 1 or the 3D shaping data to be generated based on the three-dimensional shape data, and even if the data can be generated, it is potentially difficult to perform the shaping by the 3D printer in accordance with the 3D shaping data. Therefore, it is difficult to manufacture the porous structural body 1 by using the 3D printer. To facilitate the manufacturing of the porous structural body 1 (i.e., the passenger-seat cushion member) by using the 3D printer, a diameter of a cell hole C of the respective cell holes C included in the skeleton part 2 and having a minimum diameter is preferably 0.05 mm or larger, more preferably 0.10 mm or larger. Shaping can be performed at the resolution of the 3D printer with the high performance when the diameter of the cell hole C having the minimum diameter is 0.05 mm or larger, and shaping can be performed not only at the resolution of the 3D printer with the high performance but also at the resolution of the general-purpose 3D printer when the diameter is 0.10 mm or larger.

Figure 5:
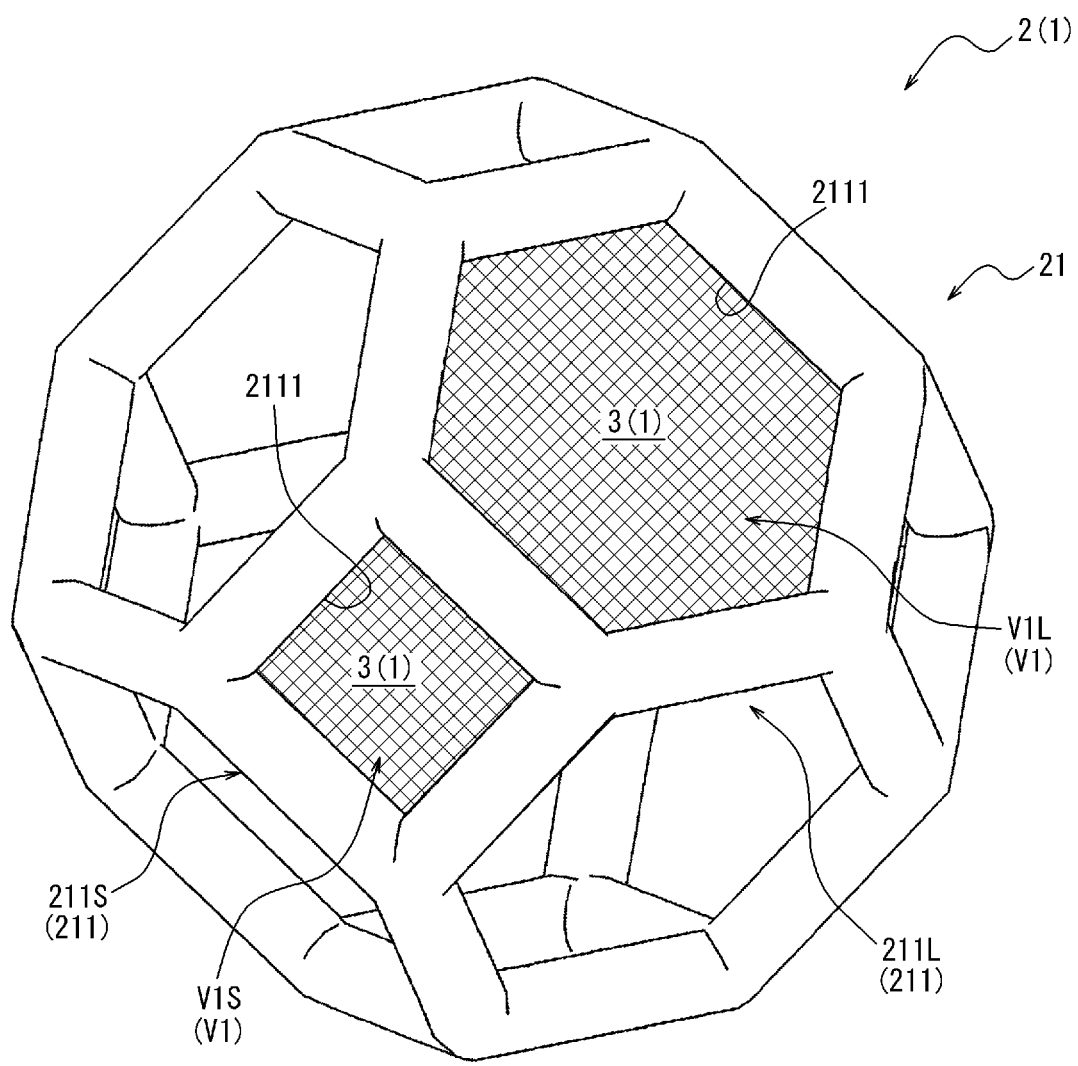
FIG. 5 is a drawing corresponding to FIG. 4, and an explanatory view of a modification of the cell zoning part.

FIG. 5 is an explanatory view of a modification of the cell zoning part 21 of the porous structural body 1, and a drawing corresponding to FIG. 4. In each example described in the present specification, the porous structural body 1 may include one or a plurality of films 3 in addition to the skeleton part 2 as in the modification illustrated in FIG. 5.

Each film 3 extends on the virtual surface V1 zoned by the annular inner periphery side edge part 2111 of the annular part 211, and accordingly covers the virtual surface V1 zoned by the annular part 211. In the porous structural body 1 in the example of FIG. 5, at least one of the respective virtual surfaces V1 included in the skeleton part 2 is covered with the film 3. The film 3 is made of the same material as in the skeleton part 2 and integrated with the skeleton part 2. In the example of FIG. 5, the film 3 is flatly formed. However, the film 3 may be formed non-flatly (e.g., in a curved manner (as a curved surface)).

It is preferable that the film 3 has a thickness smaller than the width W0 (FIG. 1) of the bone part 2B.

The film 3 prevents communication between two cell holes C sandwiching the virtual surface V1 therebetween through the virtual surface V1, and ventilation through the virtual surface V1 is not possible. Accordingly, the breathability of the porous structural body 1 as a whole degrades. The breathability of the whole porous structural body 1 can be adjusted by adjusting the number of virtual surfaces V1 included in the porous structural body 1 and covered with the film 3, and various breathability levels can be achieved as required. For example, when the porous structural body 1 is used for the passenger-seat cushion member, performance of an in-vehicle air conditioner, anti-stuffiness, and ride comfort can be increased by adjusting the breathability of the porous structural body 1. To increase the performance of the in-vehicle air conditioner, anti-stuffiness, and ride comfort when the porous structural body 1 is used for the passenger-seat cushion member, it is not preferable that all the virtual surfaces V1 included in the porous structural body 1 are covered with the film 3, in other words, it is preferable that at least one of the respective virtual surfaces V1 included in the porous structural body 1 is not covered with the film 3 and is opened.

Note that since the conventional porous structural body has been manufactured through the process of foaming by chemical reaction as described above, it has been difficult to form, at desired positions, a desired number of films for communication holes through which cells communicate with one another. When the porous structural body 1 (i.e., the passenger-seat cushion member) is manufactured by the 3D printer as in the present example, information of the film 3 is included in advance in the 3D shaping data to be read by the 3D printer, and thus the desired number of films 3 can be reliably formed at the desired positions.

For the same reason, at least one of the respective small virtual surfaces V1S included in the skeleton part 2 may be covered with the film 3. Additionally, or alternatively, at least one of the respective large virtual surfaces V1L included in the skeleton part 2 may be covered with the film 3.

To increase the performance of the air conditioner, anti-stuffiness, and ride comfort when the porous structural body 1 is used for the passenger-seat cushion member in each example described in the present specification, the breathability of the porous structural body 1 is preferably 100 to 700 $cc/cm^2/sec$, more preferably 150 to 650 $cc/cm^2/sec$, further more preferably 200 to 600 $cc/cm^2/sec$. Here, the breathability ($cc/cm^2/sec$) of the porous structural body 1 is measured in conformity with JIS K 6400-7. When the porous structural body 1 is used for the passenger-seat cushion member, resonance magnification of the porous structural body 1 is preferably three or larger and smaller than eight, more preferably three or larger and five or smaller.

Figure 6:
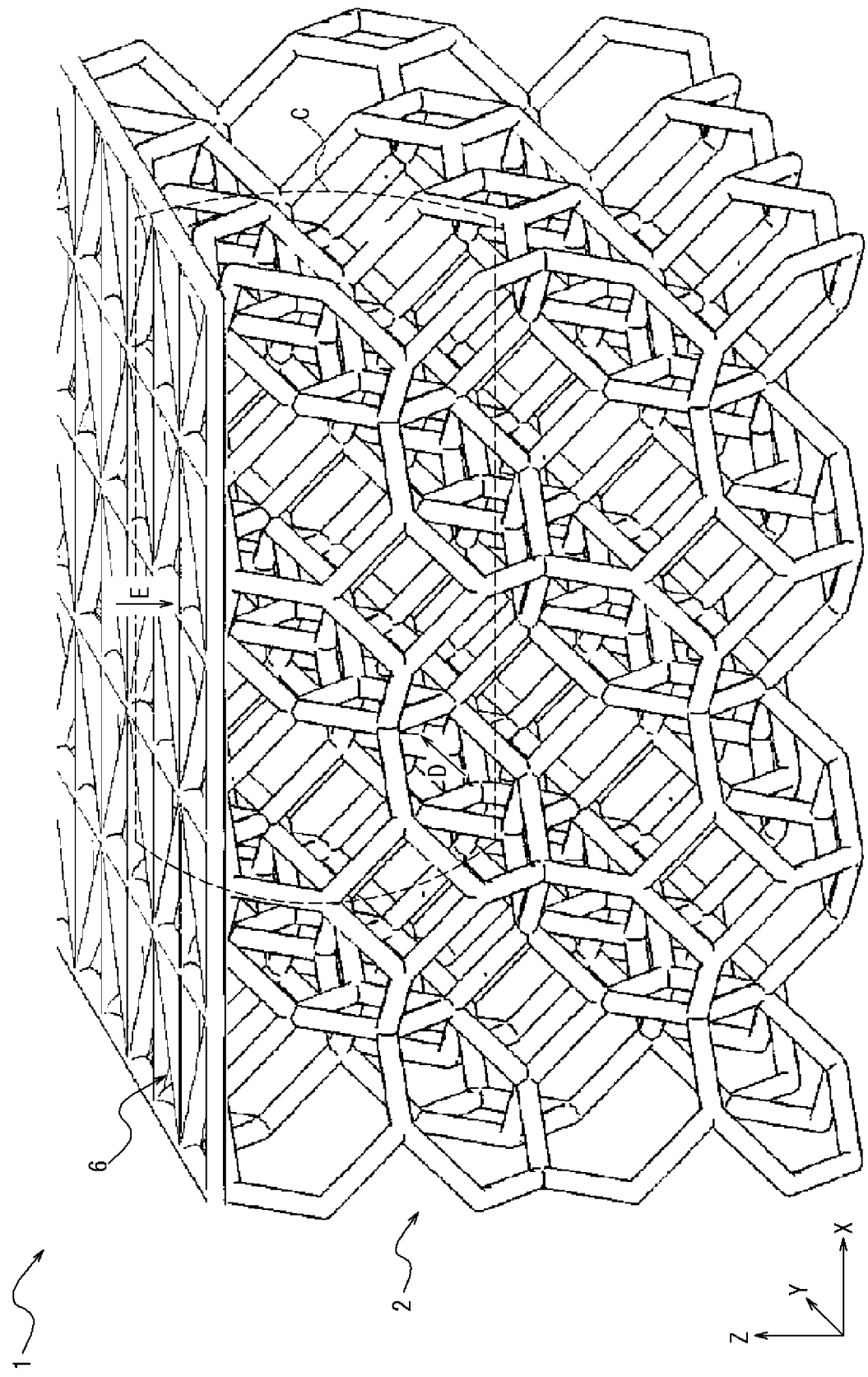
FIG. 6 is a drawing corresponding to FIG. 1, and a perspective view illustrating part of a first modification of the porous structural body.
Figure 7:
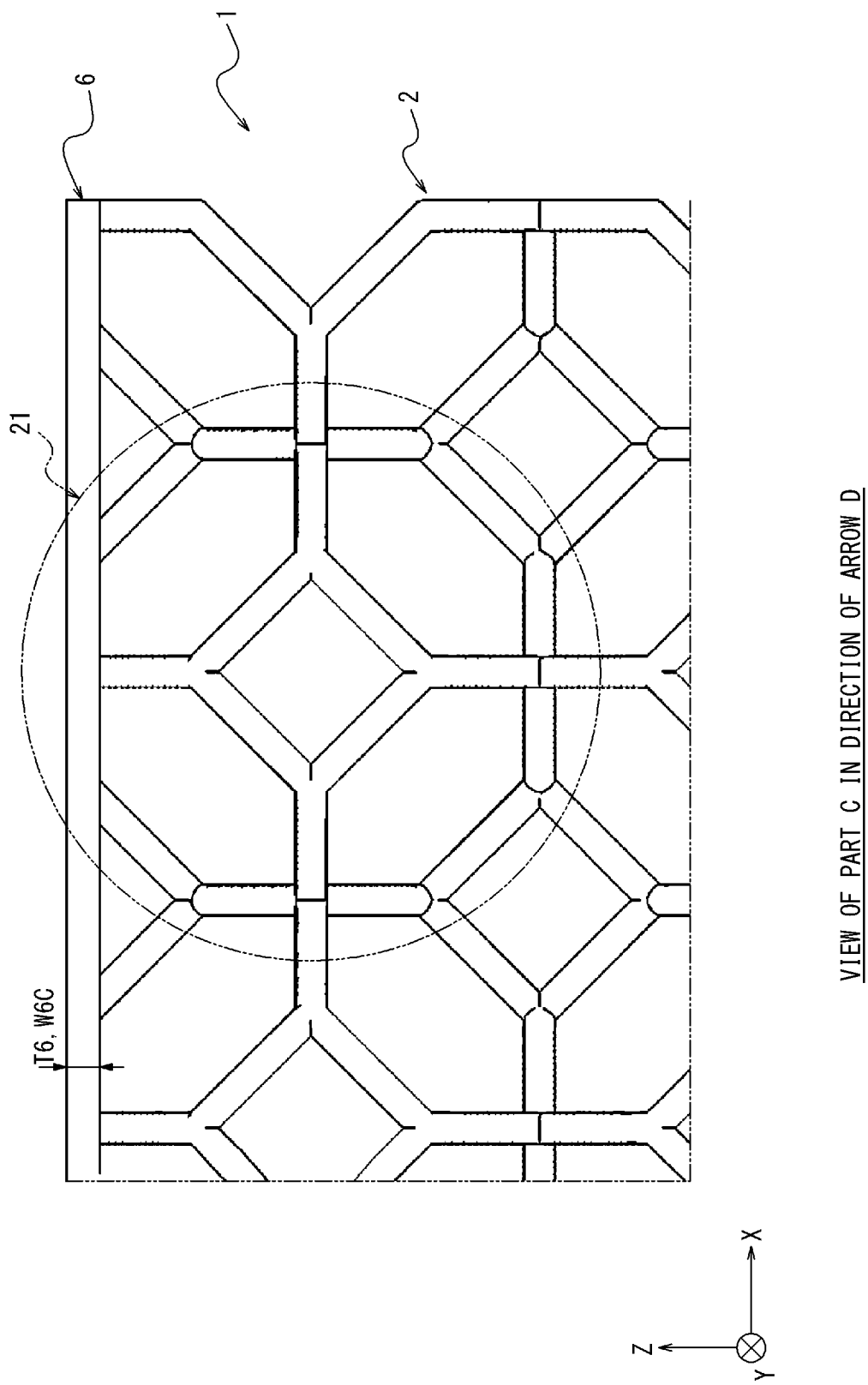
FIG. 7 is a D-arrow view illustrating part C of the porous structural body in FIG. 6 being viewed in the direction of arrow D in FIG. 6.
Figure 8:
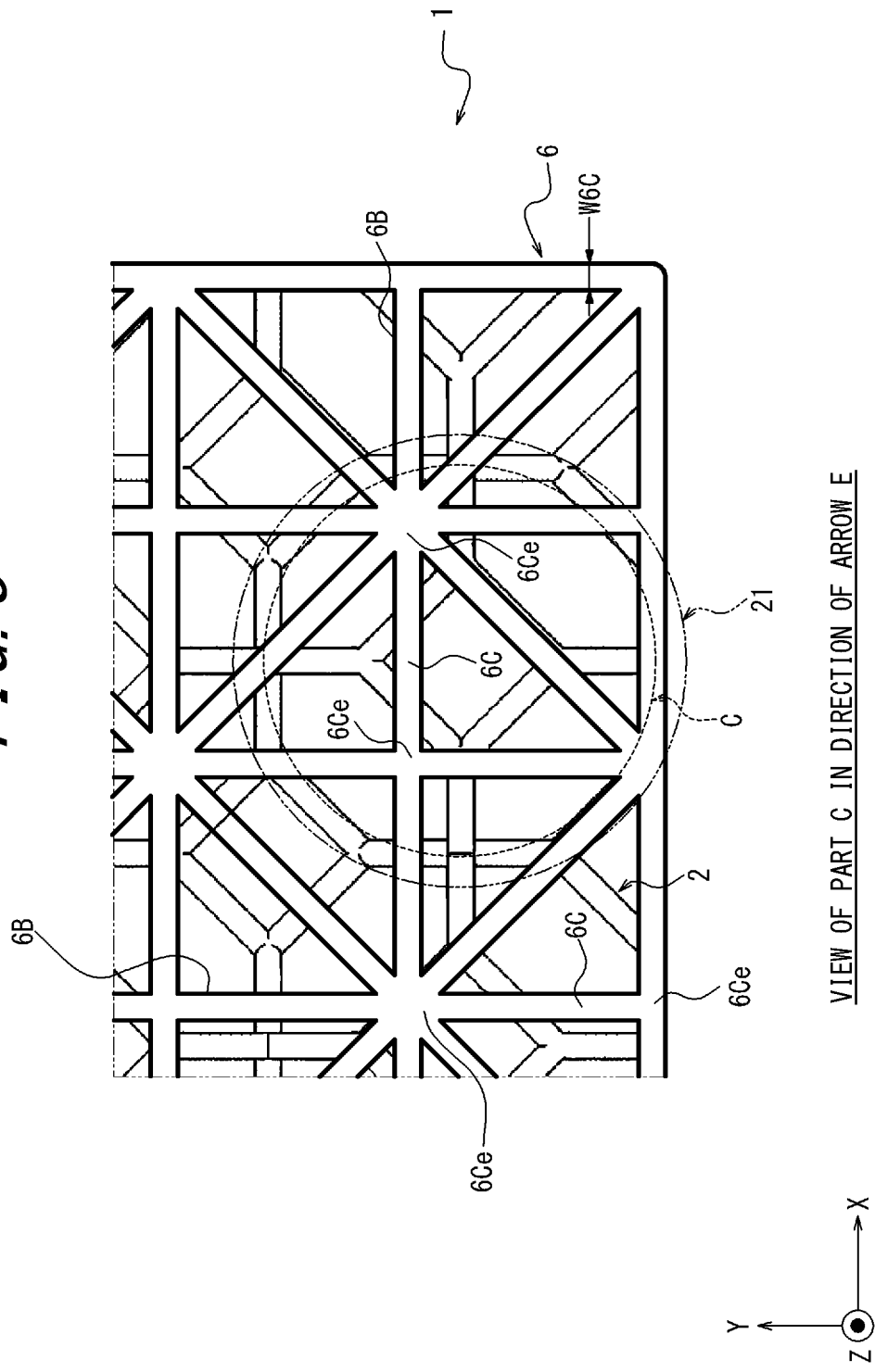
FIG. 8 is an E-arrow view illustrating the part C of the porous structural body in FIG. 6 being viewed in the direction of arrow E in FIG. 6.

FIGS. 6 to 8 are explanatory views of a first modification of the porous structural body 1. FIG. 6 is a perspective view illustrating part of the first modification of the porous structural body 1, and a drawing corresponding to FIG. 1. FIG. 7 is a D-arrow view illustrating part C surrounded by a dashed line in the porous structural body of FIG. 6 being viewed in the direction of arrow D (Y-direction) in FIG. 6. FIG. 8 is an E-arrow view illustrating the part C of the porous structural body 1 in FIG. 6 being viewed in the direction of arrow E (−Z direction).

In the present example, the porous structural body 1 includes a top skin part 6 in addition to the skeleton part 2. At this time, the porous structural body 1 may include or do not have to include the film 3 (FIG. 10) described above. The configurations of the skeleton part 2 and the film 3 are described above.

The top skin part 6 is integrated with the skeleton part 2 to cover part or whole of an outer surface of the skeleton part 2 (a virtual surface in the outer edge (outer outline) of the skeleton part 2), and is made of the same material as in the skeleton part 2. The top skin part 6 is formed on part or whole of an outer surface of the passenger-seat cushion member including the porous structural body 1. In a portion of porous structural body 1 illustrated in FIG. 6, the top skin part 6 is flatly formed, and may be formed in an optional shape along the outer surface of the skeleton part 2, and formed in, for example, a curved shape (curved surface shape).

As illustrated in FIG. 8, in the present example, the top skin part 6 includes a plurality of through holes 6B extending through the top skin part 6 in a thickness direction of the top skin part 6. The plurality of through holes 6B are distributed throughout the top skin part 6, and accordingly, the top skin part 6 is formed in a mesh. Some or all (preferably all) of the respective through holes 6B of the top skin part 6 are not completely blocked with the bone parts 2B or connection parts 2J of the skeleton part 2 coupled to the top skin part 6, to allow ventilation through the through holes 6B.

In the present example, the top skin part 6 includes a plurality of column parts 6C each extending in a column shape along the outer surface of the skeleton part 2 (more specifically, in the present example, the top skin part 6 includes the column parts 6C). End parts 6Ce of the column parts 6C are coupled at a position where the end parts 6Ce of the plurality of column parts 6C are adjacent to one another. Each through hole 6B is zoned between the column parts 6C. The respective column parts 6C included in the top skin part 6 are not located in the skeleton part 2.

The porous structural body 1 includes the top skin part 6, and hence, the skeleton part 2 can be inhibited from being exposed to outside of the porous structural body 1 (i.e., outside of the passenger-seat cushion member). Therefore, when weight is applied from a user or the like to the passenger-seat cushion member, the skeleton part 2 does not directly receive the weight, and receives the weight via the top skin part 6, and hence, the skeleton part 2 is hard to be damaged. Consequently, durability of the porous structural body 1 (i.e., the passenger-seat cushion member) can be improved.

Also, an outer surface of the top skin part 6 has far less irregularities than the outer surface of the skeleton part 2, and the porous structural body 1 includes the top skin part 6, which can reduce discomfort felt by the user when the user applies the weight to the passenger-seat cushion member. Consequently, sitting comfort of the passenger-seat cushion member can be improved.

In addition, since the top skin part 6 includes the plurality of through holes 6B, the breathability between the outer and inner sides of the skeleton part 2 through the top skin part 6 can be ensured.

However, when the top skin part 6 is disposed only in part of the outer surface of the skeleton part 2 (i.e., included only in part of the outer surface of the passenger-seat cushion member), it is possible to ensure breathability between the outer and inner sides of the skeleton part 2 through a portion of the outer surface of the skeleton part 2 in which the top skin part 6 is not disposed (i.e., a portion of the outer surface of the passenger-seat cushion member in which the top skin part 6 is not disposed), and hence, the top skin part 6 does not have to include the through holes 6B, in other words, may be formed in a continuous seat shape over the whole top skin part 6.

In the example of FIGS. 6 to 8, in planar view of the top skin part 6, the plurality of through holes 6B are arranged in an arrangement pattern with regularity, but the plurality of through holes 6B may be arranged at random without regularity.

In the example of FIGS. 6 to 8, in the planar view of the top skin part 6 (surface view seen from a direction perpendicularly facing the outer surface of the top skin part 6 as in FIG. 8), each column part 6C extends straight, and each through hole 6B has a triangular shape, and is zoned among three column parts 6C extending in mutually different directions. However, some or all of the respective column parts 6C may extend in a curved manner (along a curved shape). Alternatively, each of the respective through holes 6B may have an optional polygonal shape (a rectangular shape or the like) other than the triangular shape, or an optional shape (e.g., a circle (an exact circle, an ellipse or the like)) other than the polygonal shape in the planar view of the top skin part 6. Also, in the example of FIG. 6 to FIG. 8, a shape and dimension of each through hole 6B in the planar view of the top skin part 6 are uniform (same as each other), but the shape and/or dimension of each through hole 6B may be nonuniform.

In the example of FIGS. 6 to 8, a cross-sectional shape of each of the respective column parts 6C included in the top skin part 6 is a circle (an exact circle). Consequently, a structure of the top skin part 6 is simple, and the porous structural body 1 (i.e., the passenger-seat cushion member) is easily shaped by the 3D printer. Furthermore, pointed portions toward outside of the porous structural body 1 are eliminated, and hence, touching comfort and sitting comfort of the passenger-seat cushion member can be improved. Note that the cross-sectional shape of each column part 6C is a shape in a cross section perpendicular to an extension direction of each column part. However, the cross-sectional shape of each of all or some column parts 6C of the respective column parts 6C included in the top skin part 6 may be a polygonal shape (a regular triangle, a triangle other than the regular triangle, a rectangle or the like) or may be a circle (an ellipse or the like) other than an exact circle. The cross-sectional shape of each bone part 2B may be uniform along the extension direction, or may be nonuniform along the extension direction. The cross-sectional shapes of the column parts 6C may be different from each other.

When each through hole 6B of the top skin part 6 is zoned by the plurality of column parts 6C as in the example of FIGS. 6 to 8, a width W6C (FIGS. 7 and 8) of each column part 6C included in the top skin part 6 may be uniform along the extension direction of the column part 6C as in the illustrated example, or may be nonuniform along the extension direction of the column part 6C. Alternatively, for the width W6C of each column part 6C included in the top skin part 6, the column parts 6C may have the same width as each other as in the illustrated example, or the column parts 6C may have different widths from each other. Note that the width W6C of each column part 6C is a maximum width in a cross section perpendicular to the extension direction of each column part when measured along the cross section.

The maximum value of the width W6C of each column part 6C included in the top skin part 6 is preferably 3.0 mm or smaller, more preferably 2.5 mm or smaller to ensure the cushioning characteristic of the porous structural body 1 (i.e., the passenger-seat cushion member). A minimum value of the width W6C of each column part 6C included in the top skin part 6 is preferably 0.05 mm or larger, more preferably 0.10 mm or larger to improve durability of the top skin part 6.

Similarly, a thickness T6 (FIG. 7) of the top skin part 6 may be uniform or nonuniform over the whole top skin part 6. A maximum value of the thickness T6 of the top skin part 6 is preferably 3.0 mm or smaller, more preferably 2.5 mm or smaller to ensure the cushioning characteristic of the porous structural body 1 (i.e., the passenger-seat cushion member). A minimum value of the thickness T6 of the top skin part 6 is preferably 0.05 mm or larger, more preferably 0.10 mm or larger to improve the durability of the top skin part 6.

To inhibit the skeleton part 2 from being damaged, a maximum value of a diameter of each through hole 6B of the top skin part 6 (a diameter of the through hole 6B having the largest diameter) is preferably equal to or smaller than an average value of the diameter of each cell hole C of the skeleton part 2, more preferably smaller than the average value of the diameter of the cell hole C of the skeleton part 2. When the shape of the through hole 6B in the planar view of the top skin part 6 is non-circular as in the example of FIG. 8, "the diameter" of the through hole 6B is a diameter of a circumscribed circle of the through hole 6B in the planar view of the top skin part 6.

When each through hole 6B of the top skin part 6 is zoned by the plurality of column parts 6C as in the example of FIGS. 6 to 8, for improving breathability, a ratio of an area of the through holes 6B in the top skin part 6 is preferably 50% or larger, more preferably 70% or larger. Also, when each through hole 6B of the top skin part 6 is zoned by the plurality of column parts 6C, for improving the durability of the top skin part 6, the area ratio of the through holes 6B in the top skin part 6 is preferably 99% or smaller, more preferably 95% or smaller. Note that "the area ratio of the through holes 6B in the top skin part 6" indicates a ratio (A3×100/A2[%]) of a total area A3 of all the through holes 6B arranged in the top skin part 6 relative to an entire area A2 of the top skin part 6. The "entire area A2 of the top skin part 6" indicates an area of a portion surrounded by an outer edge of the top skin part 6, and also includes an area occupied by the through holes 6B.

Figure 9:
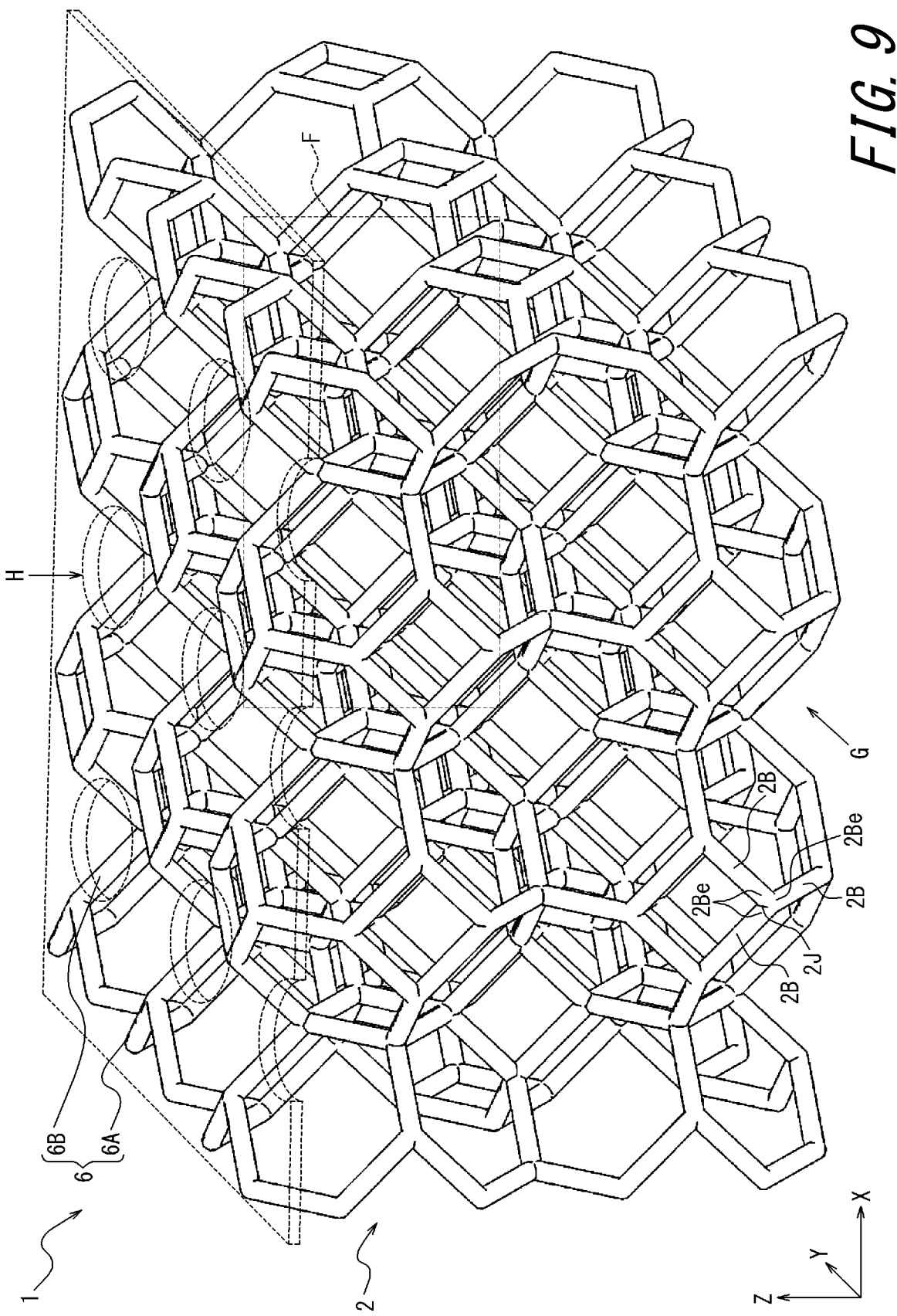
FIG. 9 is a drawing corresponding to FIG. 1, and a perspective view illustrating part of a second modification of the porous structural body.
Figure 10:
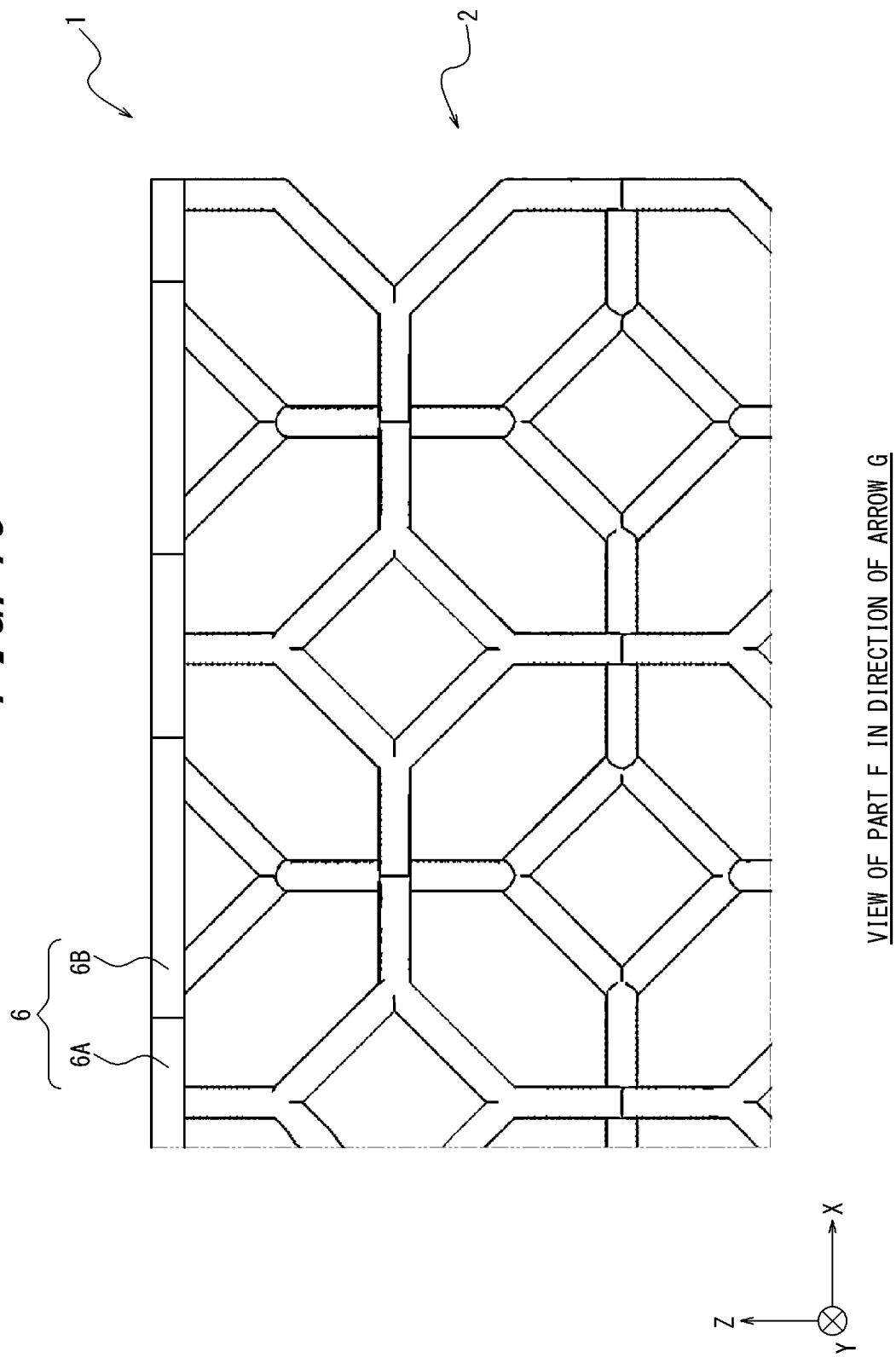
FIG. 10 is a G-arrow view illustrating part F of the porous structural body in FIG. 9 being viewed in the direction of arrow G in FIG. 9.
Figure 11:
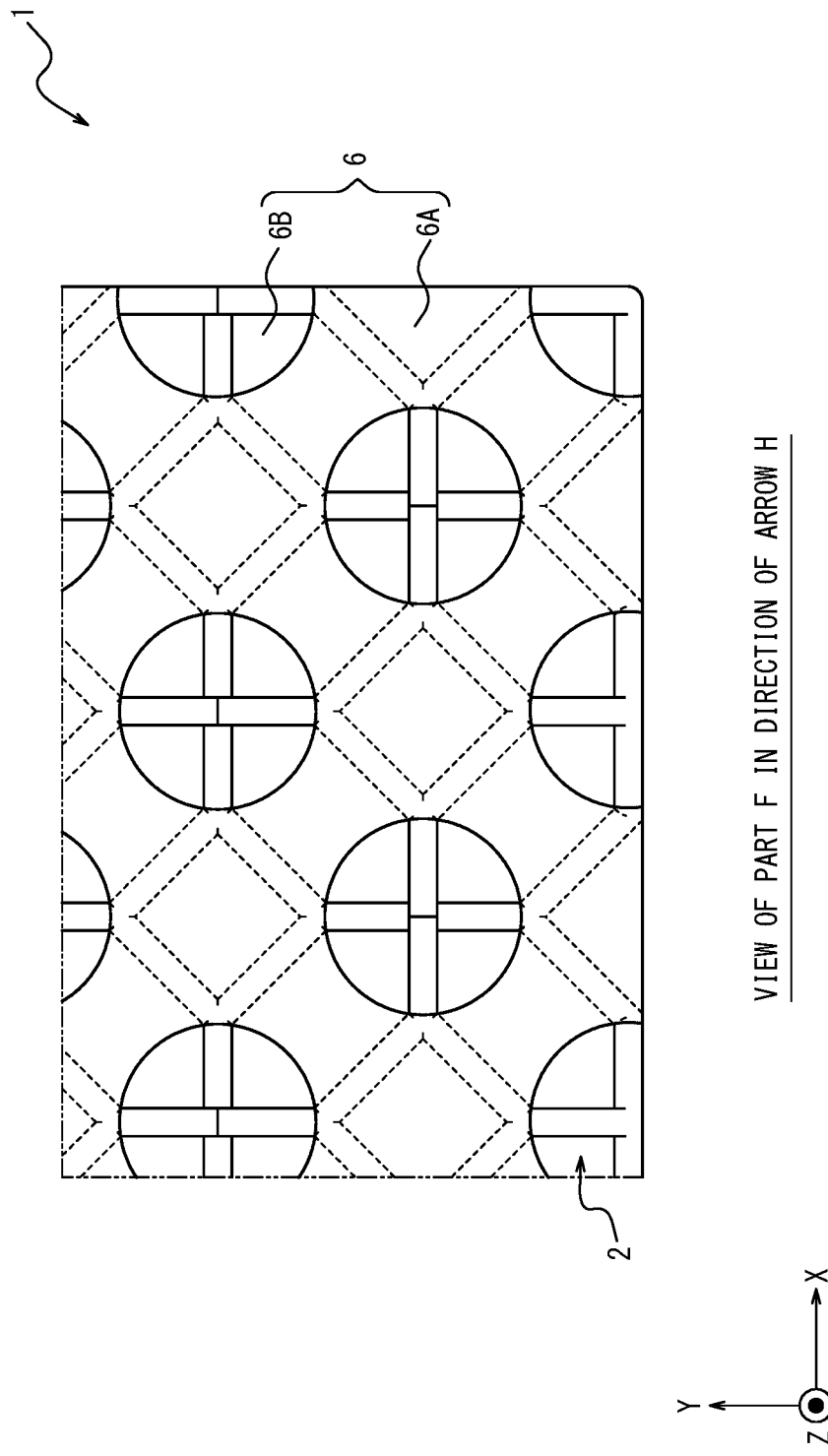
FIG. 11 is an H-arrow view illustrating the part F of the porous structural body in FIG. 9 being viewed in the direction of arrow H in FIG. 9.

FIGS. 9 to 11 are explanatory views of a second modification of the porous structural body 1. FIG. 9 is a perspective view illustrating part of the second modification of the porous structural body 1. FIG. 10 is an F-arrow view illustrating part F surrounded by a dashed line in the porous structural body 1 of FIG. 9 being viewed in the direction of arrow G (Y-direction) in FIG. 9. FIG. 11 is an H-arrow view illustrating part G of the porous structural body 1 in FIG. 9 being viewed in the direction of arrow H (−Z direction).

In each example described in the present specification, the porous structural body 1 may include a top skin part 6 different from that in the example of FIGS. 6 to 8, in addition to the skeleton part 2 illustrated in FIG. 1. At this time, the porous structural body 1 may include or does not have to include the film 3 (FIG. 5) described above.

The top skin part 6 in the example of FIGS. 9 to 11 is formed on at least part of an outer side of the skeleton part 2 to block at least some of the plurality of cell holes C and integrated with the skeleton part 2, and at least part of an outer side of the top skin part is a surface. When the porous structural body 1 is used for the passenger-seat cushion member, the top skin part 6 is included in part or whole of the outer surface of the passenger-seat cushion member including the porous structural body 1. In a portion of the porous structural body 1 illustrated in FIG. 9, the top skin part 6 is flatly formed, but the top skin part 6 may have an optional shape along the outer surface of the skeleton part 2, and may have, for example, a curved surface (curved shape).

In the example of FIGS. 9 to 11, the top skin part 6 includes a surface integrated with part or whole of an outermost portion of the skeleton part 2 and continuous to block some or all cell holes C. At least part of the outer side of the top skin part 6 is a surface. Here, "the surface" is, for example, a schematically smoothly continuous surface and may be a smooth surface without irregularities or a surface with irregularities. However, when the surface has irregularities, the surface preferably has surface roughness that allows shaping by using the 3D printer, for example, such surface roughness that dimensions (such as height, depth, width, and diameter) of convex and concave parts of irregularities in each direction are 0.1 mm or larger, and the height of each convex part of irregularities (in other words, the depth of each concave part) is preferably 2 mm or smaller.

Thus, since the top skin part 6 is formed in at least part of the outer side of the skeleton part 2 to block at least some of the plurality of cell holes C, the discomfort felt by the user when the user applies the weight to the passenger-seat cushion member can be reduced. Consequently, the sitting comfort of the passenger-seat cushion member can be improved.

In the example of FIGS. 9 to 11, the top skin part 6 includes a smooth part 6A at which the surface thereof is formed, and a through hole 6B zoned by the smooth part 6A and penetrating through the top skin part 6.

A ratio of an area of an outer surface of the smooth part 6A, in other words, a surface area of the smooth part 6A relative to an area of an outer surface of the top skin part 6, in other words, a surface area of the top skin part 6 is preferably 8% or larger. The surface area of the top skin part 6 is a sum of the surface area of the smooth part 6A and a total opening area of the through holes 6B.

When the ratio of the surface area of the smooth part 6A relative to the surface area of the top skin part 6 is 8% or larger, pressing force received by the smooth part 6A when the porous structural body 1 is pressed increases. Thus, a reduced portion of the skeleton part 2 directly receives impact, and the skeleton part 2 is less likely to be damaged. Accordingly, the durability of the porous structural body 1 increases. However, the ratio of the surface area of the smooth part 6A relative to the surface area of the top skin part 6 may be smaller than 8%. In this case, breathability between the outer and inner sides of the skeleton part 2 in the porous structural body 1 can be further improved.

Each through hole 6B may have a circular or oval opening shape in surface view or may have a rectangular shape or any other shape. In the present example, the top skin part 6 includes the plurality of through holes 6B, and the plurality of through holes 6B are arrayed so that the surface of the top skin part 6 is continuous in a lattice shape in the surface view.

As described above, the passenger-seat cushion member of the present disclosure may be a passenger-seat cushion member of an optional kind, and is preferably, for example, a vehicle-seat cushion member, more preferably a car seat pad. The car seat pad will be described below as an example of the passenger-seat cushion member.

FIG. 12 illustrates, as an example, a car seat pad (passenger-seat cushion member) 300 including the porous structural body 1 of the example in FIG. 1. The car seat pad 300 in the example of FIG. 12 includes a cushion pad 310 on which a seated person sits, and a back pad 320 for supporting a back of the seated person.

In FIG. 12, "up", "down", "left", "right", "front", and "back" directions when viewed from the seated person sitting on the car seat pad 300 are simply referred to, respectively.

The cushion pad 310 includes a main pad 311 on which a hip region and a femoral region of the seated person sit, and a pair of side pads 312 located on both right and left sides of the main pad 311. The back pad 320 includes a main pad 321 configured to support the back and hip of the seated person, and a pair of side pads 322 located on both the right and left sides of the main pad 321.

In the example of FIG. 12, the cushion pad 310 and the back pad 320 include separate porous structural bodies (as separate members), respectively. The porous structural body included in part of the cushion pad 310 (a filling body 8 to be described later in detail) is the porous structural body 1 shaped by the 3D printer in each of the examples described with reference to FIGS. 1 to 11, and the porous structural body included in the remaining part is shaped through the process of foaming by chemical reaction during molding or the like. Also, the porous structural body included in the back pad 320 is shaped through the process of foaming by chemical reaction during the molding or the like. Thus, for example, only parts of the cushion pad 310 and back pad 320 are manufactured by the 3D printer, and accordingly, cost can be reduced.

Figure 13:
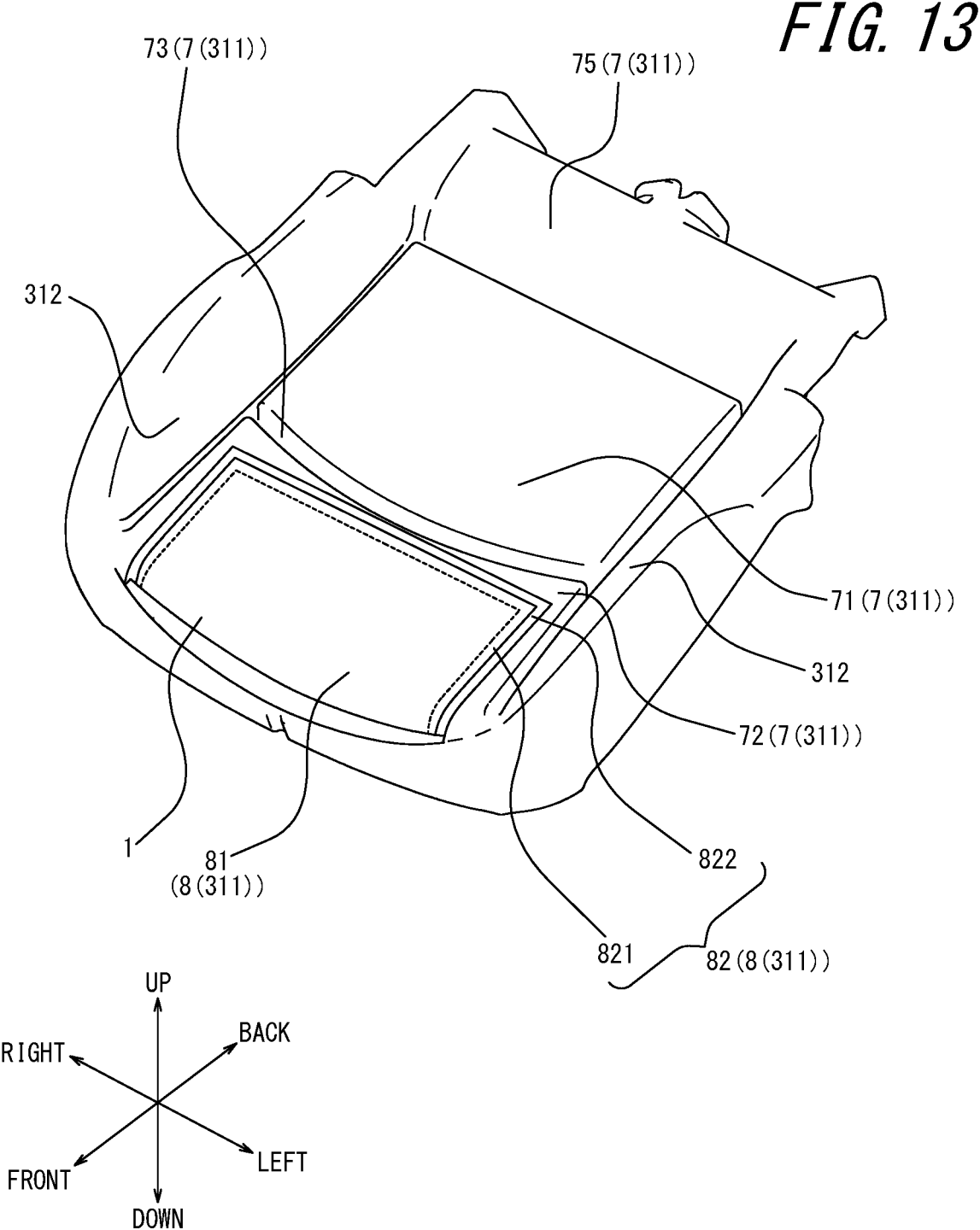
FIG. 13 is a perspective view illustrating details of a main pad and side pads in a car seat pad cushion pad in FIG. 12.

FIG. 13 is a perspective view illustrating the main pad 311 and side pads 312 of the cushion pad 310 in detail. As illustrated in FIG. 13, the main pad 311 includes a seat body 7, and the filling body 8 that fills the seat body 7.

Figure 15:
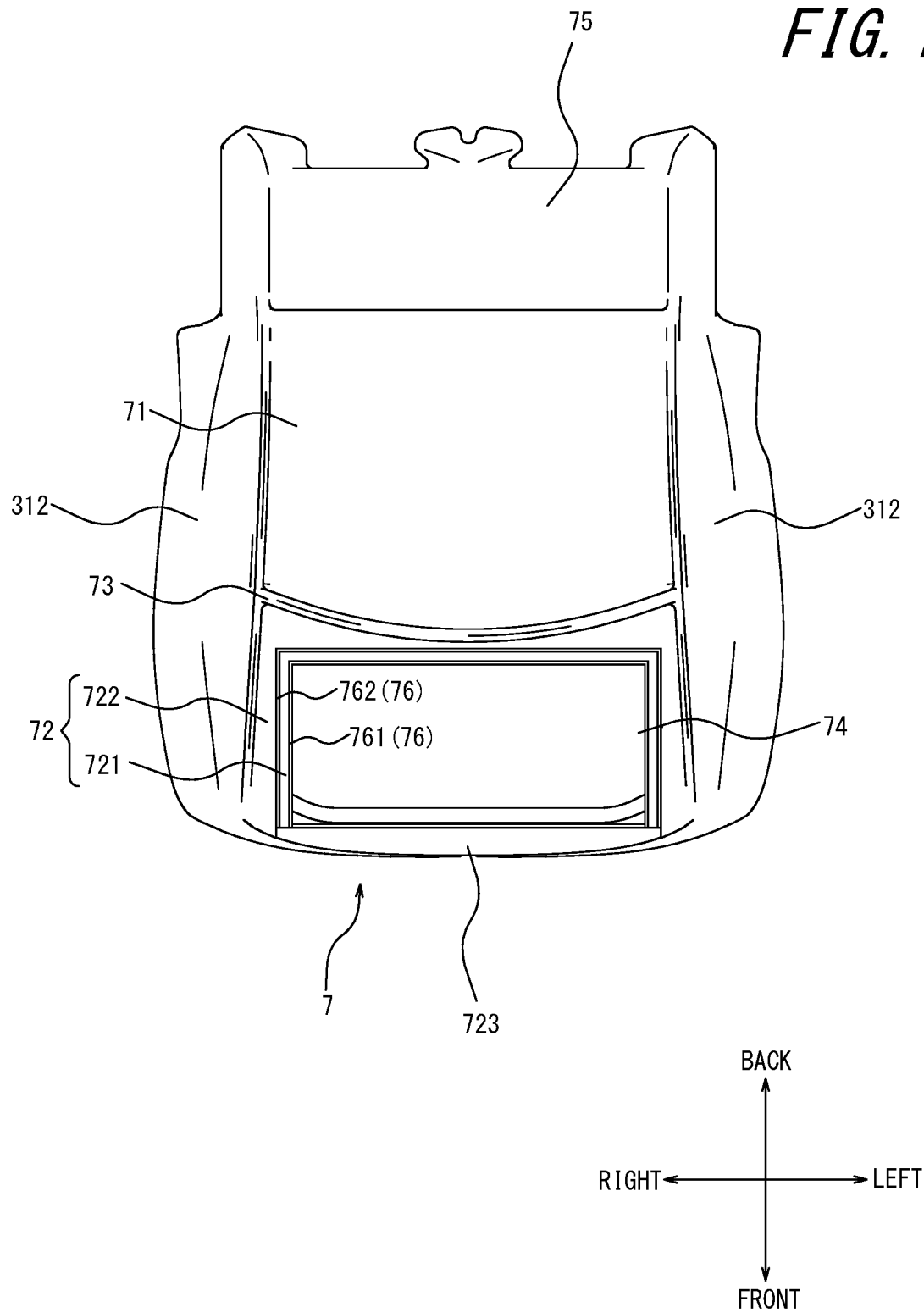
FIG. 15 is a top view illustrating the seat body in FIG. 14.
Figure 16:
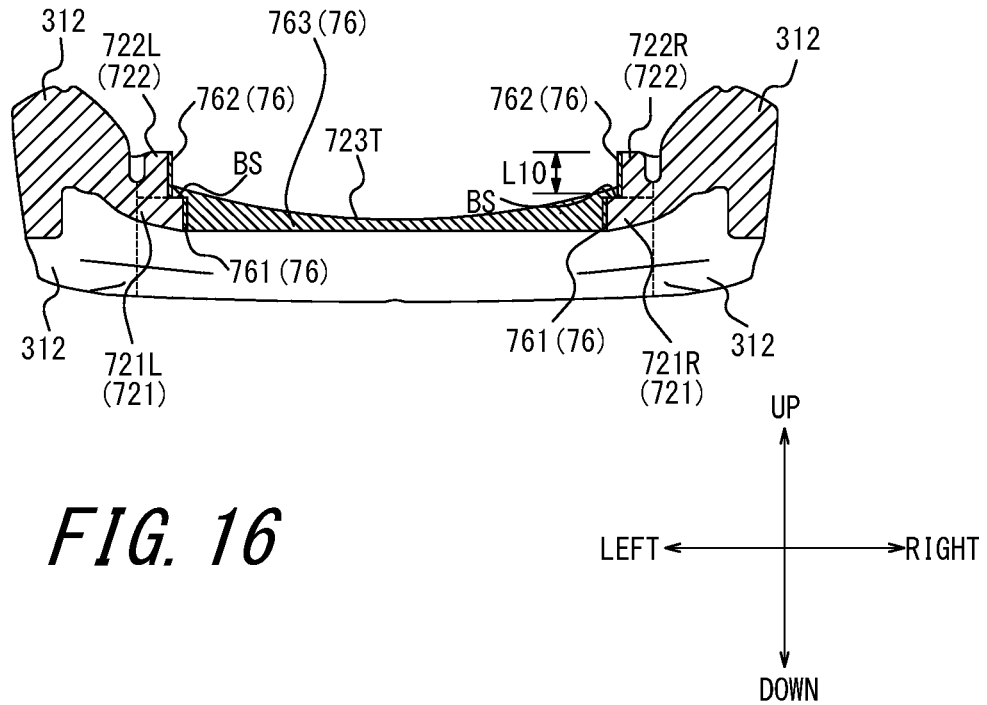
FIG. 16 is an I-I cross-sectional view of the seat body in FIG. 14.
Figure 17:
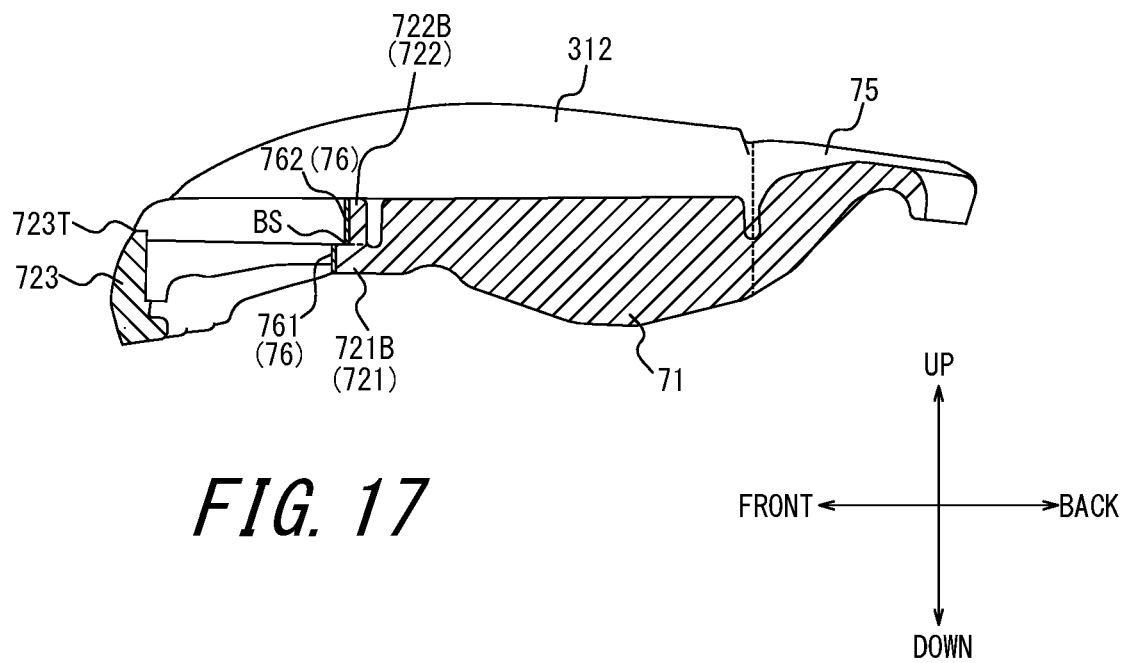
FIG. 17 is a J-J cross-sectional view of the seat body in FIG. 14.

Here, an example of the seat body 7 is described in detail with reference to FIGS. 14 to 17. FIG. 14 is a perspective view illustrating the seat body 7 in the main pad 311 of FIG. 13. FIG. 15 is a top view illustrating the seat body 7 in FIG. 14. FIG. 16 is an I-I cross-sectional view of the seat body 7 in FIG. 14. FIG. 17 is a J-J cross-sectional view of the seat body 7 in FIG. 14.

As illustrated in FIG. 14, the seat body 7 includes an under-hip portion 71, an under-thigh circumferential periphery part 72, a groove part 73, a hole part 74, a back-pad coupling part 75, and a seat-body-side coupling part 76. The under-hip portion 71, the under-thigh circumferential periphery part 72 and the back-pad coupling part 75 include the porous structural body manufactured through the process of foaming by chemical reaction during the molding or the like.

The under-hip portion 71 has a substantially flat surface facing in an up direction. In top view where a surface on which the seated person sits is viewed from the seated person side as illustrated in FIG. 15, the under-hip portion 71 has a shape, the circumferential periphery of which is formed by three straight lines positioned on the back side, the left side, and the right side, and one gentle forwardly convex arc-shaped curve positioned on the front side.

The under-thigh circumferential periphery part 72 is disposed on the front side of the front-side curve serving as the circumferential periphery of the under-hip portion 71 in top view. The under-thigh circumferential periphery part 72 zones the hole part 74 having a substantially rectangular shape and extending in the up-down direction inside the under-thigh circumferential periphery part 72. The hole part 74 penetrates through the seat body 7 in the up-down direction in the example of FIGS. 14 and 15, or the hole part 74 may have a concave shape having a bottom surface on the upper or lower side.

The under-thigh circumferential periphery part 72 has a shape, the circumferential periphery of which is formed by two straight lines positioned on the left and right sides and facing each other and by gentle arc-shaped curves positioned on the back and front sides. The gentle arc-shaped curve positioned on the back side in the under-thigh circumferential periphery part 72 is positioned at a constant interval along the curve serving as the circumferential periphery of the under-hip portion 71.

In the example of FIGS. 14 to 17, the under-thigh circumferential periphery part 72 includes a lower under-thigh circumferential periphery part (first under-thigh circumferential periphery part) 721, an upper under-thigh circumferential periphery part (second under-thigh circumferential periphery part) 722, and a front under-thigh circumferential periphery part (third under-thigh circumferential periphery part) 723. The lower under-thigh circumferential periphery part 721, the upper under-thigh circumferential periphery part 722 and the front under-thigh circumferential periphery part 723 are integrated with one another. The lower under-thigh circumferential periphery part 721, the upper under-thigh circumferential periphery part 722 and the front under-thigh circumferential periphery part 723 are also integrated with the side pads 312.

The lower under-thigh circumferential periphery part 721 and the upper under-thigh circumferential periphery part 722 are positioned on the right, left, and back sides of the under-thigh circumferential periphery part 72 in top view. The lower under-thigh circumferential periphery part 721 is positioned on the lower side of the upper under-thigh circumferential periphery part 722 and protrudes on the inner side of the upper under-thigh circumferential periphery part 722. Specifically, as illustrated in FIG. 16, a left side 721L of the lower under-thigh circumferential periphery part 721 protrudes on the right side of a left side 722L of the upper under-thigh circumferential periphery part 722, and a right side 721R of the lower under-thigh circumferential periphery part 721 protrudes on the left side of a right side 722R of the upper under-thigh circumferential periphery part 722. As illustrated in FIG. 17, a back side 721B of the lower under-thigh circumferential periphery part 721 protrudes on the front side of a back side 722B of the upper under-thigh circumferential periphery part 722. Accordingly, a body stepping surface BS that is a surface of a step in the up direction and continuous with an inner surface of the upper under-thigh circumferential periphery part 722 is formed at the lower under-thigh circumferential periphery part 721.

As illustrated in FIG. 17, the front under-thigh circumferential periphery part 723 is positioned on the front side in the entire under-thigh circumferential periphery part 72. As illustrated in FIG. 16, an upper end part 723T of the front under-thigh circumferential periphery part 723 is positioned lowest in the vicinity of the center in the right-left direction and positioned higher as the position moves toward end parts in the right-left direction.

As illustrated in FIGS. 14 and 15, the groove part 73 is a groove zoned by a back-side curve serving as the circumferential periphery of the under-thigh circumferential periphery part 72 and the front-side curve serving as the circumferential periphery of the under-hip portion 71 in top view. The groove part 73 can house a seam allowance of a cover over the cushion member 300.

The back-pad coupling part 75 is coupled to the under-hip portion 71 and can be coupled to the back pad 320.

The seat-body-side coupling part 76 includes mechanical coupling means that couples to the filling body 8. The mechanical coupling means indicates coupling means that is not chemical coupling means in which adhesive or the like is used. In the example of FIGS. 13 to 20, the mechanical coupling means is a hook-and-loop fastener (seat-body-side hook-and-loop fastener) disposed on an outer surface of the seat body 7. In the example of FIGS. 13 to 20, the seat-body-side coupling part 76 is attached so that a removably attachable surface of the seat-body-side hook-and-loop fastener faces a side opposite to the under-thigh circumferential periphery part 72, in other words, a hole part 74 side. The removably attachable surface includes, for example, a plurality of micro hooks or loops. Note that when the seat-body-side hook-and-loop fastener includes the plurality of micro hooks, a filling-body-side hook-and-loop fastener 822 to be described later includes micro loops. When the seat-body-side hook-and-loop fastener includes a plurality of micro loops, the filling-body-side hook-and-loop fastener 822 to be described later includes a plurality of micro hooks. When the seat-body-side hook-and-loop fastener includes both a plurality of micro hooks and a plurality of micro loops, the filling-body-side hook-and-loop fastener 822 to be described later includes both a plurality of micro hooks and a plurality of micro loops.

The seat-body-side coupling part 76 includes at least one of a lower seat-body-side coupling part 761 and an upper seat-body-side coupling part 762 (in the example of FIGS. 14 to 17, the seat-body-side coupling part 76 includes both the lower seat-body-side coupling part 761 and the upper seat-body-side coupling part 762). The lower seat-body-side coupling part 761 is attached to at least part of an inner surface of the lower under-thigh circumferential periphery part 721 (in the example of FIGS. 14 to 17, the lower seat-body-side coupling part 761 is attached to the whole inner surface of the lower under-thigh circumferential periphery part 721). The upper seat-body-side coupling part 762 is attached to at least part of the inner surface of the upper under-thigh circumferential periphery part 722 (in the example of FIGS. 14 to 17, the upper seat-body-side coupling part 762 is attached to the whole inner surface of the upper under-thigh circumferential periphery part 722).

Subsequently, an example of the filling body 8 will be described in detail with reference to FIGS. 18 to 20. FIG. 18 is a perspective view illustrating the filling body 8 in the main pad 311 in FIG. 13. FIG. 19 is a K-K cross-sectional view of the filling body 8 in FIG. 18. FIG. 20 is an L-L cross-sectional view of the filling body 8 in FIG. 18. Note that FIGS. 18 to 20, from which the skeleton part 2 is omitted, illustrate only an outer shape of the porous structural body 1. The porous structural body 1 is the porous structural body 1 shaped by the 3D printer and corresponding to one of the respective examples described with reference to FIGS. 1 to 11.

The filling body 8 includes a body part 81 including the porous structural body made of flexible resin or rubber, and a filling-body-side coupling part 82 disposed adjacent to the body part 81 and including mechanical coupling means that couples to the seat-body-side coupling part 76, at least part of the filling-body-side coupling part 82 including the porous structural body. The body part 81 is integrated with the seat-body-side coupling part 76. In the example of FIGS. 18 to 20, the filling-body-side coupling part 82 partially includes the porous structural body 1.

In the example of FIGS. 18 to 20, the body part 81 includes a first body part 811, and a second body part 812 integrated with the first body part 811. The second body part 812 is disposed adjacent to and integrated with the first body part 811 in a seating direction (down direction illustrated in FIGS. 18 to 20) when the seated person sits on the car seat pad 300.

The mechanical coupling means in the filling-body-side coupling part 82 is the filling-body-side hook-and-loop fastener 822 (hook-and-loop fastener) disposed on an outer side of the body part 81. Specifically, the filling-body-side coupling part 82 includes an outer edge part 821 disposed in at least part of an outer edge of the body part 81 and including the porous structural body 1, and the filling-body-side hook-and-loop fastener 822 attached to the outer edge part 821. The outer edge part 821 is disposed at a position included in at least part of the outer edge of the body part 81 on front and back sides and right and left sides, and facing the seat-body-side coupling part 76.

For example, the outer edge part 821 includes at least one of a first outer edge part 8211 and a second outer edge part 8212 (in the example of FIGS. 18 to 20, the outer edge part 821 includes both the first outer edge part 8211 and the second outer edge part 8212). The first outer edge part 8211 is disposed at a position included in at least part of an outer edge of the first body part 811 on the back, left and right sides, and facing the lower seat-body-side coupling part 761 (in the example of FIGS. 18 to 20, the first outer edge part 8211 is disposed on each of the back, left and right sides of the first body part 811). The second outer edge part 8212 is disposed at a position included in at least part of the outer edge of the second body part 812 on the back, left and right sides, and facing the upper seat-body-side coupling part 762 (in the example of FIGS. 18 to 20, the second outer edge part 8212 is disposed on each of the back, left and right sides of the second body part 812).

When a portion of the porous structural body 1 that is included in each of the first body part 811 and the first outer edge part 8211 corresponds to a first porous structural body 11 and a portion included in each of the second body part 812 and the second outer edge part 8212 corresponds to a second porous structural body 12, the second porous structural body 12 is disposed to protrude beyond the first porous structural body 11 in a direction orthogonal to the seating direction (the down direction illustrated in FIGS. 18 to 20). Specifically, as illustrated in FIG. 19, the second porous structural body 12 is disposed to protrude beyond the first porous structural body 11 in the right-left direction. Also, as illustrated in FIG. 20, the second porous structural body 12 is disposed to protrude beyond the first porous structural body 11 in the front-back direction.

With this configuration, a pad stepping surface PS that is a surface of a step facing in the down direction and continuous with the first porous structural body 11 is formed at the second porous structural body 12. Further, the porous structural body 1 is formed so that the pad stepping surface PS extends along the body stepping surface BS of the seat body 7 described above (see FIGS. 16 and 17).

Consequently, when the filling body 8 is inserted downward from above the hole part 74 with the first body part 811 being under the second body part 812, a protruding portion of the second porous structural body 12 beyond the first porous structural body 11 is locked with the body stepping surface BS, and the porous structural body 1 can be positioned in the up-down direction in the hole part 74 of the seat body 7. Therefore, the filling body 8 including the porous structural body 1 is stably disposed, and hence, the car seat pad 300 can be easily manufactured.

Also, in the example of FIGS. 18 to 20, a lower end of a forwardly protruding portion of the second body part 812 is curved to be lowest in the vicinity of the center in the right-left direction and to be higher as being toward end parts in the right-left direction. The lower end of the forwardly protruding portion of the second body part 812 is curved along a curved shape in the upper end part 723T of the front under-thigh circumferential periphery part 723 illustrated in FIGS. 16 and 17. Consequently, the porous structural body 1 is disposed to be broader in the vicinity of the center than in right and left end parts, in front of the main pad 311. As described above, the second body part 812 includes the porous structural body 1, and the porous structural body 1 is shaped by the 3D printer. Therefore, the forwardly protruding portion of the second body part 812 can be provided with characteristics that allow the seated person to feel comfortable in knee back and lower leg regions. Consequently, the seated person can comfortably sit.

The filling-body-side hook-and-loop fastener 822 is attached on a side opposite to a body part 81 side in the outer edge part 821 so that a removably attachable surface of the filling-body-side hook-and-loop fastener 822 faces outward. At this time, the filling-body-side hook-and-loop fastener 822 is attached to the outer edge part 821 by bonding a surface thereof opposite to the removably attachable surface to the outer edge part 821 with adhesive. The filling-body-side hook-and-loop fastener 822 is engaged with the seat-body-side hook-and-loop fastener of the seat-body-side coupling part 76 described above, and accordingly the filling body 8 is coupled to the seat body 7.

Specifically, the filling-body-side hook-and-loop fastener 822 includes at least one of a filling-body-side first hook-and-loop fastener 8221 and a filling-body-side second hook-and-loop fastener 8222 (in the example of FIGS. 18 to 20, the filling-body-side hook-and-loop fastener 822 includes both the filling-body-side first hook-and-loop fastener 8221 and the filling-body-side second hook-and-loop fastener 8222.

The filling-body-side first hook-and-loop fastener 8221 is attached to a position included in at least part on an outer side of the first outer edge part 8211, in other words, a side opposite to the first body part 811, and facing the lower seat-body-side coupling part 761 so that a removably attachable surface of the filling-body-side first hook-and-loop fastener 8221 faces outward (in the example of FIGS. 18 to 20, the filling-body-side first hook-and-loop fastener 8221 is attached on each of the back, left and right sides of the first outer edge part 8211). At this time, the filling-body-side first hook-and-loop fastener 8221 is attached to the first outer edge part 8211 by bonding a surface of the fastener that is opposite to the removably attachable surface to the first outer edge part 8211 with adhesive. The filling-body-side second hook-and-loop fastener 8222 is attached to a position included in at least part of an outer side of the second outer edge part 8212, in other words, a side opposite to the second body part 812, and facing the upper seat-body-side coupling part 762 so that a removably attachable surface of the filling-body-side second hook-and-loop fastener 8222 faces outward (in the example of FIGS. 18 to 20, the filling-body-side second hook-and-loop fastener 8222 is attached on each of the back, left and right sides of the second outer edge part 8212). At this time, the filling-body-side second hook-and-loop fastener 8222 is attached to the second outer edge part 8212 by bonding the surface of the fastener opposite to the removably attachable surface to the second outer edge part 8212 with adhesive.

Thus, the filling-body-side coupling part 82 including the filling-body-side hook-and-loop fastener 822 in the filling body 8 is engaged with the seat-body-side coupling part 76 including the seat-body-side hook-and-loop fastener. Consequently, the filling body 8 can be more easily disposed to fill the seat body 7 as compared to a case where the filling body 8 is bonded to the seat body 7 chemically by using, for example, the adhesive or the like. The filling-body-side hook-and-loop fastener 822 and the seat-body-side fastener, that are engaged with each other, can then be easily separated from each other, and hence, a filling operation can be easily performed again so that the filling body 8 fills an accurate position in the seat body 7.

Additionally, a density of a portion (in the present example, the outer edge part 821) including the porous structural body 1 in the filling-body-side coupling part 82 is higher than a density of the body part 81. Here, the density is a mass per unit volume in the porous structural body 1.

It is preferable that a region from an outermost surface of the porous structural body 1 to a position of 2 to 10 mm away from the outermost surface is a region (the outer edge part 821) of the filling-body-side coupling part 82, the density of which is higher than the density of the body part 81. In this case, it is preferable that the density of the outer edge part 821 is from one to five times the density of the body part 81.

To set the density of the outer edge part 821 to be higher than that of the body part 81, the number of bone parts 2B per unit area in the outer edge part 821 may be larger than the number of bone parts 2B per unit area in the body part 81, and an average cross-sectional area of the bone parts 2B in the outer edge part 821 may be larger than an average cross-sectional area of the bone parts 2B in the body part 81. Further, as a material of the bone part 2B forming the outer edge part 821, a material having a density higher than a density of a material of the bone part 2B forming the body part 81 may be used.

When the porous structural body 1 included in the body part 81 and the outer edge part 821 that are arranged adjacent to and integrated with each other as described above is shaped through the process of foaming by chemical reaction during conventional molding or the like, it is difficult to set the number of bone parts 2B and the cross-sectional area of each bone part 2B in the body part to be different from those in the outer edge part. However, when the 3D printer is used, the porous structural body 1 is formed based on three-dimensional shape data (e.g., three-dimensional CAD data) representing a three-dimensional shape of the porous structural body 1 by use of the computer as will be described later in detail. Therefore, the porous structural body 1 including the outer edge part 821 and the body part 81 that are different in the number of bone parts 2B per unit area and the cross-sectional area of each bone part 2B and that are arranged adjacent to and integrated with each other can be easily shaped. In consequence, the filling body 8 including the porous structural body 1 can be easily manufactured.

Thus, the outer edge part 821 included in the filling-body-side coupling part 82 facing the seat body 7 is formed to be hard to bend while holding the cushioning characteristic in the body part 81 including a portion on which the seated person sits, so that the filling body 8 can be firmly and easily attached to the seat body 7. Therefore, the car seat pad (passenger-seat cushion member) 300 including the filling body 8 firmly attached to the seat body 7 can be easily manufactured.

Thus, the density of the portion (in the present example, the outer edge part 821) including the porous structural body 1 in the filling-body-side coupling part 82 is set to be higher than the density of the body part 81, so that reaction force that occurs to the skeleton part 2 when external force is applied to the skeleton part 2 of the porous structural body 1 included in the outer edge part 821, in other words, hardness of the skeleton part 2 (i.e., the porous structural body 1) can be favorable to such an extent that the filling body can be easily and firmly coupled to the seat body 7. In other words, the outer edge part 821 can be appropriately hard to bend to such an extent that the filling body 8 including the outer edge part 821 included in the filling-body-side coupling part 82 facing the seat body 7 can be easily and firmly attached to the seat body 7. In this case, the filling body 8 including the porous structural body 1 can be easily and firmly attached.

Also, the reaction force that occurs to the skeleton part 2 when the external force is applied to the skeleton part 2 of the porous structural body 1 included in the body part 81, in other words, the hardness of the skeleton part 2 (i.e., the porous structural body 1) can be favorable to such an extent that the cushioning characteristic when the seated person sits can be excellent. In this case, comfort when the seated person sits on the body part 81 facing the seated person can be improved, and the seated person can comfortably sit.

Figure 21:
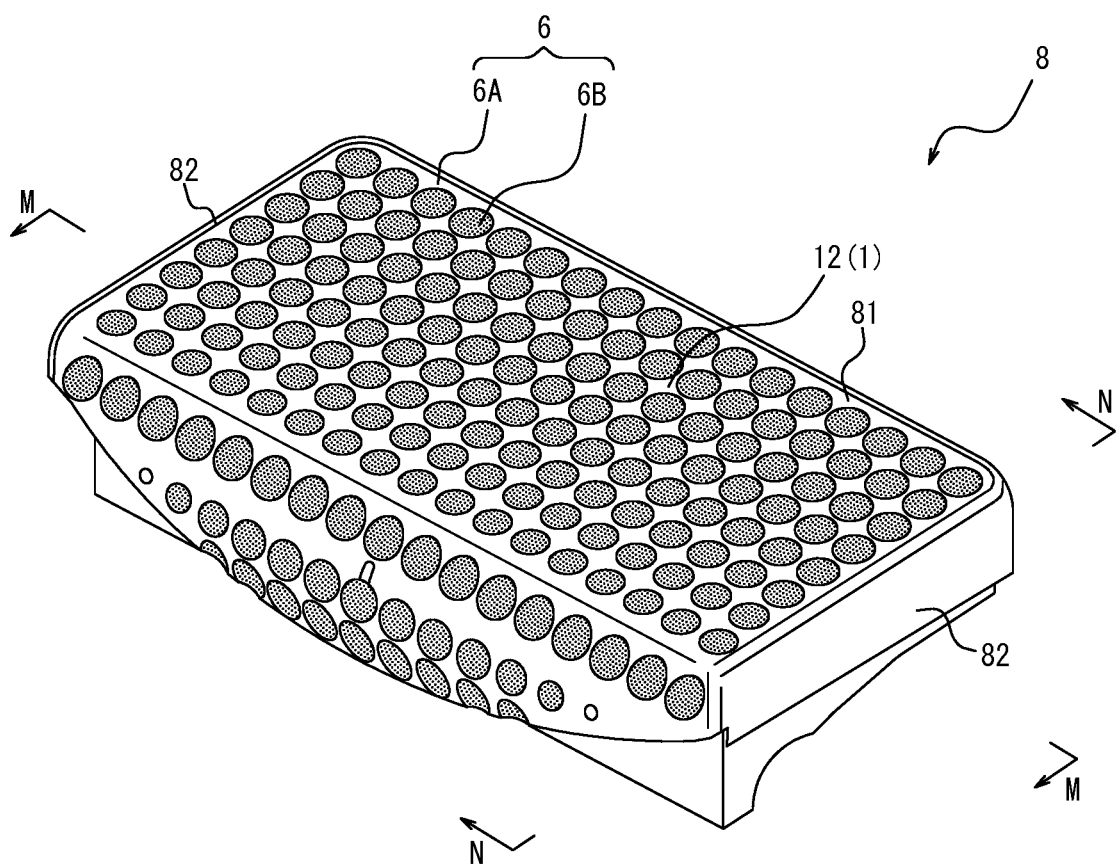
FIG. 21 is a perspective view illustrating a modification of the filling body in FIG. 18.
Figure 22:
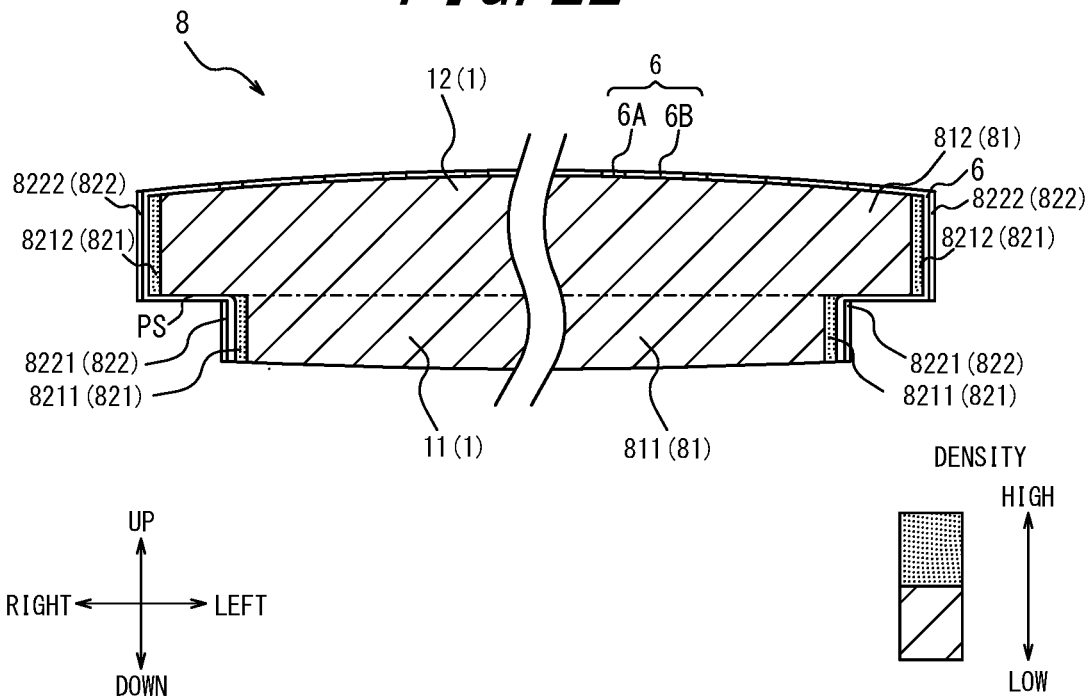
FIG. 22 is an M-M cross-sectional view of the filling body in FIG. 21.
Figure 23:
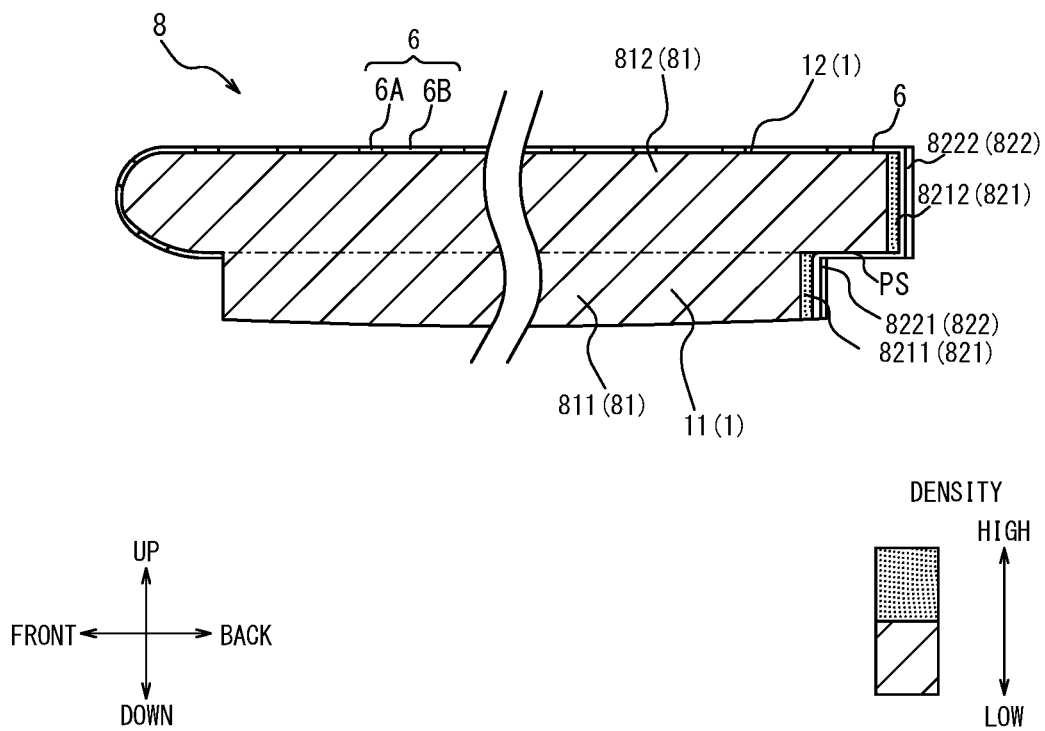
FIG. 23 is an N-N cross-sectional view of the filling body in FIG. 21.

Here, description is made as to a modification of the filling body 8 of the car seat pad 300 that is the passenger-seat cushion member according to the present disclosure with reference to FIGS. 21 to 23. FIG. 21 is a perspective view illustrating the modification of the filling body 8 in FIG. 18. FIG. 22 is an M-M cross-sectional view of the filling body 8 in FIG. 21. FIG. 23 is an N-N cross-sectional view of the filling body 8 in FIG. 21.

At least part of the filling body 8 in the example of FIGS. 21 to 23 includes the porous structural body 1 in FIGS. 9 to 11. That is, at least one of the porous structural body 1 included in the body part 81 and the porous structural body 1 included in the outer edge part 821 includes the top skin part 6 of the example in FIG. 9 and FIG. 11 that is integrated with the skeleton part 2 in at least part of the outer side of the skeleton part 2 of the porous structural body 1. Specifically, the porous structural body 1 included in the body part 81 includes the top skin part 6 on the outer side of the body part 81 that does not face the outer edge part 821. In the example of FIGS. 21 to 23, the porous structural body 1 included in the body part 81 includes the top skin part 6 on an upper side of the second body part 812. Consequently, when seated person sits on the car seat pad 300, the skeleton part 2 of the porous structural body 1 included in the body part 81 does not face the seated person, but the top skin part 6 faces the seated person. This can prevent a corner formed by the skeleton part 2 from contacting the seated person, and the seated person can comfortably sit.

Also, at least part of the top skin part 6 of the porous structural body 1 included in the body part 81 may include the smooth part 6A and the through hole 6B in the same manner as in the top skin part 6 of the porous structural body 1 described above. In the example of FIGS. 21 to 23, the top skin part 6 on a lower side of the first body part 811 and the upper side of the second body part 812 in the porous structural body 1 included in the body part 81 includes the smooth part 6A and the through hole 6B. Consequently, breathability between an outer side of the top skin part 6 and an inner side thereof in the porous structural body 1 can be increased. Therefore, breathability in the portion on which the seated person sits can be increased, and the seated person can comfortably sit.

The porous structural body 1 included in the outer edge part 821 includes the top skin part 6 on an outer side of the outer edge part 821, the side facing the seat body 7. In the example of FIGS. 21 to 23, the porous structural body 1 included in the outer edge part 821 includes the top skin part 6 on the outer side of the outer edge part 821, that is, a right side of the right outer edge part 821, a left side of the left outer edge part 821, and a back side of the back outer edge part 821. Consequently, for example, when the filling-body-side hook-and-loop fastener 822 is bonded and attached to the outer edge part 821 via adhesive, a bonded area between the filling-body-side hook-and-loop fastener 822 and the outer edge part 821 is larger than that when the porous structural body 1 included in the outer edge part 821 does not include the top skin part 6, and hence, the filling-body-side hook-and-loop fastener 822 can be firmly bonded to the outer edge part 821.

Furthermore, at least part of the top skin part 6 of the porous structural body 1 included in the body part 81 does not have to include the through hole 6B and may include only the smooth part 6A, in the same manner as in the top skin part 6 of the porous structural body 1 described above. In the example of FIGS. 21 to 23, the top skin part 6 of the porous structural body 1 included in the outer edge part 821 does not include the through hole 6B, and includes only the smooth part 6A. When the top skin part 6 in the porous structural body 1 included in the body part 81 does not include the through hole 6B, the bonded area between the filling-body-side hook-and-loop fastener 822 and the outer edge part 821 is larger than that when the top skin part includes the through hole 6B, and hence, the filling-body-side hook-and-loop fastener 822 can be more firmly bonded to the outer edge part 821.

Also, as described above, at least part of the surface (outer surface) of the top skin part 6 may be a curved surface. In the example of FIGS. 21 to 23, as illustrated in FIG. 23, the outer surface of the top skin part 6 in a surface of a forwardly protruding portion of the second body part 812 is a curved surface smoothly curved so that a central portion of the outer surface in the up-down direction protrudes more forwardly than an upper portion and a lower portion of the outer surface. Consequently, when the seated person sits on the car seat pad 300 in which the porous structural body 1 is disposed, a front curved surface of the second body part 812 extends along the seated person's knee back and lower leg regions, and contact of a corner of the porous structural body 1 with the seated person can be avoided. Therefore, the seated person can comfortably sit.

Alternatively, the porous structural body 1 included in the filling body 8 of the main pad 311 in the car seat pad 300 in the example of FIGS. 21 to 23 may be the porous structural body 1 in the example of FIGS. 6 to 8. More specifically, the top skin part 6 in the example of FIGS. 9 to 11 that is included in the filling body 8 of the main pad 311 in the car seat pad 300 in the modification of FIGS. 21 to 23 may be replaced with the top skin part 6 in the example of FIGS. 6 to 8.

Consequently, when the seated person sits on the car seat pad 300, the skeleton part 2 of the porous structural body 1 included in the body part 81 does not face the seated person, but the top skin part 6 in FIGS. 6 to 8 faces the seated person. Therefore, the corner of the skeleton part 2 can be prevented from contacting the seated person, and the seated person can comfortably sit. Also, for example, when the filling-body-side hook-and-loop fastener 822 is bonded and attached to the outer edge part 821 via adhesive, a bonded area between the filling-body-side hook-and-loop fastener 822 and the outer edge part 821 is larger than that when the porous structural body 1 included in the outer edge part 821 does not include the top skin part 6, and hence, the filling-body-side hook-and-loop fastener 822 can be firmly bonded to the outer edge part 821.

Figure 24:
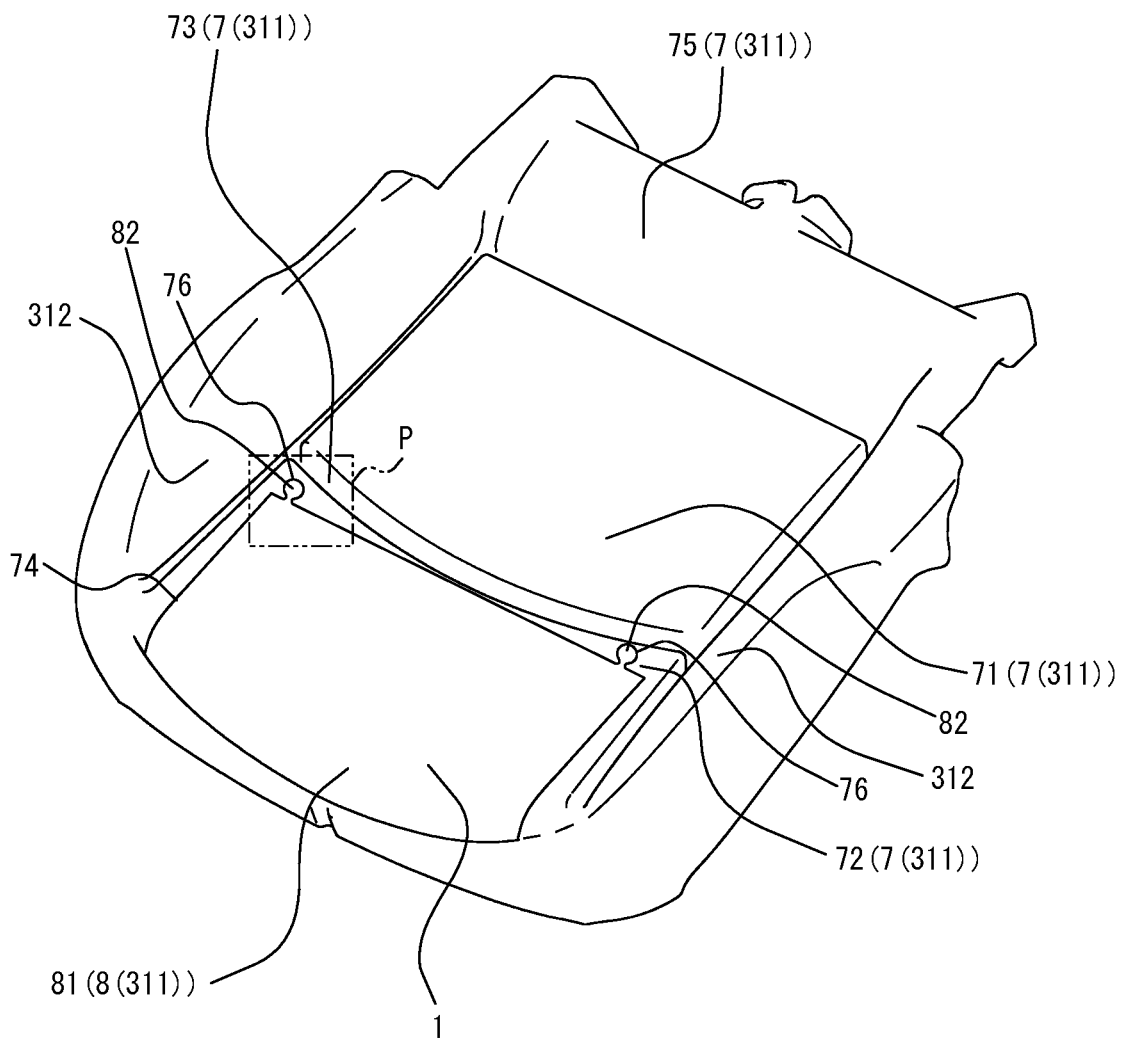
FIG. 24 is a drawing corresponding to FIG. 13, and perspective view illustrating details of a first modification of the main pad and the side pads.

Here, description is made as to a first modification of the main pad 311 in the cushion pad 310 of the car seat pad 300 that is the passenger-seat cushion member according to the present disclosure with reference to FIGS. 24 and 25. FIG. 24 is a drawing corresponding to FIG. 13, and a perspective view illustrating the first modification of the cushion pad and a side pad in detail. FIG. 25 is an enlarged top view of part P in FIG. 24.

Mechanical coupling means in the seat-body-side coupling part 76 is a concave part formed in the seat body 7. In the example of FIGS. 24 and 25, the seat-body-side coupling part 76 of the seat body 7 is formed as a concave part of the under-thigh circumferential periphery part 72 that communicates with the hole part 74. In the present example, the seat-body-side coupling part 76 is constituted only by the concave part that is the mechanical coupling means. In the present example, the under-thigh circumferential periphery part 72 includes the seat-body-side coupling part 76 in a region located behind the hole part 74, but the present disclosure is not limited to this example, and the seat-body-side coupling part 76 may be disposed in at least one of regions located behind, in front of, and on a side of the hole part 74. Also, in the present example, the under-thigh circumferential periphery part 72 includes two seat-body-side coupling parts 76, but the present disclosure is not limited to this example, and the under-thigh circumferential periphery part may include one seat-body-side coupling part 76 or three or more seat-body-side coupling parts 76.

Mechanical coupling means in the filling-body-side coupling part 82 is a convex part formed to protrude from the body part 81. In the present example, the filling-body-side coupling part 82 is constituted only by the convex part that is the mechanical coupling means. In the present example, the filling-body-side coupling part 82 formed as the convex part protruding from the body part 81 is inserted into and wedge-fitted in the seat-body-side coupling part 76 formed as a concave part in the seat body 7, and accordingly the filling-body-side coupling part 82 is coupled to the seat-body-side coupling part 76. In the present example, the whole filling-body-side coupling part 82 includes the porous structural body 1. Wedge-fitting indicates that one member is fitted in the other member, and then geometrically prevented from falling out from the other member.

In the present example, in the filling-body-side coupling part 82 (i.e., the convex part that is the mechanical coupling means) in top view, a length L1 of the filling-body-side coupling part 82 in a direction (right-left direction in the example of FIGS. 24 and 25) orthogonal to a protruding direction at a position P1 in the protruding direction (the front-back direction in the example of FIGS. 24 and 25) is longer than a length L2 of the seat-body-side coupling part 76 in the direction orthogonal to the protruding direction in at least a position P2 closer to the body part 81 than the position P1 in the protruding direction, and the convex part excluding a root side portion is formed in a substantially columnar shape extending in the up-down direction, or a substantially spherical shape.

In the example of FIGS. 24 and 25, the length of the filling-body-side coupling part 82 (i.e., the convex part that is the mechanical coupling means) in the right-left direction increases from a back-side end part 82a of the filling-body-side coupling part 82 to the position P1 as being closer to the body part 81, decreases from the position P1 to the position P2 as being closer to the body part 81, and increases again from the position P2 to a boundary position P3 between the filling-body-side coupling part 82 and the body part 81 as being closer to the body part 81. However, the present disclosure is not limited to this example, and the filling-body-side coupling part 82 may be formed in a shape including two positions in the front-back direction, in which when lengths in the right-left direction at the positions are compared, the length in the right-left direction at the position on the back side is longer than the length in the right-left direction at the position on the front side.

In the example of FIGS. 24 and 25, the shape of the seat-body-side coupling part 76 (i.e., the concave part that is the mechanical coupling means) is substantially same as that of the filling-body-side coupling part 82 (i.e., the convex part that is the mechanical coupling means). Consequently, the length of the seat-body-side coupling part 76 in the right-left direction at the position P2 is shorter than the length of the filling-body-side coupling part 82 in the right-left direction at the position P1, and hence the above concave part and convex part can be wedge-fitted with each other.

Note that the length of the filling-body-side coupling part 82 in the right-left direction at the position P1 and the length of the seat-body-side coupling part 76 in the right-left direction at the position P2 are determined so that the filling-body-side coupling part 82 does not easily come off from the seat-body-side coupling part 76 in a forward direction, in view of the density of the seat body 7 in a circumferential periphery of the seat-body-side coupling part 76 and the density of the filling-body-side coupling part 82.

In this configuration, the filling-body-side coupling part 82 is moved downward from above and inserted into the seat-body-side coupling part 76, and the body part 81 is inserted into the hole part 74 so that the filling body 8 fills the hole part. The filling-body-side coupling part 82 is inserted into the seat-body-side coupling part 76, and the position of the filling-body-side coupling part 82 in the front-back direction and right-left direction is regulated, to position the body part 81 in the hole part 74. Consequently, the filling body 8 can be accurately and easily mounted to fill the seat body 7. Therefore, the car seat pad 300 can be accurately and easily manufactured.

Furthermore, as described above, the length L1 of the filling-body-side coupling part 82 in the direction (right-left direction in the example of FIG. 25) orthogonal to the protruding direction at the position P1 (a predetermined position) in the protruding direction (the front-back direction in the example of FIG. 25) is longer than the length L2 of the seat-body-side coupling part 76 in the direction orthogonal to the protruding direction in at least the position P2 in the protruding direction that is closer to the body part 81 than the position P1, and hence, the filling-body-side coupling part 82 can be prevented from moving in the front-back direction and coming off from the seat-body-side coupling part 76. Consequently, the filling body 8 can be prevented from moving in the front-back direction and coming off from the seat body 7, and the car seat pad 300 having high robustness can be manufactured.

Also, the density of the portion including the porous structural body 1 in the filling-body-side coupling part 82 (in the present example, the filling-body-side coupling part 82 itself that is the convex part as the mechanical coupling means) is higher than the density of the body part 81. Specifically, the density of part or whole of the convex part is increased, so that the density of the (whole) convex part can be higher than the density of the body part 81. In this case, the density of the (whole) convex part can be from one to five times the density of the body part 81.

To set the density of the convex part to be higher than the density of the body part 81, the number of bone parts 2B per unit area in the convex part may be larger than the number of bone parts 2B per unit area in the body part 81, or the average cross-sectional area of the bone parts 2B in the convex part may be larger than the average cross-sectional area of the bone parts 2B in the body part 81. A material having a density higher than the density of a material forming the bone part 2B included in the body part 81 may be used as the material forming the bone part 2B included in the convex part.

As described above, the porous structural body 1 including the outer edge part 821 and the body part 81 being disposed adjacent to and integrated with each other and being different from each other in the number of bone parts 2B per unit area and the cross-sectional area of the bone part 2B in the porous structural body 1 can be easily shaped by using the 3D printer. Therefore, the filling body 8 including the porous structural body 1 can be easily manufactured.

Thus, the filling-body-side coupling part 82 facing the seat body 7 is hard to bend while holding the cushioning characteristic in the body part 81 including the portion on which the seated person sits, so that the filling body 8 can be firmly and easily attached to the seat body 7. Therefore, the car seat pad (the passenger-seat cushion member) 300 including the filling body 8 firmly attached to the seat body 7 can be easily manufactured.

Thus, the density of the portion including the porous structural body 1 in the filling-body-side coupling part 82 (in the present example, the filling-body-side coupling part 82 itself that is the convex part as the mechanical coupling means) is higher than the density of the body part 81, so that the reaction force that occurs to the skeleton part 2 when the external force is applied to the skeleton part 2 of the porous structural body 1 included in the convex part, in other words, the hardness of the skeleton part 2 (i.e., the porous structural body 1) can be favorable to such an extent that the filling body can be easily and firmly coupled to the seat body 7. In this case, the filling body 8 including the porous structural body 1 can be easily and firmly attached.

Furthermore, the reaction force that occurs to the skeleton part 2 when the external force is applied to the skeleton part 2 of the porous structural body 1 included in the body part 81, in other words, the hardness of the skeleton part 2 (i.e., the porous structural body 1) can be favorable to such an extent that the cushioning characteristic when the seated person sits can be excellent. In this case, the comfort when the seated person sits on the body part 81 can be improved, and the seated person can comfortably sit.

Figure 26:
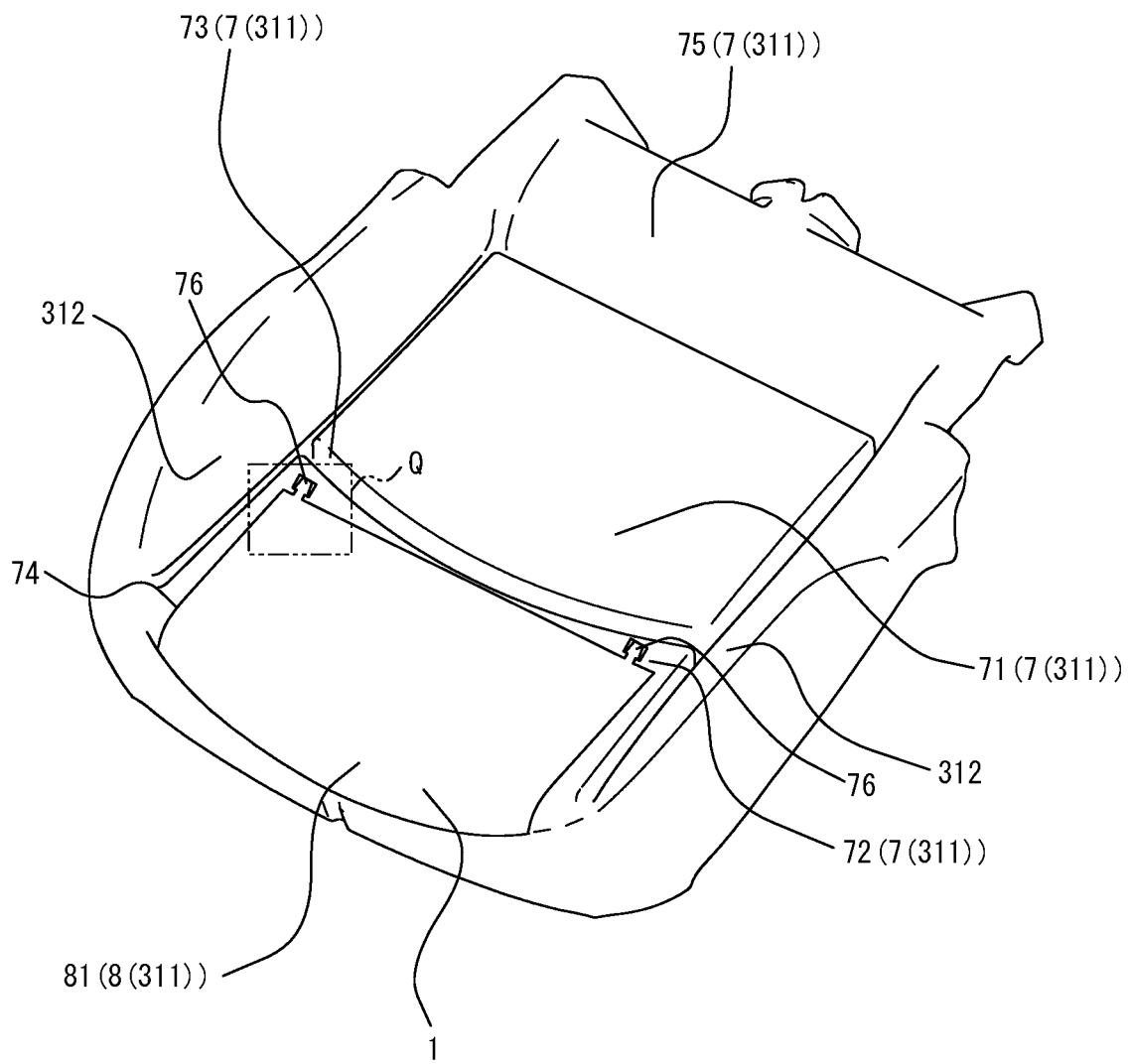
FIG. 26 is a drawing corresponding to FIG. 13, and a perspective view illustrating details of a second modification of the main pad and the side pads.

Here, description is made as to a second modification of the main pad 311 in the cushion pad 310 of the car seat pad 300 that is the passenger-seat cushion member according to the present disclosure with reference to FIGS. 26 and 27. FIG. 26 is a drawing corresponding to FIG. 13, and a perspective view illustrating the second modification of the main pad and a side pad in detail. FIG. 27 is an enlarged top view of part Q in FIG. 26. In the example of FIGS. 26 and 27, similarly to the example of FIGS. 24 and 25, the seat-body-side coupling part 76 of the seat body 7 is formed as a concave part of the under-thigh circumferential periphery part 72 to communicate with the hole part 74. The filling-body-side coupling part 82 is formed as a protruding member from the body part 81. In the present example, the whole filling-body-side coupling part 82 includes the porous structural body 1. Also, in the present example, similarly to the example of FIGS. 24 and 25, the filling-body-side coupling part 82 formed as a convex part protruding from the body part 81 is inserted and wedge-fitted into the seat-body-side coupling part 76 formed as the concave part in the seat body 7, and accordingly, the filling-body-side coupling part 82 is coupled to the seat-body-side coupling part 76.

In the example of FIG. 27, the seat-body-side coupling part 76 does not partially have substantially same shape as in the filling-body-side coupling part 82, but has a shape that can house the filling-body-side coupling part 82. A length L4 of the seat-body-side coupling part 76 in a right-left direction between a position P4 and a boundary position P5 is shorter than a length L3 of the filling-body-side coupling part 82 in the right-left direction at the position P4. In the example of FIG. 27, the length of the filling-body-side coupling part 82 in the right-left direction, from the back-side end part 82a to the position P4, increases as being closer to the body part 81, and the filling-body-side coupling part excluding a root side portion of the convex part (a portion from P4 to P5 in FIG. 27) is formed in a columnar shape with a trapezoidal cross section extending in an up-down direction, or a truncated cone shape. The shape of the seat-body-side coupling part 76 between the position P4 and the boundary position P5 is substantially same as the shape of the filling-body-side coupling part 82 between the position P4 and the boundary position P5. Therefore, the length L4 of the filling-body-side coupling part 82 in the right-left direction at the position P4 is longer than the length L3 of the seat-body-side coupling part 76 in the right-left direction at a position closer to the body part 81 than the position P4.

However, one member and the other member wedge-fitted with each other are not limited to the example described with reference to FIGS. 24 to 27, and as described above, the members may have an optional shape so that the one member is fitted into the other member and then geometrically cannot come off from the other member.

The hole part is filled with the filling body 8 including this configuration by inserting the filling-body-side coupling part 82 into the seat-body-side coupling part 76 of the seat body 7 and inserting the body part 81 into the hole part 74. As described above, the filling-body-side coupling part 82 has flexibility, and the length of the filling-body-side coupling part 82 in the right-left direction increases from the back-side end part 82a to the position P4 as being closer to the body part 81. Therefore, during a filling operation, the back-side end part 82a is moved backward from the position P5 in the seat-body-side coupling part 76 so that the filling-body-side coupling part 82 can fill the seat-body-side coupling part 76. The filling-body-side coupling part 82 may be moved downward from above and inserted into the seat-body-side coupling part 76 to fill the seat-body-side coupling part.

When the filling-body-side coupling part 82 is inserted into the seat-body-side coupling part 76 and a position of the filling-body-side coupling part 82 in the front-back direction and right-left direction is regulated, the body part 81 is accordingly positioned in the hole part 74. Consequently, the filling body 8 can accurately and easily fill the seat body 7. Therefore, the car seat pad 300 can be accurately and easily manufactured.

Furthermore, the length L1 of the filling-body-side coupling part 82 in the direction (right-left direction in the example of FIG. 27) orthogonal to the protruding direction at the position P1 (a predetermined position) in the protruding direction (the front-back direction in the example of FIG. 27) is longer than the length L2 of the seat-body-side coupling part 76 in the direction orthogonal to the protruding direction in at least the position P2 in the protruding direction that is closer to the body part 81 than the position P1, and hence the filling-body-side coupling part 82 can be prevented from coming off from the seat-body-side coupling part 76. Consequently, the filling body 8 can be prevented from moving in the front-back direction or the right-left direction and coming off from the seat body 7, and the car seat pad 300 having high robustness can be manufactured.

Also, in the present example, similarly to the example of FIGS. 24 and 25, the density of the portion including the porous structural body 1 in the filling-body-side coupling part 82 (in the present example, the filling-body-side coupling part 82 itself that is the convex part as the mechanical coupling means) is higher than the density of the body part 81. In the present example, a detailed configuration for setting the density of the convex part to be higher than the density of the body part 81 is similar to the example of FIGS. 24 and 25. Accordingly, also in the present example, effects similar to those of the example of FIGS. 24 and 25 can be obtained.

In the respective examples described with reference to FIGS. 24 to 27, it has been described that the mechanical coupling means in the seat-body-side coupling part 76 is the concave part formed in the seat body 7, the mechanical coupling means in the filling-body-side coupling part 82 is the convex part formed to protrude from the body part 81, and the concave part and the convex part are formed in the shapes that can be wedge-fitted with each other, but the mechanical coupling means in the seat-body-side coupling part 76 may be a convex part formed to protrude from the seat body 7, the mechanical coupling means in the filling-body-side coupling part 82 may be a concave part formed in the body part 81, and the concave part and the convex part may be formed in shapes that can be wedge-fitted with each other. In this case, the density of the outer edge part 821 facing the concave part on a filling body 8 side may be higher than that of the seat body 7.

Subsequently, a method of manufacturing the car seat pad 300 that is the passenger-seat cushion member according to an embodiment of the present disclosure will be described.

Figure 28:
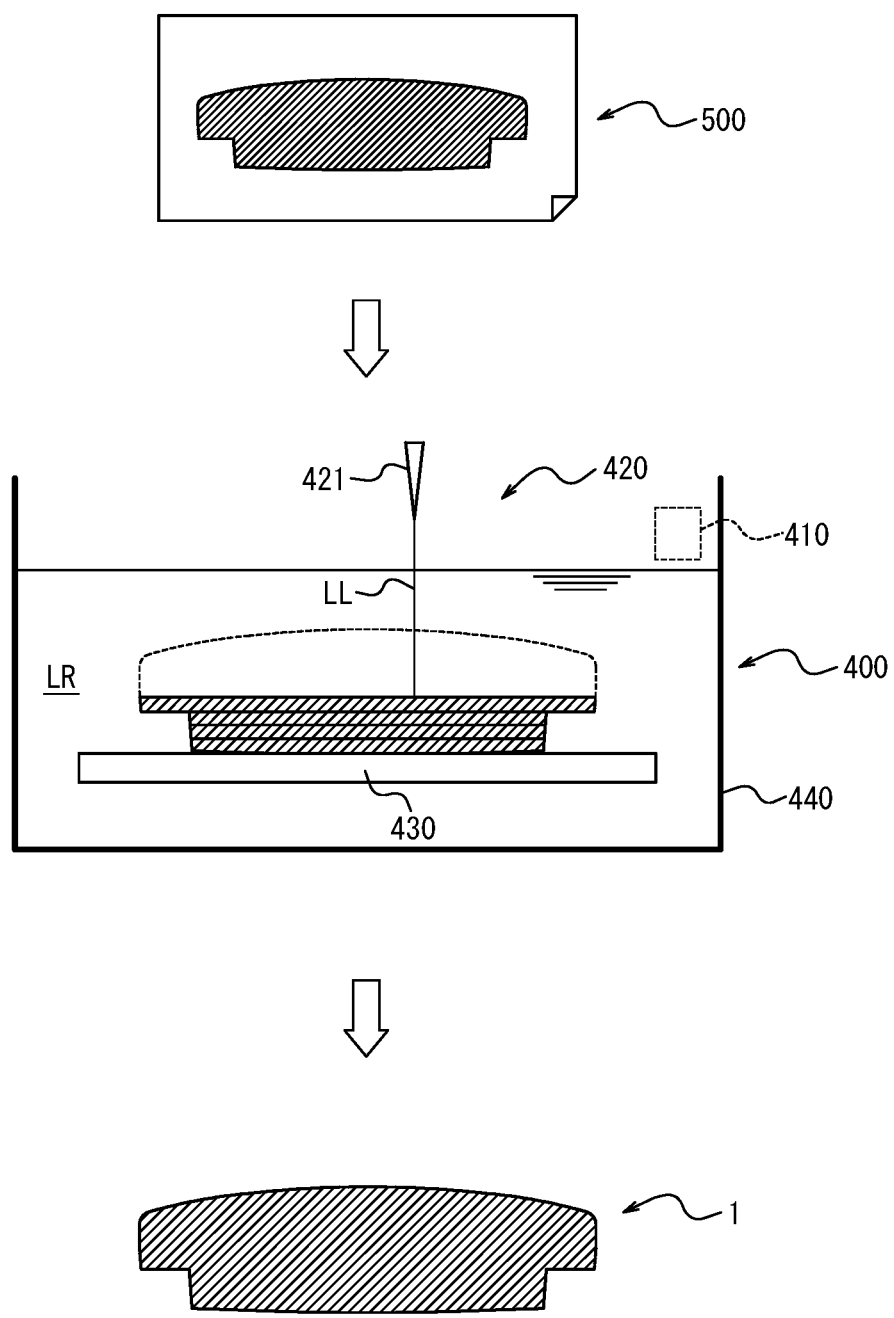
FIG. 28 is an explanatory view of a manufacturing method of the porous structural body of the example in FIG. 1 according to the embodiment of the present disclosure.

First, a method of manufacturing a porous structural body included in the car seat pad 300 that is the passenger-seat cushion member according to the embodiment of the present disclosure will be described with reference to FIG. 28. FIG. 28 illustrates, as an example, the porous structural body 1 included in the car seat pad 300 that is the passenger-seat cushion member according to the embodiment of the present disclosure included in the filling body 8 illustrated in FIG. 18 being manufactured by the 3D printer. The porous structural body 1 illustrated in FIGS. 24 and 26 can be similarly manufactured.

First, three-dimensional shape data (e.g., three-dimensional CAD data) representing the three-dimensional shape of the porous structural body 1 is produced by using a computer in advance.

Subsequently, the above three-dimensional shape data is converted into 3D shaping data 500 by using the computer. The 3D shaping data 500 is read by a controller 410 of a 3D printer 400 when a shaping unit 420 of the 3D printer 400 performs shaping, and the controller 410 causes the shaping unit 420 to shape the porous structural body 1. The 3D shaping data 500 includes, for example, slice data representing a two-dimensional shape of each layer of the porous structural body 1.

Subsequently, shaping of the porous structural body 1 is performed by the 3D printer 400. The 3D printer 400 may perform the shaping by using an optional shaping scheme such as an optical shaping scheme, a powder sintering lamination scheme, a heat melting lamination scheme (FDM scheme), or an ink jet scheme. FIG. 28 illustrates the shaping being performed by the heat melting lamination scheme (FDM scheme).

The 3D printer 400 includes, for example, the controller 410 made of a CPU or the like, the shaping unit 420 configured to perform shaping under control by the controller 410, a supporting table 430 on which a shaping object (i.e., a cushion member 301) to be shaped is placed, and a housing body 440 in which liquid resin LR, the supporting table 430, and the shaping object are housed. The shaping unit 420 includes a laser emitter 421 configured to emit an ultraviolet laser beam LL when the optical shaping scheme is used as in the present example. The housing body 440 is filled with the liquid resin LR. The liquid resin LR is cured into flexible resin through irradiation with the ultraviolet laser beam LL emitted from the laser emitter 421.

In the 3D printer 400 thus configured, first, the controller 410 reads the 3D shaping data 500, and sequentially shapes each layer based on a three-dimensional shape included in the read 3D shaping data 500 while controlling the shaping unit 420 to emit the ultraviolet laser beam LL.

Note that when the porous structural body 1 is made of resin, the porous structural body 1 as the shaping object may be heated in an oven after the shaping by the 3D printer 400 is completed. In this case, connection between layers included in the porous structural body 1 can be reinforced to reduce anisotropy of the porous structural body 1, and thus cushion-member characteristics of the porous structural body 1 can be further improved.

When the porous structural body 1 is made of rubber, the porous structural body 1 as the shaping object may be vulcanized after the shaping by the 3D printer 400 is completed.

When the porous structural body 1 is shaped in this manner, the filling-body-side coupling part 82 is formed by attaching the filling-body-side hook-and-loop fastener 822 to the outer side of the outer edge part 821 formed by part of the porous structural body 1, thereby manufacture the filling body 8. Then, the filling-body-side coupling part 82 including the porous structural body 1 is coupled to the seat-body-side coupling part 76 of the seat body 7, thereby filling the seat body 7 with the filling body 8.

Note that the example has been described above where the filling body 8 and the seat body 7 are formed so that the filling body 8 is inserted downward from above into the hole part 74 with the first body part 811 being on the lower side, but the present disclosure is not limited to this example. For example, the porous structural body 1 and the seat body 7 may be formed so that the porous structural body 1 is inserted into the seat body 7 upward from below the seat body 7.

Furthermore, the filling-body-side hook-and-loop fastener 822 may be further attached to the pad stepping surface PS of the filling body 8 illustrated in FIG. 19 so that the removably attachable surface faces the body stepping surface BS of the seat body 7. In this case, the seat-body-side coupling part 76 including the seat-body-side hook-and-loop fastener is disposed on the body stepping surface BS of the seat body 7 so that the removably attachable surface of the seat-body-side hook-and-loop fastener faces the pad stepping surface PS of the filling body 8.

Thus, the filling-body-side hook-and-loop fastener 822 attached to the pad stepping surface PS of the filling body 8 engages with the seat-body-side coupling part 76 including the seat-body-side fastener. Consequently, the filling body 8 can more firmly fill the seat body 7. The filling-body-side hook-and-loop fastener 822 attached to the pad stepping surface PS and the seat-body-side fastener attached to the body stepping surface BS can engage with each other and then easily separate from each other, and hence, it is easy to perform the filling operation again so that the filling body 8 fills an accurate position in the seat body 7.

Note that the passenger-seat cushion member according to claim 7 can be manufactured by using the method of manufacturing the passenger-seat cushion member according to claim 1. The filling body according to claim 9 can be manufactured by using the method of manufacturing the passenger-seat cushion member according to claim 8.

Next, a modification of the skeleton part 2 in the example of FIGS. 1 to 4 will be described with reference to FIGS. 29 and 30.

The present modification is different from the example of FIGS. 1 to 4 only in configuration of the bone part 2B of the skeleton part 2 of the porous structural body 1.

The porous structural body 1 may include or does not have to include the film 3 (FIG. 5) described above.

Figure 29:
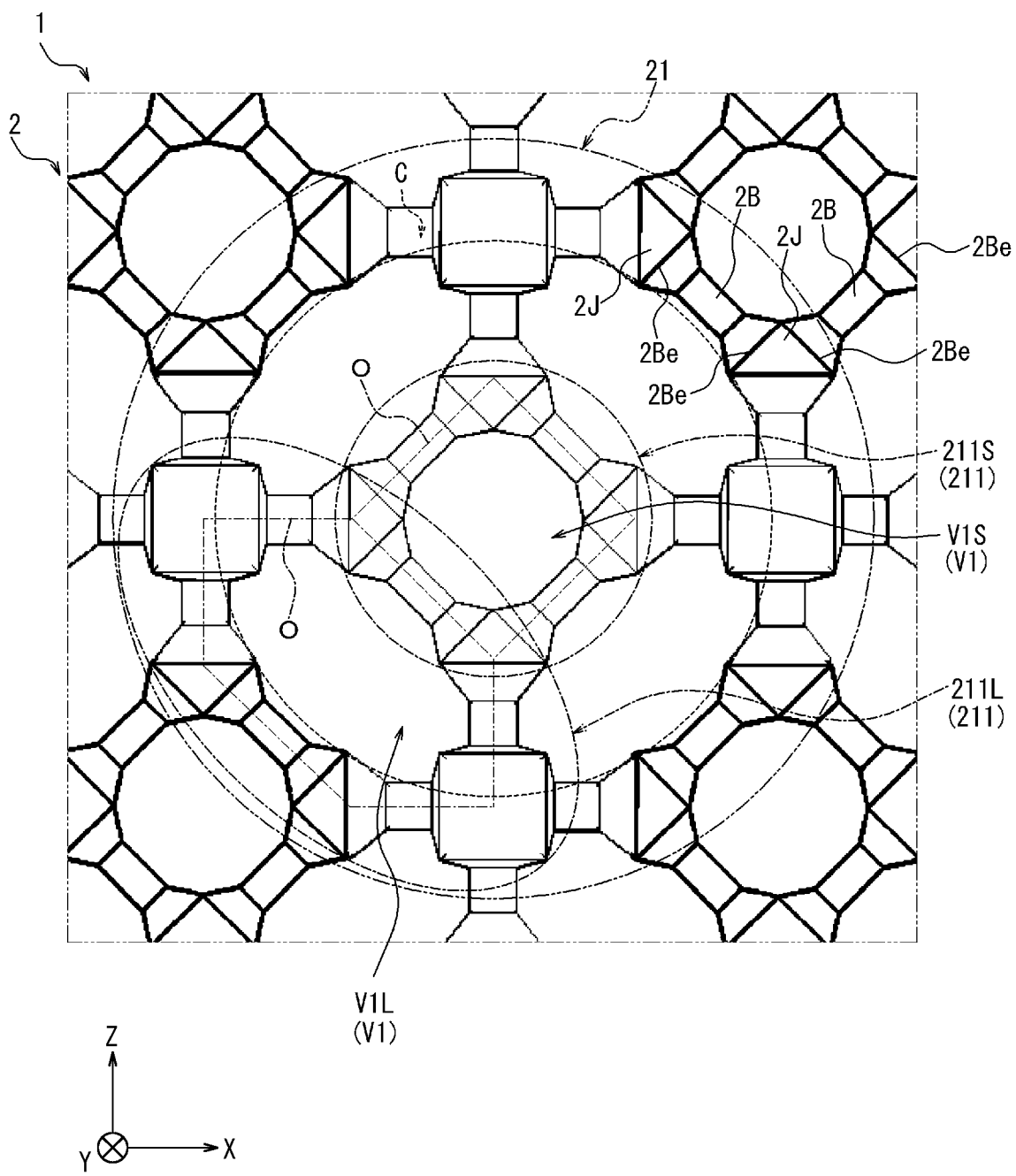
FIG. 29 is a plan view illustrating part of a modification of a skeleton part in FIGS. 1 to 4.
Figure 30A:
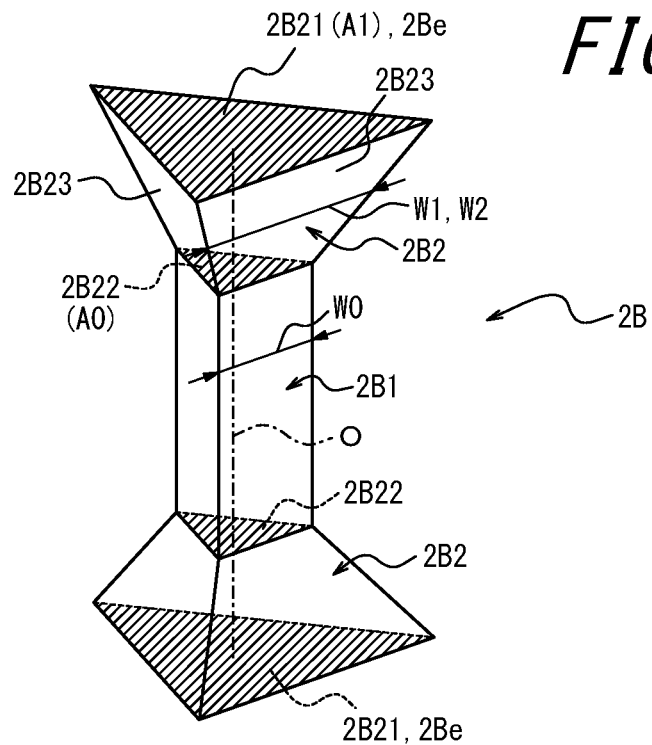
FIG. 30($a$) is a perspective view illustrating a bone part of the skeleton part in FIG. 29 in a state where no external force is applied, and FIG. 30($b$) is a perspective view illustrating the bone part in FIG. 30($a$) in a state where external force is applied.
Figure 30B:
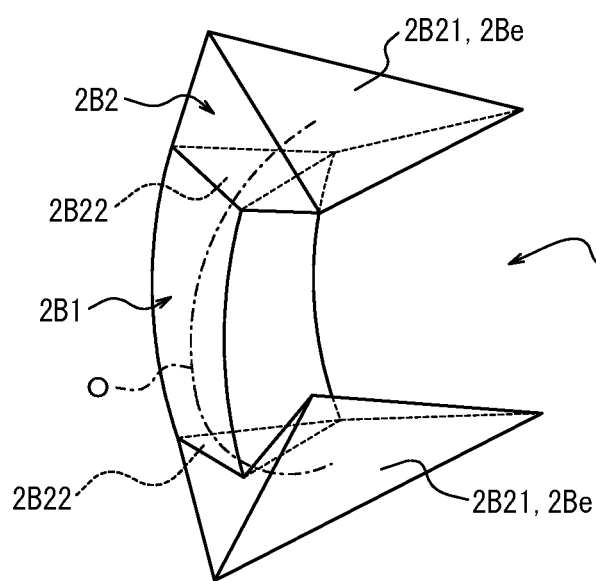

FIGS. 29 and 30 are explanatory views of the modification of the skeleton part 2 in the example of FIGS. 1 to 4. FIG. 29 is a plan view illustrating part of the modification of the skeleton part 2, and a drawing corresponding to FIG. 2. FIG. 30 illustrates each bone part 2B of the present example alone. FIG. 30(*a*) illustrates a natural state where no external force is applied to the bone part 2B, and FIG. 30(*b*) illustrates a state where the external force is applied to the bone part 2B. FIGS. 29 and 30 illustrate the central axis (skeleton line O) of the bone part 2B.

As illustrated in FIGS. 29 and 30(*a*), each bone part 2B of the skeleton part 2 includes a bone constant part 2B1 extending while keeping a cross-sectional area constant, and a pair of bone change parts 2B2 extending from the bone constant part 2B1 to the corresponding connection parts 2J while gradually changing the cross-sectional area on both sides of the bone constant part 2B1 in the extension direction. In the present example, each bone change part 2B2 extends from the bone constant part 2B1 to the corresponding connection part 2J while gradually increasing the cross-sectional area. Note that the present disclosure is not limited to the present example, but the same effects can be obtained even when only some bone parts 2B of the respective bone parts 2B included in the skeleton part 2 satisfy the above-described configuration. Some or all bone parts 2B of the respective bone parts 2B included in the skeleton part 2 may each include the bone change part 2B2 only at an end part of the bone constant part 2B1 on one side whereas an end part of the bone constant part 2B1 on the other side may be directly connected with the corresponding connection part 2J, and in this case as well, the same effects can be obtained to some different extent.

Here, the cross-sectional area of each of the bone constant part 2B1 and the bone change part 2B2 is the cross-sectional area of a cross section of each of the bone constant part 2B1 and the bone change part 2B2, which is perpendicular to the skeleton line O.

In the present example, since each bone part 2B included in the porous structural body 1 includes the bone constant part 2B1 and the bone change part 2B2 and the cross-sectional area of the bone change part 2B2 gradually increases as the position moves from the bone constant part 2B1 toward the corresponding connection part 2J, the bone part 2B has a constricted shape tapered toward the bone constant part 2B1 at a vicinity portion of a boundary between the bone constant part 2B1 and the bone change part 2B2. Thus, when external force is applied, the bone part 2B is likely to perform buckling deformation at a constricted portion and a middle portion of the bone constant part 2B1, and accordingly, the porous structural body 1 is likely to perform compressing deformation. Consequently, behavior and characteristics equivalent to those of typical polyurethane foam manufactured through the process of foaming by chemical reaction can be obtained. In addition, as a result, the surface of the porous structural body 1 provides softer touch. For example, softer feeling is provided to a seated person when sitting, particularly when starting sitting. Such soft feeling is typically widely appreciated, and is appreciated by a seated person on the passenger-seat cushion member of a luxury car (e.g., a seated person on a backseat of a chauffeured car).

When at least a portion of the bone part 2B includes the bone constant part 2B1 as in the present example, a ratio A0/A1 of a cross-sectional area A0 (FIG. 30(*a*)) of the bone constant part 2B1 relative to a cross-sectional area A1 (FIG. 30(*a*)) of an edge 2B21 of the bone part 2B on any one side (preferably, both sides) preferably satisfies:

$$0.5 \le A0/A1 \le 2.0.$$

Consequently, the surface of the porous structural body 1 can provide touch of appropriate hardness, which is not too soft nor too hard, as a characteristic of the passenger-seat cushion member. For example, a feeling of appropriate hardness is provided to the seated person when sitting, particularly when starting sitting. The surface of the porous structural body 1 provides softer touch as the ratio A0/A1 is smaller. When the ratio A0/A1 is smaller than 0.15, the surface of the porous structural body 1 potentially provides too soft touch, which is not preferable as the characteristic of the passenger-seat cushion member. The porous structural body is hard to be manufactured by the 3D printer, and is therefore unfavorable in manufacturability. When the ratio A0/A1 is in excess of 2.0, the surface of the porous structural body 1 potentially provides too hard touch, which is not preferable as the characteristic of the passenger-seat cushion member.

Note that the ratio A0/A1 is more preferably 0.5 or larger.

More specifically, in the present example, each bone part 2B includes the bone constant part 2B1 and the pair of bone change parts 2B2 continuous with both sides of the bone constant part, each bone change part 2B2 extends from the bone constant part 2B1 to the corresponding connection part 2J while gradually increasing cross-sectional area, and the ratio A0/A1 is smaller than 1.0. Accordingly, the surface of the porous structural body 1 provides relatively soft touch as the characteristic of the passenger-seat cushion member. Such a soft feeling is typically widely appreciated, and is appreciated by the seated person on the passenger-seat cushion member of the luxury car (e.g., the seated person on the backseat of the chauffeured car).

Note that each bone part 2B included in the skeleton part 2 may satisfy the above-described configuration, or only some bone parts 2B of the respective bone parts 2B included in the skeleton part 2 may satisfy the above-described configuration, and in any case, the same effects can be obtained to some different extent.

Note that, unlike the present example, each bone change part 2B2 may extend from the bone constant part 2B1 to the connection part 2J while gradually decreasing the cross-sectional area. In this case, the bone constant part 2B1 has a cross-sectional area larger than that of the bone change part 2B2 (is thicker than the bone change part). Accordingly, the bone constant part 2B1 is unlikely to deform when external force is applied, and instead, buckling is relatively likely to occur at the bone change part 2B2 (in particular, a portion on a connection part 2J side), and thus the porous structural body 1 is unlikely to perform compressing deformation.

Accordingly, the surface of the porous structural body 1 provides harder touch, and a machine characteristic of high hardness is obtained. For example, the porous structural body provides a harder feeling to the seated person when sitting, particularly when starting sitting. Such a behavior is not easily obtained with typical polyurethane foam manufactured through the process of foaming by chemical reaction. With such a configuration, a user who prefers a harder feeling can be supported. Such a hard feeling is appreciated by, for example, a seated person on a passenger-seat cushion member of a sports car that performs abrupt acceleration and deceleration and lane change.

Then, the ratio A0/A1 is in excess of 1.0 when the bone change part 2B2 extends from the bone constant part 2B1 to the connection part 2J while gradually decreasing the cross-sectional area.

Note that each bone part 2B included in the skeleton part 2 may satisfy the above-described configuration, or only some bone parts 2B of the respective bone parts 2B included in the skeleton part 2 may satisfy the above-described configuration, and in any case, the same effects can be obtained to some different extent.

Note that in the example of FIGS. 1 to 4 described above in the first embodiment, each bone part 2B may include only the bone constant part 2B1 with no bone change part 2B2. In this case, the cross-sectional area of the bone part 2 is constant over its entire length. When external force is applied, the surface of the porous structural body 1 provides touch of intermediate hardness. With such a configuration, a user who prefers a feeling of intermediate hardness can be supported. The configuration can be applied preferably to a passenger-seat cushion member of any car type such as the luxury car or the sports car.

In this case, the ratio A0/A1 is 1.0.

Note that each bone part 2B included in the skeleton part 2 may satisfy the above-described configuration, or only some bone parts 2B of the respective bone parts 2B included in the skeleton part 2 may satisfy the above-described configuration, and in any case, the same effects can be obtained to some different extent.

Returning to the example of FIGS. 29 and 30, the cross-sectional area of the bone constant part 2B1 of each bone part 2B included in the skeleton part 2 is smaller than those of the bone change part 2B2 and the corresponding connection part 2J in the present example. More specifically, the cross-sectional area of the bone constant part 2B1 is smaller than the cross-sectional area of any portion of each of the bone change part 2B2 and the connection part 2J (except a boundary portion between the bone constant part 2B1 and the bone change part 2B2). In other words, the bone constant part 2B1 is a (thin) portion having a smallest cross-sectional area in the skeleton part 2. Accordingly, as described above, when external force is applied, the bone constant part 2B1 is likely to deform, and thus the porous structural body 1 is likely to perform compressing deformation. Consequently, the surface of the porous structural body 1 provides softer touch.

Note that the cross-sectional area of each connection part 2J is the cross-sectional area of a cross section perpendicular to the skeleton line O of the connection part 2J.

Note that the present disclosure is not limited to the present example, but only some bone parts 2B of the respective bone parts 2B included in the skeleton part 2 may satisfy the above-described configuration, and in this case as well, the same effects can be obtained to some different extent.

Similarly, in the present example, a width of the bone constant part 2B1 of each bone part 2B included in the skeleton part 2 is smaller than those of the bone change part 2B2 and the corresponding connection part 2J. More specifically, the width of the bone constant part 2B1 is smaller than the width of any portion (excluding the boundary portion between the bone constant part 2B1 and the bone change part 2B2) of each of the bone change part 2B2 and the connection part 2J. In other words, the bone constant part 2B1 is a (thin) portion having a smallest width in the skeleton part 2. Accordingly, when external force is applied, the bone constant part 2B1 is likely to deform, and thus the surface of the porous structural body 1 provides softer touch.

Note that the widths of the bone constant part 2B1, the bone change part 2B2, and the connection part 2J are measured maximum widths along cross sections of the bone constant part 2B1, the bone change part 2B2, and the connection part 2J, respectively, which are perpendicular to the skeleton line O. The skeleton line O of the connection part 2J is a portion of the skeleton line O corresponding to the connection part 2J. FIG. 30(*a*) illustrates a width W0 of the bone constant part 2B1 and a width W1 of the bone change part 2B2 for reference.

Note that the present disclosure is not limited to the present example, but only some bone parts 2B of the respective bone parts 2B included in the skeleton part 2 may satisfy the above-described configuration, and in this case as well, the same effects can be obtained to some different extent.

In each above-described example, for simplification of the structure of the porous structural body 1 and the easiness of manufacturing by the 3D printer, the width W0 (FIG. 30(*a*)) of the bone constant part 2B1 is preferably 0.05 mm or larger, more preferably 0.10 mm or larger. Shaping can be performed at the resolution of the 3D printer with the high performance when the width W0 is 0.05 mm or larger, and shaping can be performed not only at the resolution of the 3D printer with the high performance but also at the resolution of the general-purpose 3D printer when the width is 0.10 mm or larger.

On the other hand, to improve accuracy of the outer edge (outer outline) shape of the porous structural body 1, reduce the gap (interval) between the cell holes C, and have excellent characteristics as the cushion member, the width W0 (FIG. 30(*a*)) of the bone constant part 2B1 is preferably from 0.05 mm or larger to 2.0 mm or smaller.

Note that each bone part 2B included in the skeleton part 2 preferably satisfies the above-described configuration, but only some bone parts 2B of the respective bone parts 2B included in the skeleton part 2 may satisfy the above-described configuration, and in this case as well, the same effects can be obtained to some different extent.

As illustrated in FIG. 30, in the present example, the bone change part 2B2 of each bone part 2B included in the skeleton part 2 has, as side surfaces, one or a plurality of (in the present example, three) tilted surfaces 2B23, each tilted surface 2B23 is tilted (at a tilt smaller than 90°) relative to the extension direction of the bone change part 2B2, and a width W2 gradually increases as being from the bone constant part 2B1 toward the connection part 2J.

Accordingly, when external force is applied, the bone part 2B is likely to perform buckling deformation at the constricted portion in the vicinity of the boundary between the bone constant part 2B1 and the bone change part 2B2, and thus the porous structural body 1 is likely to perform compressing deformation. Consequently, the surface of the porous structural body 1 provides softer touch.

Here, the extension direction of the bone change part 2B2 is the extension direction of the central axis (skeleton line O) of the bone change part 2B2. The width W2 of each tilted surface 2B23 of the bone change part 2B2 is the width of the tilted surface 2B23, which is measured along a cross section perpendicular to the skeleton line O of the bone change part 2B2.

Note that the present disclosure is not limited to the present example, but only some bone parts 2B of the respective bone parts 2B included in the skeleton part 2 may satisfy the above-described configuration, and in this case as well, the same effects can be obtained to some different extent.

In the present example, each bone part 2B in the skeleton part 2 has a column shape, and the cross-sectional shapes of the bone constant part 2B1 and the bone change part 2B2 are regular triangles.

Accordingly, the porous structural body 1 has a simple structure and thus can be easily shaped by the 3D printer. Moreover, machine characteristics of typical polyurethane foam manufactured through the process of foaming by chemical reaction can be easily reproduced. Therefore, the characteristics of the cushion member of the porous structural body 1 can be improved. Furthermore, since each bone part 2B has the column shape in this manner, durability of the porous structural body 1 can be improved as compared to a case where the bone part 2B is replaced with a thin film part.

Note that each of the cross-sectional shapes of the bone constant part 2B1 and the bone change part 2B2 is a shape at a cross section perpendicular to the central axis (skeleton line O) of each of the bone constant part 2B1 and the bone change part 2B2.

Note that the present disclosure is not limited to the present example, but only some bone parts 2B of the respective bone parts 2B included in the skeleton part 2 may satisfy the above-described configuration, and in this case as well, the same effects can be obtained to some different extent.

In all or some bone parts 2B of the respective bone parts 2B included in the skeleton part 2, each of the cross-sectional shapes of the bone constant part 2B1 and the bone change part 2B2 may be a polygon (such as a triangle other than a regular triangle, or a rectangle) other than the regular triangle or may be a circle (such as an exact circle or an ellipse), and in this case as well, effects same as those of the present example can be obtained. The cross-sectional shapes of the bone constant part 2B1 and the bone change part 2B2 may be different from each other. Alternatively, the cross-sectional shapes of the respective bone parts 2B may be uniform along the extension direction, or may be nonuniform along the extension direction. Alternatively, the cross-sectional shapes of the bone parts 2B may be different from each other.

REFERENCE SIGNS LIST 1 porous structural body
11 first porous structural body
12 second porous structural body
2 skeleton part
2B bone part
2Be end part of bone part
2B1 bone constant part
2B2 bone change part
2B21 edge of bone change part on connection part side
2B22 edge of bone change part on bone constant part side
2B23 tilted surface of bone change part
2J connection part
3 film
21 cell zoning part
211 annular part
211L large annular part
211S small annular part
2111 inner periphery side edge part of annular part
300 car seat pad (passenger-seat cushion member)
310 cushion pad
311 main pad
312 side pad
320 back pad
321 main pad
322 side pad
340 head rest
400 3D printer
410 controller
420 shaping unit
421 main member nozzle
430 supporting table
440 housing body
LL ultraviolet laser beam
LR liquid resin
500 3D shaping data
6 top skin part
6A smooth part
6B through hole
6C column part
7 seat body
71 under-hip portion
72 under-thigh circumferential periphery part
73 groove part
74 hole part
721 lower under-thigh circumferential periphery part
721L left side of lower under-thigh circumferential periphery part
721R right side of lower under-thigh circumferential periphery part
722 upper under-thigh circumferential periphery part
722L left side of upper under-thigh circumferential periphery part
722R right side of upper under-thigh circumferential periphery part
723 front under-thigh circumferential periphery part
723T upper end part of front under-thigh circumferential periphery part
75 back-pad coupling part
76 seat-body-side coupling part
761 lower seat-body-side coupling part
762 upper seat-body-side coupling part
8 filling body
81 body part
811 first body part
812 second body part
82 filling-body-side coupling part
821 outer edge part
8211 first outer edge part
8212 second outer edge part
822 filling-body-side hook-and-loop fastener (mechanical coupling means)
8221 filling-body-side first hook-and-loop fastener
8222 filling-body-side second hook-and-loop fastener
82a back-side end part
C cell hole
O skeleton line
V1 virtual surface V1L large virtual surface
V1S small virtual surface
BS body stepping surface
PS pad stepping surface

The invention claimed is:

1. A passenger-seat-cushion-member manufacturing method of manufacturing a passenger-seat cushion member comprising a seat body, and a filling body that fills a hole part formed at the seat body,
the seat body including a seat body side coupling part including mechanical coupling means that couples to the filling body,
the filling body including a body part including a porous structural body made of flexible resin or rubber, and a filling body side coupling part disposed adjacent to the body part and including mechanical coupling means that couples to the seat body side coupling part, at least part of the filling body side coupling part including the porous structural body,
a density of an outer edge part including the porous structural body in the filling body side coupling part being higher than a density of the body part, where the density is a mass per unit volume in the porous structural body,
the manufacturing method comprising:
a step of shaping the porous structural body by using a 3D printer; and
a step of coupling the filling body side coupling part including the shaped porous structural body to the seat body side coupling part, to fill the seat body with the filling body.

2. The passenger-seat-cushion-member manufacturing method according to claim 1, wherein
the mechanical coupling means in the seat body side coupling part is a hook-and-loop fastener disposed on an outer surface of the seat body, and
the mechanical coupling means in the filling body side coupling part is a hook-and-loop fastener disposed on an outer side of the body part.

3. The passenger-seat-cushion-member manufacturing method according to claim 1, wherein
the mechanical coupling means in the seat body side coupling part is a concave part formed in the seat body,
the mechanical coupling means in the filling body side coupling part is a convex part formed to protrude from the body part, and
the concave part and the convex part are formed in shapes that are wedge-fittable with each other.

4. The passenger-seat-cushion-member manufacturing method according to claim 1, wherein
the porous structural body includes a skeleton part that zones a plurality of cell holes, and
a top skin part is formed on at least part of an outer side of the skeleton part and integrated with the skeleton part to block at least some of the plurality of cell holes, at least part of an outer side of the top skin part being a surface.

5. The passenger-seat-cushion-member manufacturing method according to claim 4, wherein at least part of the surface of the top skin part is a curved surface.

6. The passenger-seat-cushion-member manufacturing method according to claim 4, wherein
the porous structural body comprises a first porous structural body, and a second porous structural body integrated with the first porous structural body, and
the second porous structural body protrudes beyond the first porous structural body in a direction intersecting with a seating direction when a seated person sits on the passenger-seat cushion member.

7. A passenger-seat cushion member comprising a seat body, and a filling body that fills a hole part formed at the seat body, wherein
the seat body includes a seat body side coupling part including mechanical coupling means that couples to the filling body,
the filling body includes a body part including a porous structural body made of flexible resin or rubber, and a filling body side coupling part disposed adjacent to the body part and including mechanical coupling means that couples to the seat body side coupling part, at least part of the filling body side coupling part including the porous structural body,
a density of an outer edge part including the porous structural body in the filling body side coupling part is higher than a density of the body part, where the density is a mass per unit volume in the porous structural body,
the filling body side coupling part is coupled to the seat body side coupling part, and
the porous structural body is shaped by using a 3D printer.

8. The passenger-seat cushion member according to claim 7, wherein
the porous structural body comprises a skeleton part,
the skeleton part includes:
a plurality of bone parts, and
a plurality of connection parts each connecting end parts of the plurality of bone parts to each other, and
the bone parts have a circular or polygonal cross-sectional shape.

9. The passenger-seat cushion member according to claim 7, wherein
the porous structural body comprises a skeleton part,
the skeleton part includes:
a plurality of bone parts, and
a plurality of connection parts each connecting end parts of the plurality of bone parts to each other, and
each of the bone parts includes, in at least part of the bone part, a bone constant part extending while keeping a cross-sectional area constant, and
a ratio A0/A1 of a cross-sectional area A0 of the bone constant part relative to a cross-sectional area A1 of an edge of the bone part on any one side satisfies:

$$0.15 \leq A0/A1 \leq 2.0.$$

10. A method of manufacturing a filling body that fills a hole part formed at a seat body in a passenger-seat cushion member comprising the seat body and the filling body,
the filling body including a body part including a porous structural body made of flexible resin or rubber, and a filling body side coupling part disposed adjacent to the body part and including mechanical coupling means that couples to the seat body, at least part of the filling body side coupling part including the porous structural body,
a density of an outer edge part including the porous structural body in the filling body side coupling part being higher than a density of the body part, where the density is a mass per unit volume in the porous structural body,
the manufacturing method comprising:

a step of shaping the porous structural body by using a 3D printer.

11. A filling body that fills a hole part formed at a seat body in a passenger-seat cushion member including the seat body and the filling body, wherein
   the filling body includes a body part including a porous structural body made of flexible resin or rubber, and a filling body side coupling part disposed adjacent to the body part and including mechanical coupling means that couples to the seat body, at least part of the filling body side coupling part including the porous structural body,
   a density of an outer edge part including the porous structural body in the filling body side coupling part is higher than a density of the body part, where the density is a mass per unit volume in the porous structural body, and
   the porous structural body is shaped by using a 3D printer.

12. The passenger-seat-cushion-member manufacturing method according to claim 2, wherein
   the porous structural body includes a skeleton part that zones a plurality of cell holes, and
   a top skin part is formed on at least part of an outer side of the skeleton part and integrated with the skeleton part to block at least some of the plurality of cell holes, at least part of an outer side of the top skin part being a surface.

13. The passenger-seat-cushion-member manufacturing method according to claim 3, wherein
   the porous structural body includes a skeleton part that zones a plurality of cell holes, and
   a top skin part is formed on at least part of an outer side of the skeleton part and integrated with the skeleton part to block at least some of the plurality of cell holes, at least part of an outer side of the top skin part being a surface.

14. The passenger-seat-cushion-member manufacturing method according to claim 5, wherein
   the porous structural body comprises a first porous structural body, and a second porous structural body integrated with the first porous structural body, and
   the second porous structural body protrudes beyond the first porous structural body in a direction intersecting with a seating direction when a seated person sits on the passenger-seat cushion member.

15. The passenger-seat cushion member according to claim 8, wherein
   the porous structural body comprises a skeleton part,
   the skeleton part includes:
      a plurality of bone parts, and
      a plurality of connection parts each connecting end parts of the plurality of bone parts to each other, and
   each of the bone parts includes, in at least part of the bone part, a bone constant part extending while keeping a cross-sectional area constant, and
   a ratio $A0/A1$ of a cross-sectional area $A0$ of the bone constant part relative to a cross-sectional area $A1$ of an edge of the bone part on any one side satisfies:
   $0.15 \leq A0/A1 \leq 2.0$.

* * * * *